(12) United States Patent
Ishii

(10) Patent No.: US 9,222,776 B2
(45) Date of Patent: Dec. 29, 2015

(54) GYRO SENSOR AND ELECTRONIC APPARATUS

(71) Applicant: Seiko Epson Corporation, Tokyo (JP)

(72) Inventor: Masahiro Ishii, Suwa (JP)

(73) Assignee: Seiko Epson Corporation (JP)

( * ) Notice: Subject to any disclaimer, the term of this patent is extended or adjusted under 35 U.S.C. 154(b) by 323 days.

(21) Appl. No.: 13/786,872

(22) Filed: Mar. 6, 2013

(65) Prior Publication Data
US 2013/0239685 A1 Sep. 19, 2013

(30) Foreign Application Priority Data

Mar. 13, 2012 (JP) ................................. 2012-056458
Mar. 13, 2012 (JP) ................................. 2012-056461
Mar. 13, 2012 (JP) ................................. 2012-056462

(51) Int. Cl.
*G01C 19/56* (2012.01)
*G01C 19/5607* (2012.01)
*G01C 19/5642* (2012.01)
*G01C 19/5719* (2012.01)

(52) U.S. Cl.
CPC ........ *G01C 19/5642* (2013.01); *G01C 19/5607* (2013.01); *G01C 19/5719* (2013.01)

(58) Field of Classification Search
CPC ........... G01C 19/5719; G01C 19/5607; G01C 19/56; G01C 19/5733; G01C 19/5614; G01C 19/5642; H01L 41/04; H01L 41/1132; G01L 41/332
USPC .............. 73/504.12, 504.16, 504.04; 310/370
See application file for complete search history.

(56) References Cited

U.S. PATENT DOCUMENTS

| | | | |
|---|---|---|---|
| 7,043,986 B2 * | 5/2006 | Kikuchi et al. | 73/504.12 |
| 7,412,885 B2 | 8/2008 | Ogura | |
| 7,944,132 B2 * | 5/2011 | Furuhata et al. | 310/370 |
| 2003/0080652 A1 * | 5/2003 | Kawashima | 310/370 |
| 2005/0284223 A1 * | 12/2005 | Karaki et al. | 73/504.12 |
| 2006/0162446 A1 * | 7/2006 | Ogura | 73/504.12 |
| 2006/0162447 A1 * | 7/2006 | Ogura | 73/504.12 |
| 2008/0236281 A1 * | 10/2008 | Noguchi et al. | 73/504.16 |
| 2010/0207495 A1 * | 8/2010 | Kikushima et al. | 310/370 |
| 2011/0057549 A1 * | 3/2011 | Kawai et al. | 310/344 |
| 2011/0198969 A1 | 8/2011 | Furuhata et al. | |
| 2011/0215680 A1 * | 9/2011 | Yamada et al. | 310/370 |
| 2011/0227452 A1 * | 9/2011 | Yamada | 310/323.01 |
| 2011/0232382 A1 * | 9/2011 | Amemiya | 73/504.12 |
| 2013/0162110 A1 * | 6/2013 | Lee et al. | 310/370 |

FOREIGN PATENT DOCUMENTS

| | | |
|---|---|---|
| JP | 2001-033255 | 2/2001 |
| JP | 2001-241953 A | 9/2001 |
| JP | 2003-315046 A | 11/2003 |

(Continued)

*Primary Examiner* — Helen Kwok
(74) *Attorney, Agent, or Firm* — Harness, Dickey & Pierce, P.L.C.

(57) ABSTRACT

A gyro sensor includes a base, a first connection arm and a second connection arm that extend from the base in opposite directions along an X axis, a first drive oscillation arm that extends from the first connection arm along a Y axis, a second drive oscillation arm that extends from the second connection arm along the Y axis, and a first detection oscillation arm and a second detection oscillation arm that extend from the base in opposite directions along the Y axis, and each of the first drive oscillation arm and the second drive oscillation arm has an oscillation component along the X axis and an oscillation component along a Z axis.

17 Claims, 44 Drawing Sheets

(56) References Cited

FOREIGN PATENT DOCUMENTS

| | | |
|---|---|---|
| JP | 2006-201011 | 8/2006 |
| JP | 3885944 | 12/2006 |
| JP | 2007-163143 A | 6/2007 |
| JP | 2008-151633 A | 7/2008 |
| JP | 2011-095270 | 5/2011 |
| WO | 2010-047115 | 4/2010 |

* cited by examiner

CROSS-SECTIONAL VIEW TAKEN ALONG LINE D-D

CROSS-SECTIONAL VIEW TAKEN ALONG LINE E-E

CROSS-SECTIONAL VIEW TAKEN ALONG LINE F-F

CROSS-SECTIONAL VIEW TAKEN ALONG LINE G-G

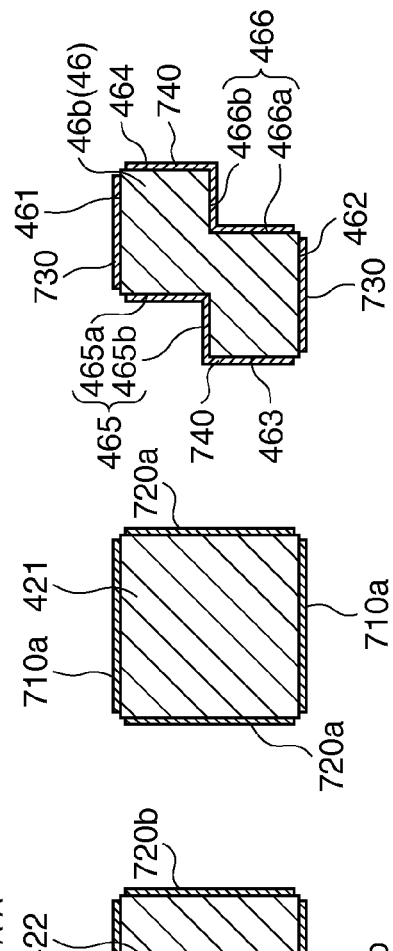
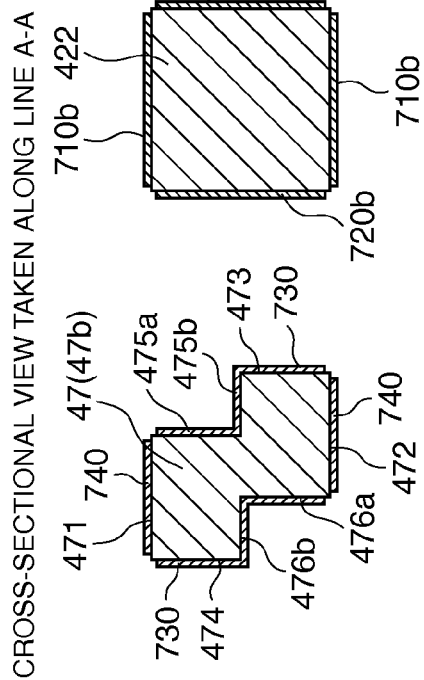
FIG. 14A
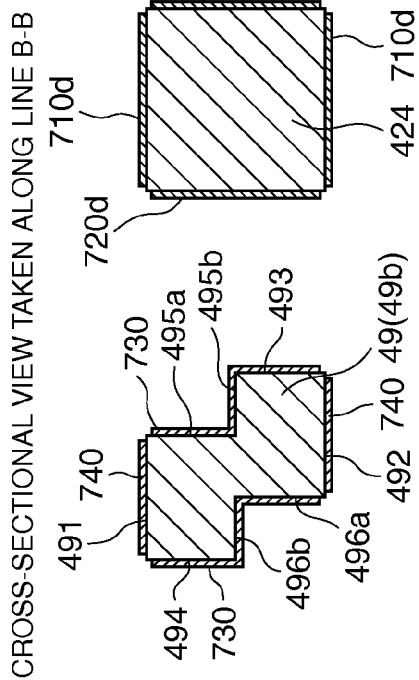
FIG. 14B

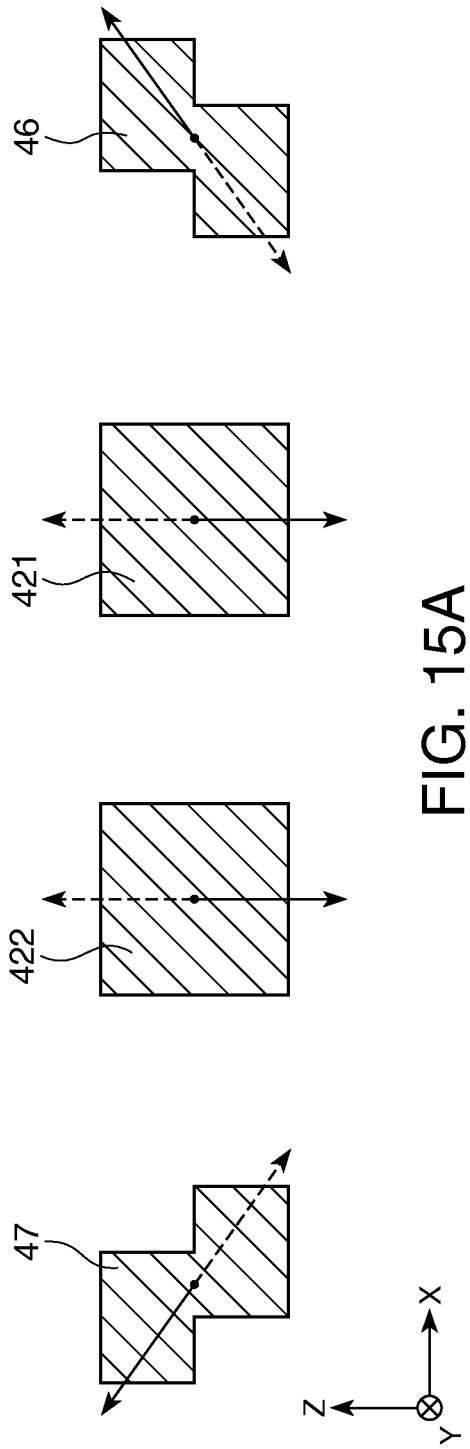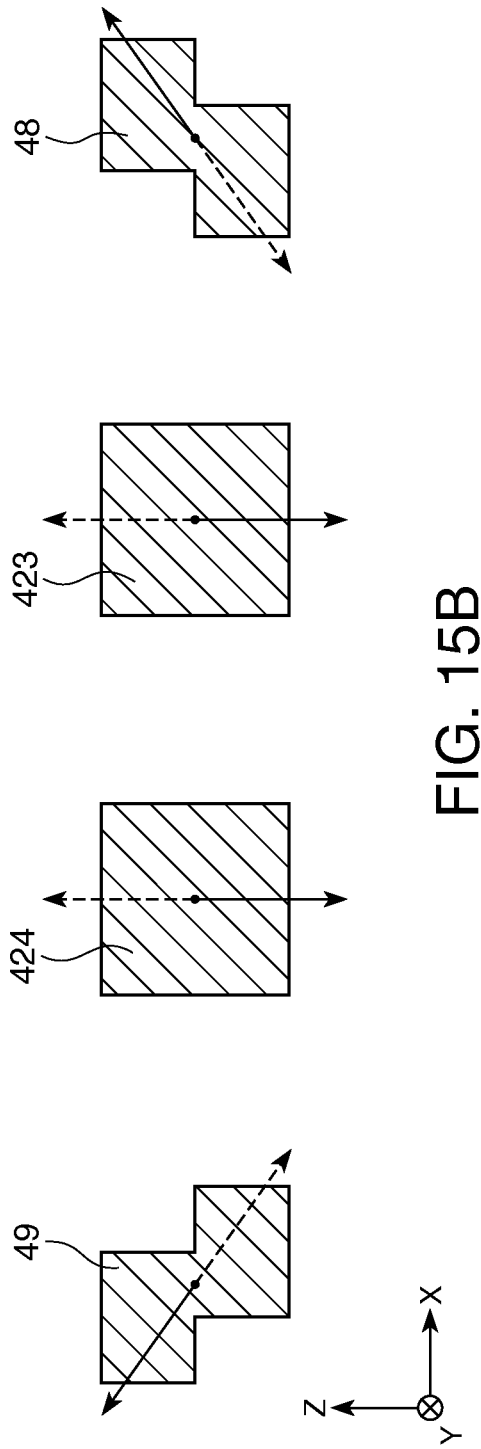

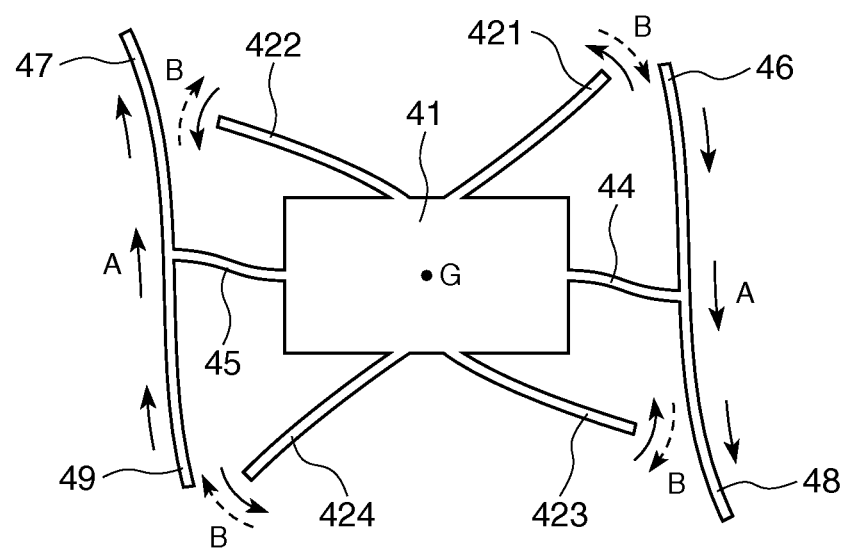
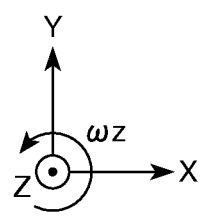
FIG. 16

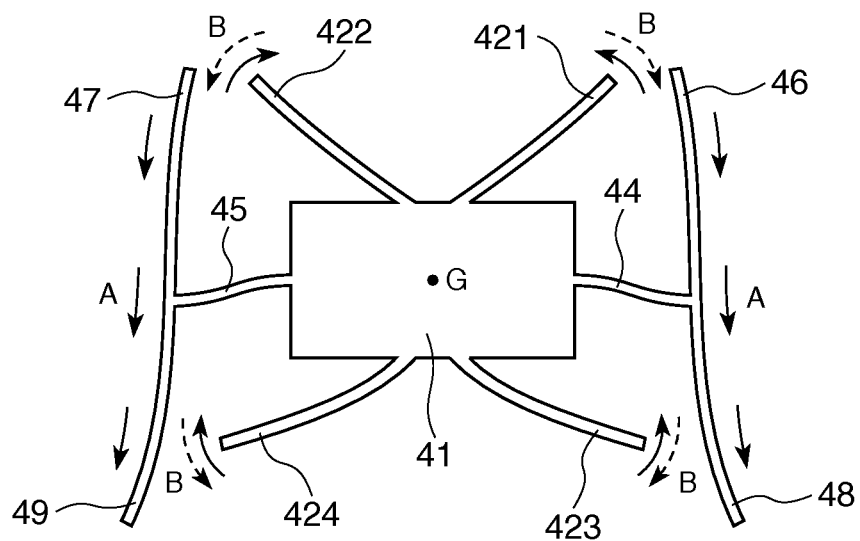
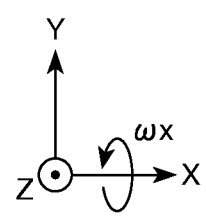
FIG. 18

FIG. 22A CROSS-SECTIONAL VIEW TAKEN ALONG LINE A-A

FIG. 22B CROSS-SECTIONAL VIEW TAKEN ALONG LINE B-B

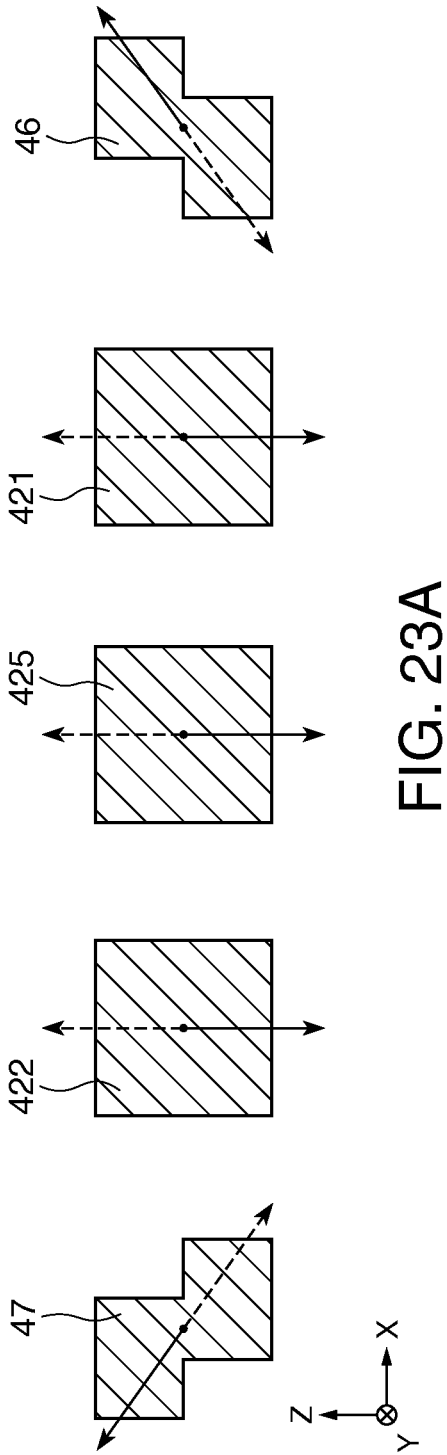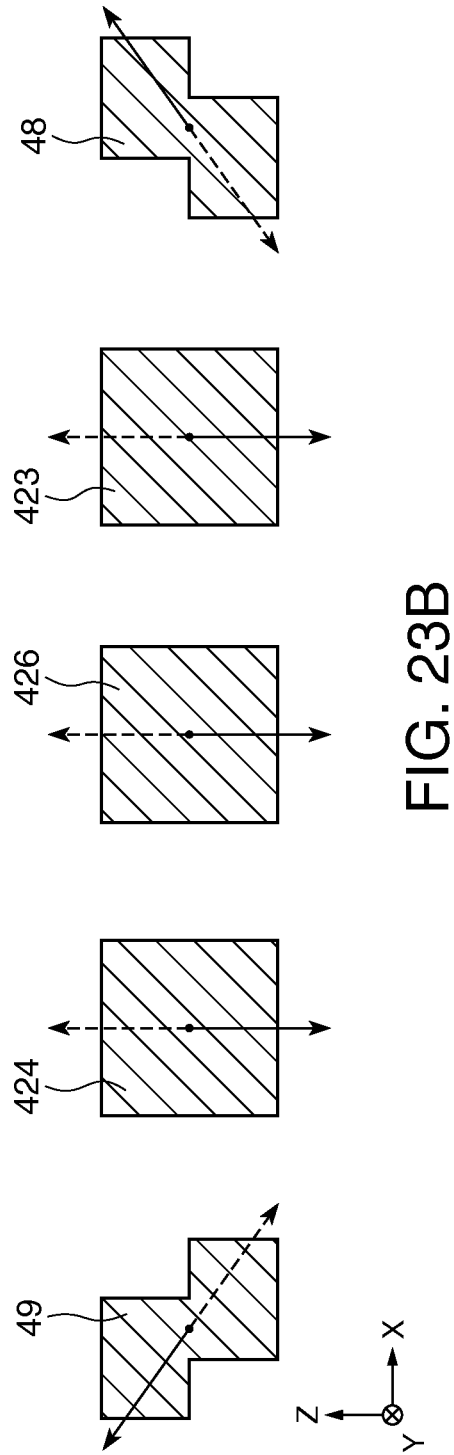

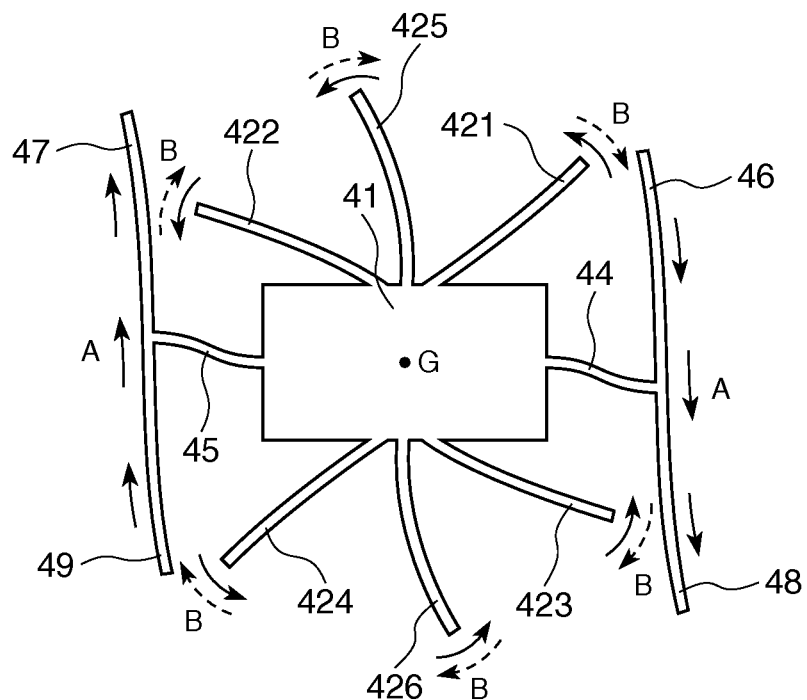
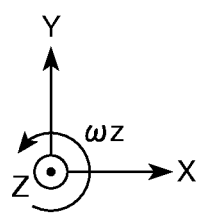
FIG. 24

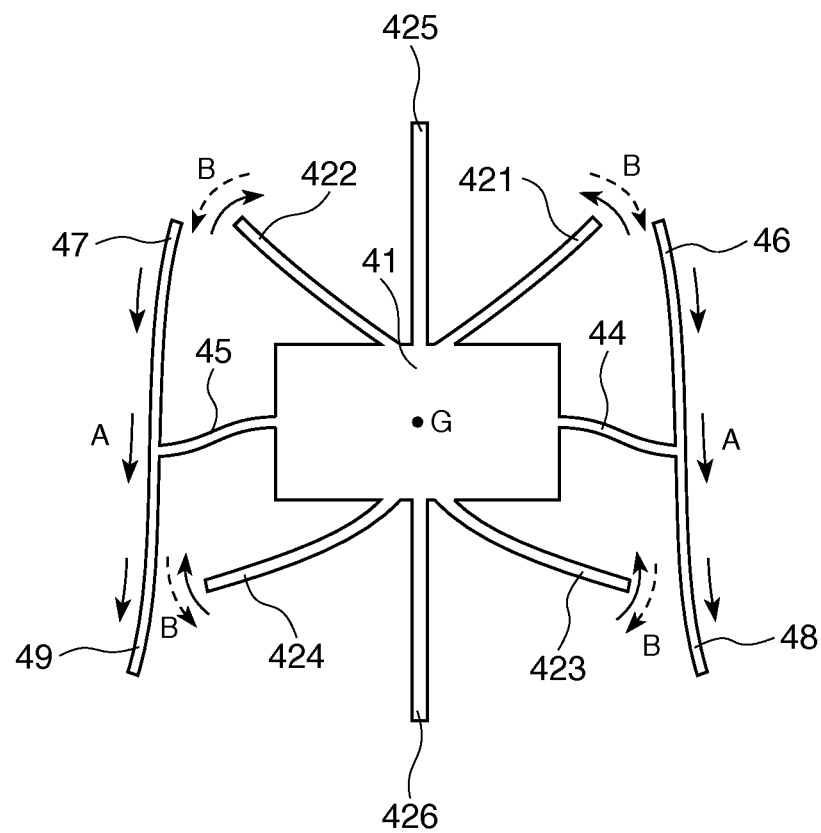
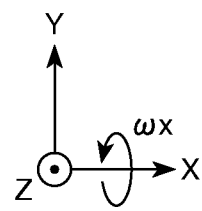
FIG. 26

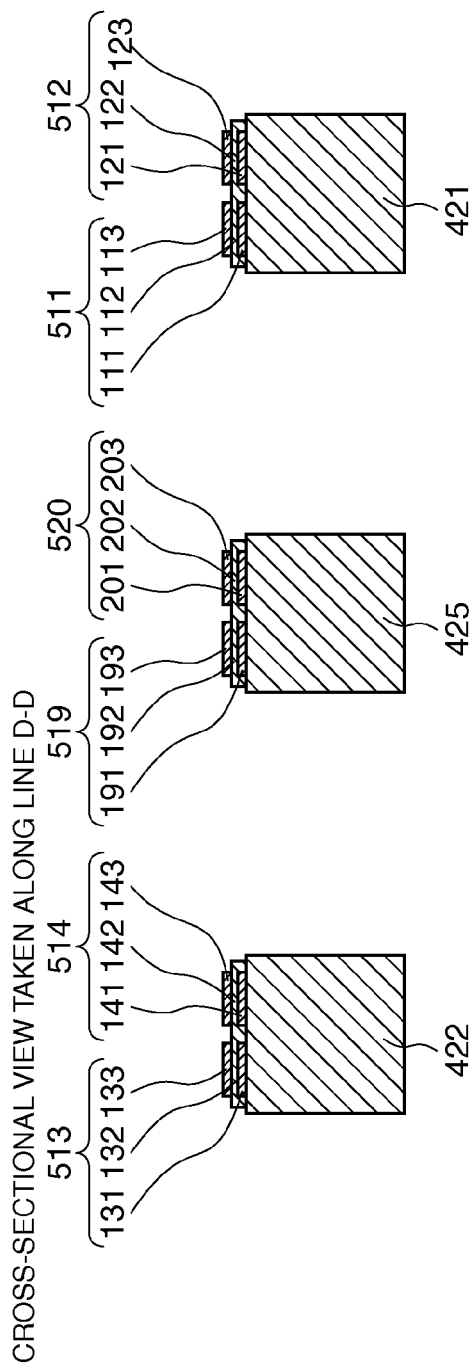
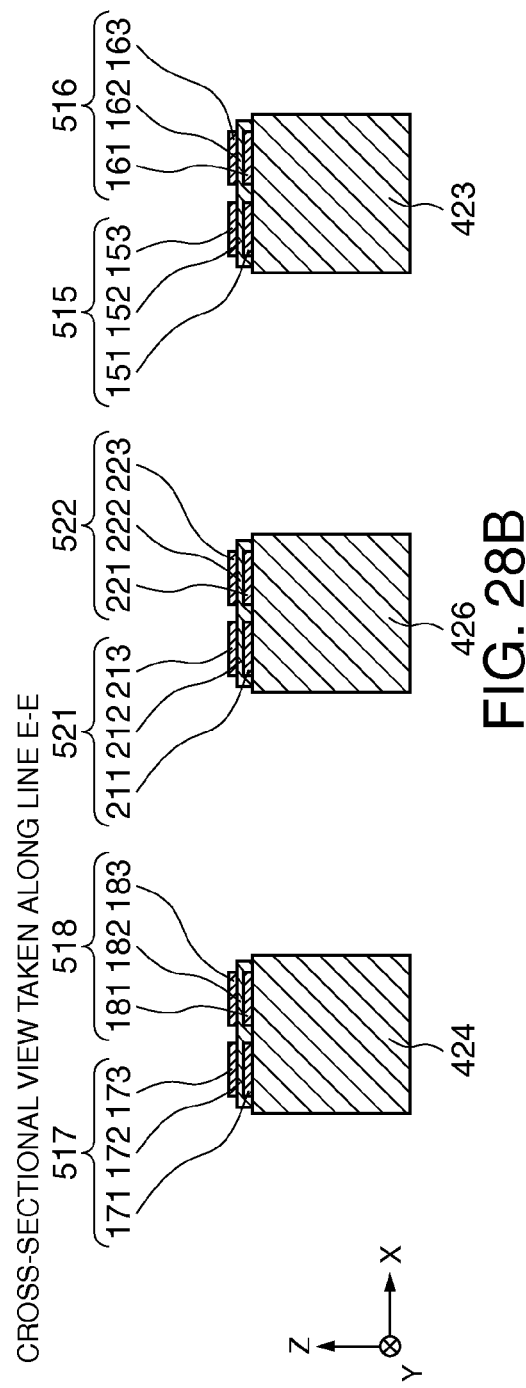

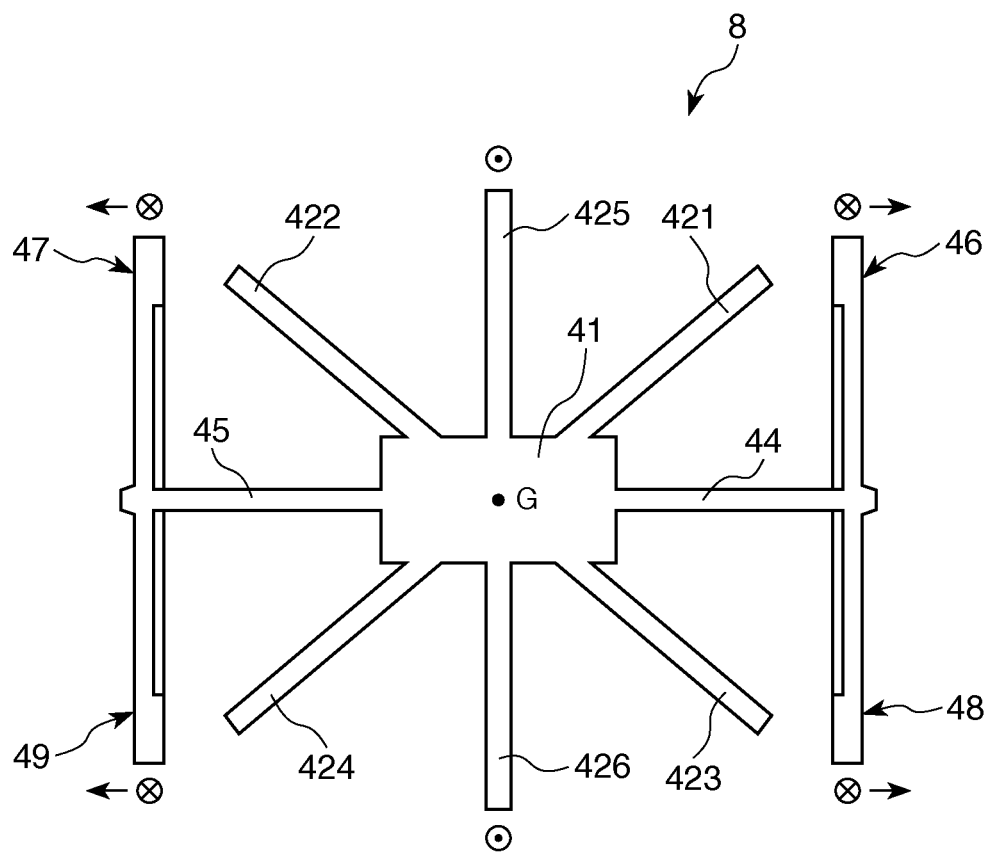
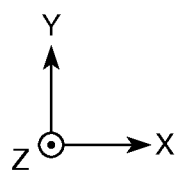
FIG. 29

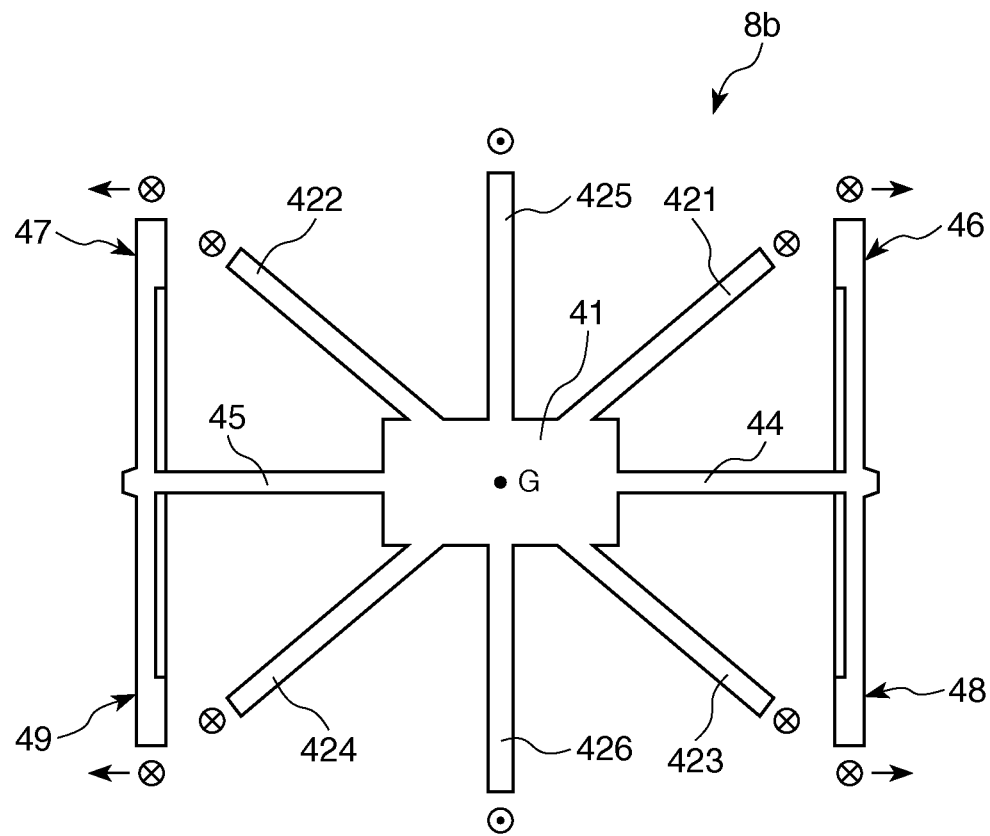
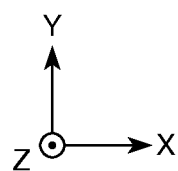
FIG. 37

GYRO SENSOR AND ELECTRONIC APPARATUS

BACKGROUND

1. Technical Field

The present invention relates to a gyro sensor and an electronic apparatus.

2. Related Art

There has been a known gyro device described in JP-A-2006-201011 in the form of an oscillation piece for detecting an angular velocity.

The gyro device described in JP-A-2006-201011 includes a base, first and second detection oscillation arms extending from the base in opposite directions in a Y-axis direction, first and second connection arms extending from the base in opposite directions in an X-axis direction, first and second drive oscillation arms extending from a front end portion of the first connection arm in opposite directions in the Y-axis direction, and third and fourth drive oscillation arms extending from a front end portion of the second connection arm in opposite directions in the Y-axis direction. A drive electrode is formed on each of the first to fourth drive oscillation arms, and a detection electrode is formed on each of the first and second detection oscillation arms.

The thus configured gyro device detects an angular velocity as follows: The first to fourth drive oscillation arms are first allowed to oscillate in such a way that the first, second drive oscillation arms and the third, fourth drive oscillation arms oscillate in a plane-symmetrical manner with respect to a YZ plane. When an angular velocity around a Z axis is applied to the gyro device in this state, a Coriolis force acts on the gyro device, and detectable oscillation in the X-axis direction is induced in the first and second detection oscillation arms. The detection electrodes can then detect distortion of the first and second detection oscillation arms resulting from the oscillation to determine the angular velocity around the Z axis.

The gyro device described in JP-A-2006-201011 is, however, only capable of detecting an angular velocity around the Z axis. That is, no angular velocity around the X axis or the Y axis can be detected. To detect angular velocities produced around the X axis and the Y axis, for example, the gyro device needs to be disposed in a vertical attitude. In this case, the thickness of a sensor device disadvantageously increases. Further, to detect angular velocities around a plurality of axes, a plurality of gyro devices need to be provided. In this case, the size of the apparatus disadvantageously increases.

SUMMARY

An advantage of some aspects of the invention is to provide a gyro sensor capable of detecting an angular velocity around each of multiple axes that intersect each other and a highly reliable electronic apparatus including the gyro sensor.

An aspect of the invention can be implemented as the following forms or application examples:

Application Example 1

A gyro sensor according to this application example includes, on the condition that three axes intersecting each other are designated as a first axis, a second axis and a third axis, respectively: a base, a first connection arm and a second connection arm that extend from the base in opposite directions along the first axis, a first drive oscillation arm that extends from the first connection arm along the second axis, a second drive oscillation arm that extends from the second connection arm along the second axis, and a first detection oscillation arm and a second detection oscillation arm that extend from the base in opposite directions along the second axis, and each of the first drive oscillation arm and the second drive oscillation arm has an oscillation component along the first axis and an oscillation component along the third axis.

The thus configured gyro sensor can detect an angular velocity around each of two axes that intersect each other.

Application Example 2

A gyro sensor according to this application example includes, on the condition that three axes intersecting each other are designated as a first axis, a second axis and a third axis, respectively: a base, a first connection arm and a second connection arm that extend from the base in opposite directions along the first axis, a first drive oscillation arm that extends from the first connection arm along the second axis, a second drive oscillation arm that extends from the second connection arm along the second axis, a first detection oscillation arm and a second detection oscillation arm that extend from one end of the base not only in directions that intersect the first axis and the second axis but also in opposite directions along the first axis, and a third detection oscillation arm and a fourth detection oscillation arm that extend from the other end of the base not only in directions that intersect the first axis and the second axis but also in opposite directions along the first axis, and the first and second detection oscillation arms and the third and fourth detection oscillation arms extend in opposite directions along the second axis, and each of the first drive oscillation arm and the second drive oscillation arm has an oscillation component along the first axis and an oscillation component along the third axis.

The thus configured gyro sensor can detect an angular velocity around each of the three axes that intersect each other.

Application Example 3

It is preferable that the gyro sensor according to the application example further includes a fifth detection oscillation arm that is located between the first detection oscillation arm and the second detection oscillation arm and extends from the one end of the base along the second axis, and a sixth detection oscillation arm that is located between the third detection oscillation arm and the fourth detection oscillation arm and extends from the other end of the base along the second axis.

The thus configured gyro sensor can detect an angular velocity around each of the three axes that intersect each other.

Application Example 4

In the gyro sensor according to the application example, it is preferable that the first and second detection oscillation arms and the third and fourth detection oscillation arms are disposed in a symmetrical manner with respect to a plane defined by the first axis and the third axis, and that the first and third detection oscillation arms and the second and fourth detection oscillation arms are disposed in a symmetrical manner with respect to a plane defined by the second axis and the third axis.

The configuration described above can effectively prevent or suppress oscillation leakage, whereby the detection precision is improved.

Application Example 5

In the gyro sensor according to the application example, it is preferable that when the first drive oscillation arm and the second drive oscillation arm are so driven that the drive oscillation arms oscillate, the oscillation components thereof along the third axis are oriented in the same direction.

The configuration described above allows the first and second drive oscillation arms to oscillate in a well balanced manner.

Application Example 6

In the gyro sensor according to application example, it is preferable that, when the first drive oscillation arm and the second drive oscillation arm are so driven that the drive oscillation arms oscillate, the oscillation components thereof along the first axis are oriented in opposite directions.

The configuration described above allows the first and second drive oscillation arms to oscillate in a well balanced manner.

Application Example 7

In the gyro sensor according to the application example, it is preferable that each of the first drive oscillation arm and the second drive oscillation arm has a portion whose cross-sectional shape perpendicular to the second axis is asymmetrical with respect to a central line of the cross-sectional shape along the first axis and a central line of the cross-sectional shape along the third axis.

The configuration described above more reliably allows the first and second drive oscillation arms to have an oscillation component along the first axis and an oscillation component along the third axis.

Application Example 8

In the gyro sensor according to the application example, it is preferable that each of the first drive oscillation arm and the second drive oscillation arm has a first surface and a second surface that face away from each other as a front surface and a rear surface, a first groove provided in the first surface, and a second groove provided in the second surface, and the first groove and the second groove are disposed along the first axis in a plan view viewed along a normal to the first surface.

The configuration described above allows each of the first and second drive oscillation arms to be simply shaped.

Application Example 9

In the gyro sensor according to the application example, it is preferable that each of the first drive oscillation arm and the second drive oscillation arm has a first surface and a second surface that face away from each other as a front surface and a rear surface, and a first side surface and a second side surface that connect the first surface and the second surface to each other, and at least one of the first side surface and the second side surface has a stepped portion.

The configuration described above allows each of the first and second drive oscillation arms to be simply shaped.

Application Example 10

It is preferable that the gyro sensor according to the application example further includes a third drive oscillation arm that extends in a direction opposite to the direction in which the first drive oscillation arm extends, and a fourth drive oscillation arm that extends in a direction opposite to the direction in which the second drive oscillation arm extends.

The configuration described above increases the number of drive oscillation arms, whereby an angular velocity is detected with improved precision. Further, the first to fourth drive oscillation arms are allowed to oscillate in a well balanced manner.

Application Example 11

In the gyro sensor according to the application example, it is preferable that the gyro sensor detects at least one of an angular velocity around the second axis and an angular velocity around the third axis based on an output signal from each of the detection oscillation arms.

The thus configured gyro sensor can reliably detect at least one of an angular velocity around the second axis and an angular velocity around the third axis.

Application Example 12

In the gyro sensor according to the application example, it is preferable that the gyro sensor detects at least one of the angular velocity around the second axis and the angular velocity around the third axis based on addition or subtraction of the output signals from the detection oscillation arms.

The thus configured gyro sensor can reliably detect at least one of the angular velocity around the second axis and the angular velocity around the third axis in a simple calculation.

Application Example 13

In the gyro sensor according to the application example, it is preferable that at least one of the first connection arm and the second connection arm has a distortion detection unit provided therein.

The thus configured gyro sensor can detect an angular velocity around the first axis.

Application Example 14

In the gyro sensor according to the application example, it is preferable that the gyro sensor detects at least one of an angular velocity around the first axis, an angular velocity around the second axis, and an angular velocity around the third axis based on an output signal from each of the detection oscillation arms.

The thus configured gyro sensor can reliably detect at least one of an angular velocity around the first axis, an angular velocity around the second axis, and an angular velocity around the third axis.

Application Example 15

In the gyro sensor according to the application example, it is preferable that the gyro sensor detects at least one of an angular velocity around the first axis, an angular velocity around the second axis, and an angular velocity around the third axis based on addition or subtraction of output signals from the detection oscillation arms.

The thus configured gyro sensor can reliably detect at least one of an angular velocity around the first axis, an angular velocity around the second axis, and an angular velocity around the third axis in a simple calculation.

Application Example 16

In the gyro sensor according to the application example, it is preferable that each of the detection oscillation arms is made of a piezoelectric material, each of the detection oscillation arms has a substantially rectangular cross-sectional shape, and an electrode is provided on each surface of each of the detection oscillation arms.

The simple configuration described above allows an output signal to be extracted from each of the detection oscillation arms.

Application Example 17

In the gyro sensor according to the application example, it is preferable that each of the detection oscillation arms is made of a piezoelectric material, each of the detection oscillation arms has a pair of principal surfaces that face away from each other as a front surface and a rear surface and a pair of side surfaces that connect the principal surfaces to each other, a groove is provided in at least one of the pair of principal surfaces, and electrodes are provided on an inner wall of the groove and the side surface that faces away from the inner wall.

The thus configured gyro sensor can detect an angular velocity with improved sensitivity.

Application Example 18

In the gyro sensor according to the application example, it is preferable that each of the detection oscillation arms has a piezoelectric device provided on each of the principal surfaces, and the piezoelectric device is formed of a first electrode, a second electrode, and a piezoelectric film disposed therebetween.

The simple configuration described above allows an output signal to be extracted from each of the first and second detection oscillation arms.

Application Example 19

An electronic apparatus according to this application example includes the gyro sensor according to the application example described above.

Electronic apparatuses excellent in reliability can thus be provided.

BRIEF DESCRIPTION OF THE DRAWINGS

The invention will be described with reference to the accompanying drawings, wherein like numbers reference like elements.

FIG. 14A is a cross-sectional view of the gyro sensor taken along the line A-A in FIG. 13, and FIG. 14B is a cross-sectional view of the gyro sensor taken along the line B-B in FIG. 13.

FIGS. 15A and 15B are cross-sectional views for describing the gyro sensor shown in FIG. 13 that is driven.

FIG. 16 is a plan view showing the gyro sensor oscillating when an angular velocity around the Z axis is applied thereto.

FIG. 18 is a plan view showing the gyro sensor oscillating when an angular velocity around an X axis is applied thereto.

FIG. 22A is a cross-sectional view of the gyro sensor taken along the line A-A in FIG. 21, and FIG. 22B is a cross-sectional view of the gyro sensor taken along the line B-B in FIG. 21.

FIGS. 23A and 23B are cross-sectional views for describing the gyro sensor shown in FIG. 21 that is driven.

FIG. 24 is a plan view showing the gyro sensor oscillating when an angular velocity around the Z axis is applied thereto.

FIG. 26 is a plan view showing the gyro sensor oscillating when an angular velocity around the X axis is applied thereto.

FIG. 28A is a cross-sectional view of the gyro sensor taken along the line D-D in FIG. 27, and FIG. 28B is a cross-sectional view of the gyro sensor taken along the line E-E in FIG. 27.

FIG. 29 is a plan view showing a gyro sensor according to an eighth embodiment of the invention that is driven with no angular velocity applied thereto.

FIG. 37 is a plan view showing a gyro sensor according to a tenth embodiment of the invention that is driven with no angular velocity applied thereto.

DESCRIPTION OF EXEMPLARY EMBODIMENTS

A gyro sensor and an electronic apparatus according to embodiments of the invention will be described below in detail with reference to the accompanying drawings.

First Embodiment

Figure 1:
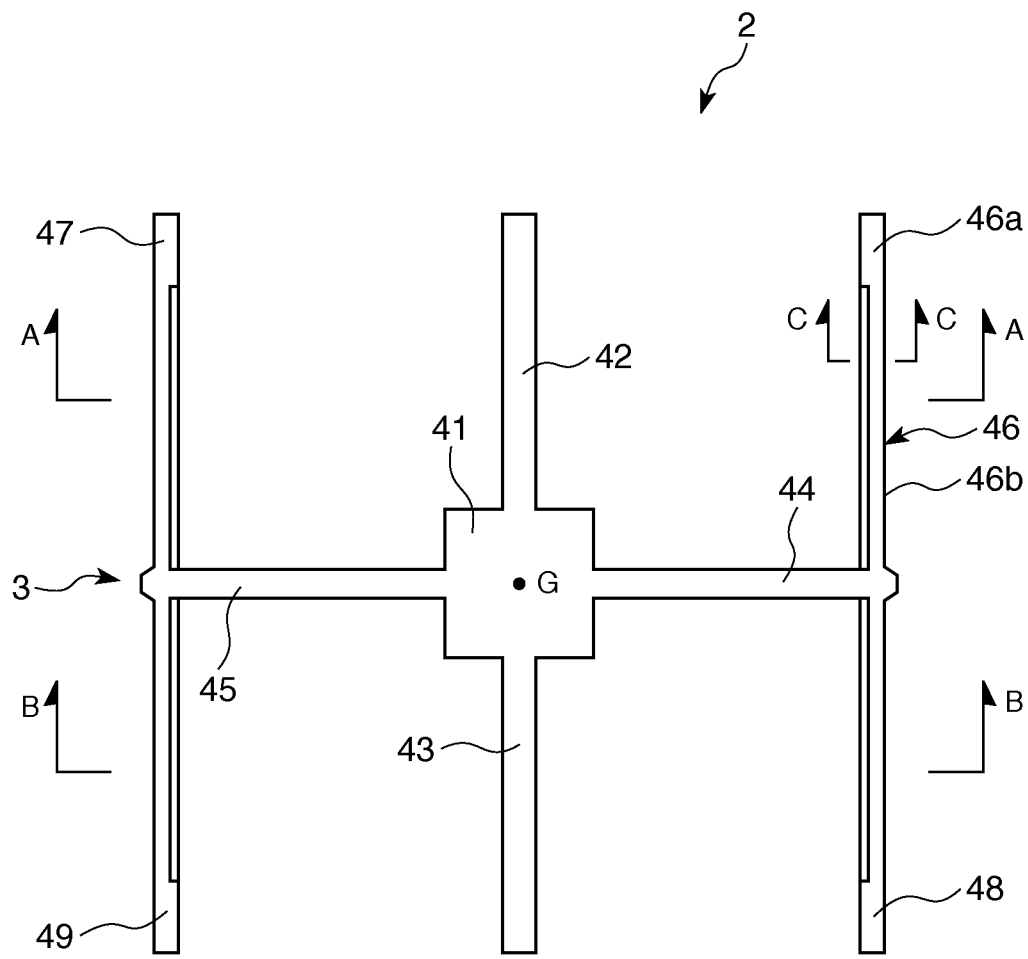
FIG. 1 is a plan view showing a gyro sensor according to a first embodiment of the invention.
Figure 2A:
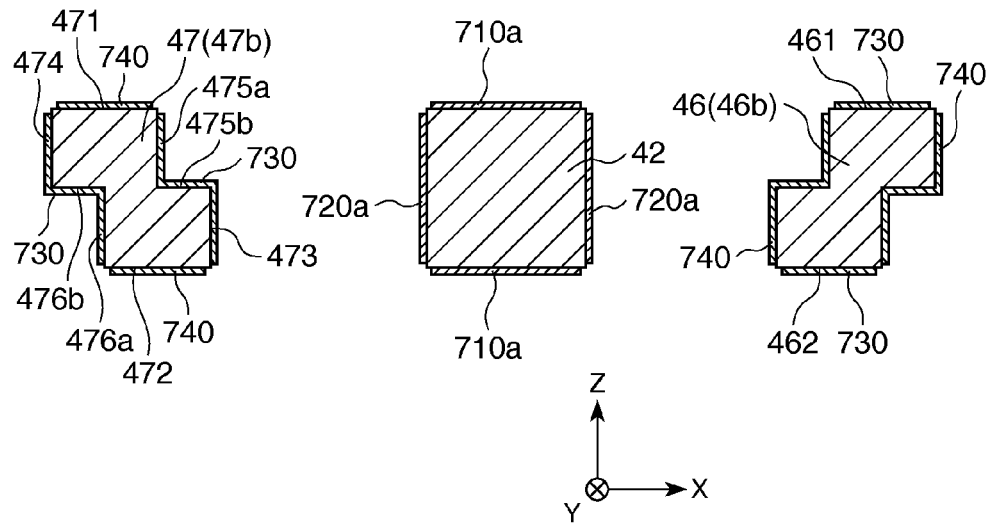
FIG. 2A is a cross-sectional view of the gyro sensor taken along the line A-A in FIG. 1.
Figure 2B:
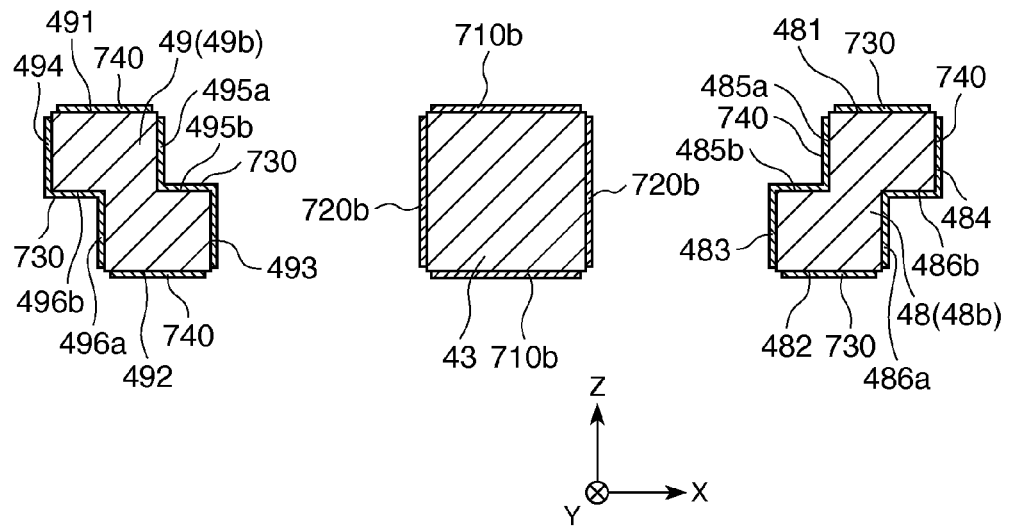
FIG. 2B is a cross-sectional view of the gyro sensor taken along the line B-B in FIG. 1.
Figure 3:
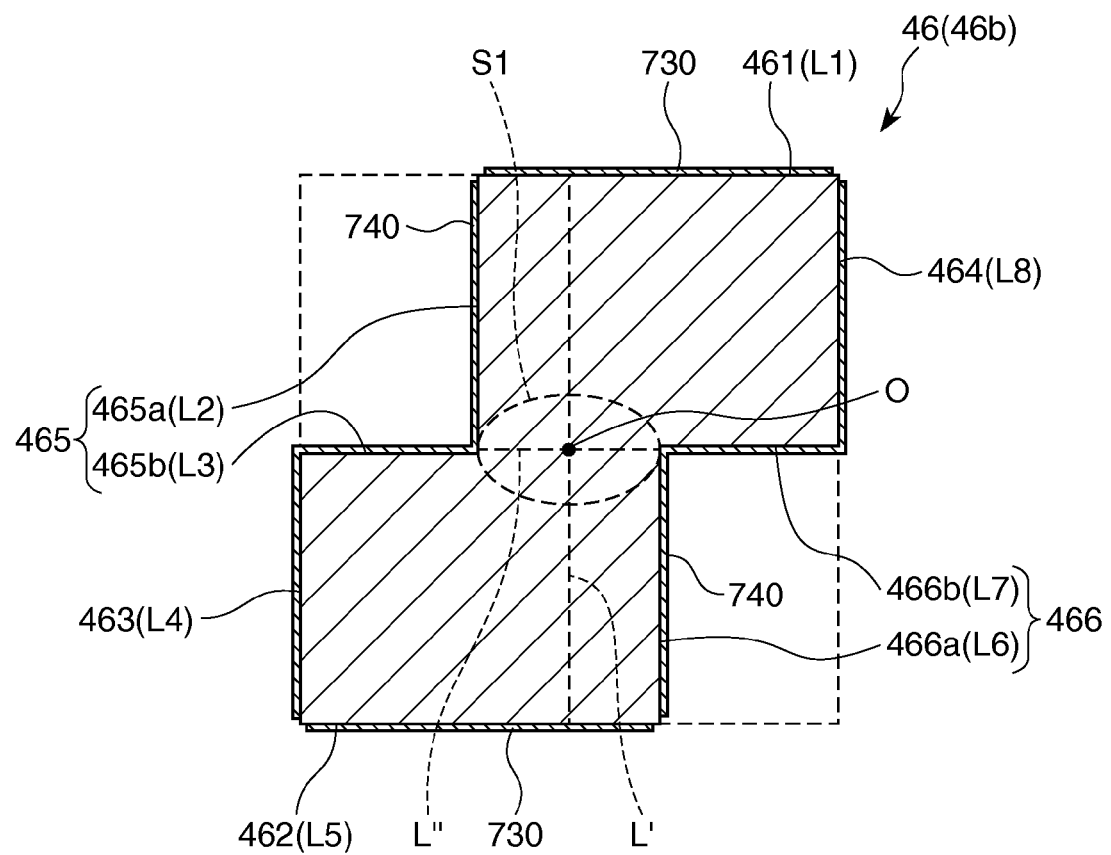
FIG. 3 is a cross-sectional view of the gyro sensor taken along the line C-C in FIG. 1.
Figure 6A:
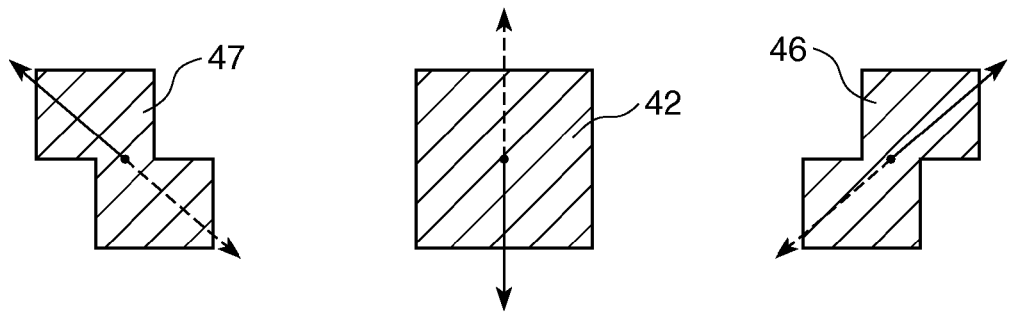
FIGS. 6A and 6B are cross-sectional views for describing the gyro sensor shown in FIG. 1 that is driven.
Figure 6B:
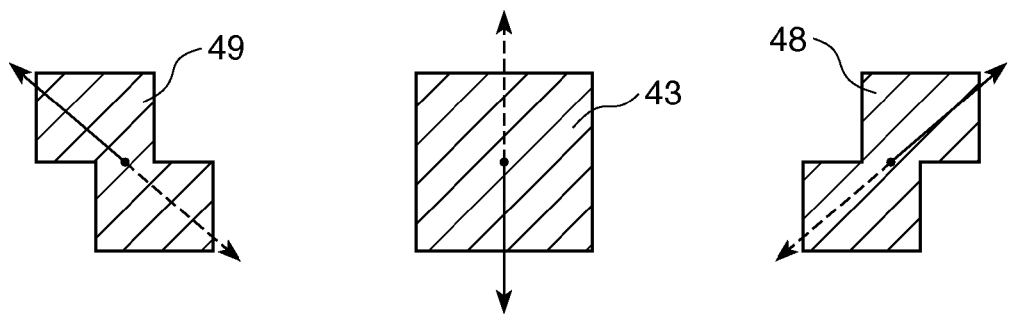
Figure 7:
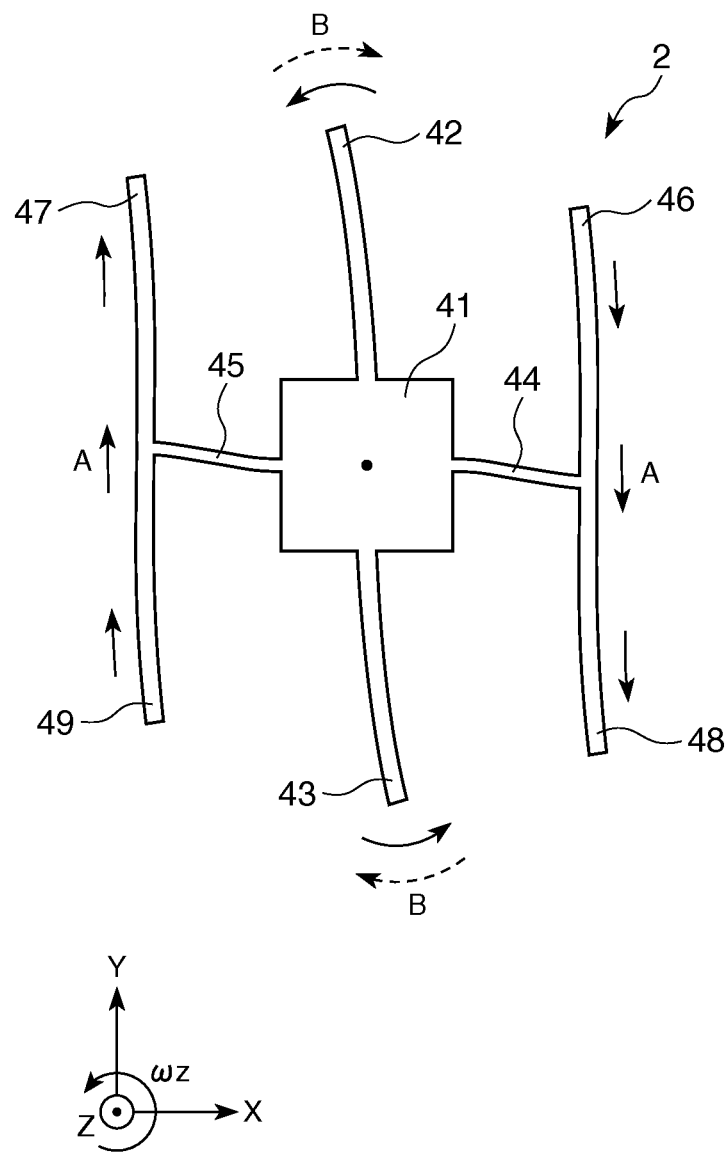
FIG. 7 is a plan view showing the gyro sensor oscillating when an angular velocity around a Z axis is applied thereto.
Figure 8:
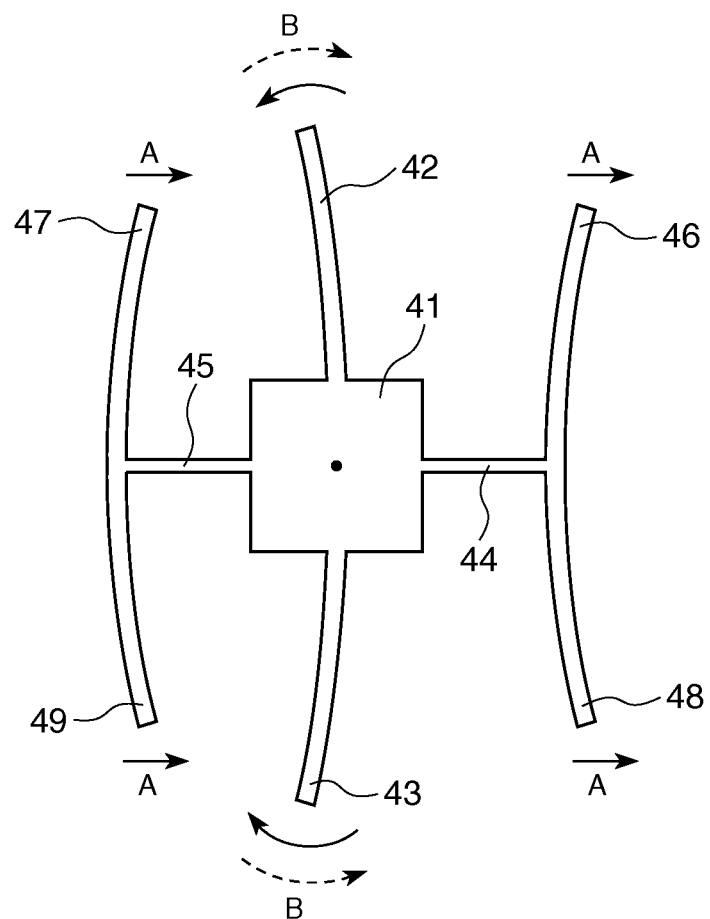
FIG. 8 is a plan view showing the gyro sensor oscillating when an angular velocity around a Y axis is applied thereto.

A gyro sensor according to a first embodiment of the invention will first be described. FIG. 1 is a plan view showing the gyro sensor according to the first embodiment of the invention. FIG. 2A is a cross-sectional view of the gyro sensor taken along the line A-A in FIG. 1, and FIG. 2B is a cross-sectional view of the gyro sensor taken along the line B-B in FIG. 1. FIG. 3 is a cross-sectional view of the gyro sensor taken along the line C-C in FIG. 1. FIG. 4 and FIGS. 5A to 5D are cross-sectional views showing variations of a drive oscillation arm shown in FIG. 3. FIGS. 6A and 6B are cross-sectional views for describing the gyro sensor shown in FIG. 1 that is driven. FIG. 7 is a plan view showing the gyro sensor oscillating when an angular velocity around a Z axis is applied thereto. FIG. 8 is a plan view showing the gyro sensor oscillating when an angular velocity around a Y axis is applied thereto.

In the following description, three axes perpendicular to each other are called an X axis (first axis), a Y axis (second axis), and a Z axis (third axis), as shown in FIG. 1. The direction parallel to the X axis is also called an "X-axis direction." The direction parallel to the Y axis is also called a "Y-axis direction." The direction parallel to the Z axis is also called a "Z-axis direction." A plane defined by the X axis and the Y axis is also called an "XY plane." A plane defined by the Y axis and the Z axis is also called a "YZ plane." A plane defined by the Z axis and the X axis is also called an "XZ plane."

A gyro sensor 2 shown in FIG. 1 is capable of detecting an angular velocity ωz around the Z axis and an angular velocity ωy around the Y axis. The gyro sensor 2 is formed of an oscillation piece 3 and a plurality of electrodes formed on the oscillation piece 3.

The oscillation piece 3 is made of a piezoelectric material. Examples of the piezoelectric material may include quartz, lithium tantalate, lithium niobate, lithium borate, and barium titanate. In particular, quartz is a preferable piezoelectric material of which the oscillation piece 3 is made. When the oscillation piece 3 is made of quartz, the oscillation piece 3 can have excellent oscillation characteristics (frequency-temperature characteristic, in particular). Further, the oscillation piece 3 made of quartz can be formed in an etching process with high dimensional precision. The thus formed oscillation piece 3 extends in the XY plane including the X and Y axes, has a thickness in the Z-axis direction, and includes a base 41, first and second detection oscillation arms 42, 43, first and second connection arms 44, 45, and first, second, third, and fourth drive oscillation arms 46, 47, 48, 49.

The base 41 is located at the center of the oscillation piece 3. The first detection oscillation arm 42 and the second detection oscillation arm 43 extend from the base 41 in opposite directions in the Y-axis direction. The first connection arm 44 and the second connection arm 45 extend from the base 41 in opposite directions in the X-axis direction. The first drive oscillation arm 46 and the third drive oscillation arm 48 extend from a front end portion of the first connection arm 44 in opposite directions in the Y-axis direction. The second drive oscillation arm 47 and the fourth drive oscillation arm 49 extend from a front end portion of the second connection arm 45 in opposite directions in the Y-axis direction.

In the configuration shown in FIG. 1, the width of each of the first connection arm 44 and the second connection arm 45 is smaller than the width of the base 41. The base 41 and the first and second connection arms 44, 45 may alternatively have the same width so that they are integrated with each other. Further, the first and third drive oscillation arms 46, 48 may alternatively extend from a portion of the first connection arm 44 somewhere middle in the direction in which it extends, and the second and fourth drive oscillation arms 47, 49 may similarly extend from a portion of the second connection arm 45 somewhere middle in the direction in which it extends.

The first and second detection oscillation arms 42, 43 are provided symmetrically with respect to the XZ plane that intersects the center of gravity (geometric center) G. Further, each of the first and second detection oscillation arms 42, 43 has a substantially rectangular transverse cross-sectional shape.

Further, a first detection signal electrode (electrode) 710a is formed on each of the upper surface and the lower surface (a pair of principal surfaces) of the first detection oscillation arm 42 as shown in FIG. 2A, and a second detection signal electrode (electrode) 710b is formed on each of the upper surface and the lower surface of the second detection oscillation arm 43 as shown in FIG. 2B.

Further, a first detection ground electrode (electrode) 720a is formed on each of the two side surfaces (a pair of side surfaces) of the first detection oscillation arm 42, and a second detection ground electrode (electrode) 720b is formed on each of the two side surfaces of the second detection oscillation arm 43. The first and second detection ground electrodes 720a, 720b have a ground potential with respect to the first and second detection signal electrodes 710a, 710b.

In the configuration shown in FIGS. 2A and 2B, in which each of the first detection oscillation arm 42 and the second detection oscillation arm 43 has a rectangular cross-sectional shape, a groove may be provided in at least one of the upper surface and the lower surface of each of the first and second detection oscillation arms 42, 43. In this case, the first detection signal electrode 710a (second detection signal electrode 710b) is desirably formed along the inner wall of the groove.

The thus shaped detection oscillation arm provides a smaller distance between the first detection signal electrode 710a (second detection signal electrode 710b) and the first detection ground electrodes 720a (second detection ground electrodes 720b) formed on the side surfaces, increasing electric field efficiency. The increased electric field efficiency allows a large amount of charge to be produced between the electrodes with a small amount of distortion, which contributes to high sensitivity.

When the first and second detection signal electrodes 710a, 710b and the first and second detection ground electrodes 720a, 720b are formed and arranged as described above, detectable oscillation produced in the first detection oscillation arm 42 appears in the form of charge between the first detection signal electrodes 710a and the first detection ground electrodes 720a, and the charge can be extracted as a signal (output signal). Similarly, detectable oscillation produced in the second detection oscillation arm 43 appears in the form of charge between the second detection signal electrodes 710b and the second detection ground electrodes 720b, and the charge can be extracted as a signal.

The first drive oscillation arm 46 has a front end portion 46a located on the front end side and a base end portion (asymmetrical portion) 46b located closer to the base end side. The front end portion 46a has a substantially rectangular transverse cross-sectional shape.

The base end portion 46b has a transverse cross-sectional shape (cross-sectional shape in Y-axis direction) asymmetrical with respect to the following two lines of the first drive oscillation arm 46: a central line L' in the X-axis direction; and a central line L" in the Z-axis direction, as shown in FIG. 3. When the base end portion 46b has the asymmetrical shape described above, the first drive oscillation arm 46 is allowed to make bending oscillation in a direction having two directional components in the X-axis and Z-axis directions, in other words, in a direction inclined to two axes, the X axis and the Z axis (hereinafter also simply referred to as "oblique oscillation" for ease of description), as will be described later.

Specifically, the base end portion 46b of the first drive oscillation arm 46 has an upper surface (first surface) 461 and a lower surface (second surface) 462, which face each other in the Z-axis direction and are formed in XY planes, and a pair of side surfaces 463 and 464, which connect the upper surface 461 and the lower surface 462 to each other. The base end portion 46b further has a first stepped portion 465 provided between the upper surface 461 and the side surface (first side surface) 463 and a second stepped portion 466 provided between the lower surface 462 and the side surface (second side surface) 464.

The first stepped portion 465 is formed on the side shifted from the central line L' toward the first detection oscillation arm 42. The thus formed first stepped portion 465 has a first stepped surface 465a, which is formed in a YZ plane and connected to the upper surface 461, and a second stepped surface 465b, which is formed in an XY plane and connected to the first stepped surface 465a and the side surface 463.

On the other hand, the second stepped portion 466 is formed on the opposite side (other side) of the central line L' to the first detection oscillation arm 42. The thus formed second stepped portion 466 has a third stepped surface 466a, which is formed in a YZ plane and connected to the lower surface 462, and a fourth stepped surface 466b, which is formed in an XY plane and connected to the third stepped surface 466a and the side surface 464. The thus shaped first drive oscillation arm 46 can be a drive arm having an oblique oscillation component.

The shape of the base end portion 46b described above can in other words be described as follows: That is, the base end portion 46b has a transverse cross-sectional shape having a contour formed of a first side L1 extending toward the (−) side in the X-axis direction, a second side L2 extending from the front end of the first side L1 toward the (−) side in the Z-axis direction, a third side L3 extending from the front end of the second side L2 toward the (−) side in the X-axis direction, a fourth side L4 extending from the front end of the third side L3 toward the (−) side in the Z-axis direction, a fifth side L5 extending from the front end of the fourth side L4 toward the (+) side in the X-axis direction, a sixth side L6 extending from the front end of the fifth side L5 toward the (+) side in the Z-axis direction, a seventh side L7 extending from the front end of the sixth side L6 toward the (+) side in the X-axis direction, and an eighth side L8 extending from the front end of the seventh side L7 toward the (+) side in the Z-axis direction and having the front end connected to the base end of the first side L1, as shown in FIG. 3.

The thus formed first stepped portion 465 and second stepped portion 466 are rotationally symmetrical with respect to a central axis O of the first drive oscillation arm 46. As a result, the two portions of the first drive oscillation arm 46 on opposite sides of the central line L' thereof can be substantially equal to each other in terms of mass, whereby the first drive oscillation arm 46 has a shape balanced in terms of mass.

It is noted that the first drive oscillation arm 46 in the present embodiment is so configured that the second stepped surface 465b of the first stepped portion 465 is flush with the fourth stepped surface 466b of the second stepped portion 466 in the Z-axis direction. Further, the first stepped surface 465a of the first stepped portion 465 is separated from the third stepped surface 466a of the second stepped portion 466 in the X-axis direction toward the first detection oscillation arm 42.

The configuration described above allows an area S1 sandwiched between the first stepped portion 465 and the second stepped portion 466 to have sufficient mechanical strength, whereby the first drive oscillation arm 46 is allowed to make oblique oscillation in a stable manner. Further, ensuring sufficient strength effectively prevents the first drive oscillation arm 46 from twisting and from producing unnecessary oscillation.

The thus formed first drive oscillation arm 46 has a pair of drive signal electrodes 730 and a pair of drive ground electrodes 740 formed thereon. Specifically, one of the pair of drive signal electrodes 730 is formed on the upper surface 461, and the other is formed on the lower surface 462. One of the pair of drive ground electrodes 740 is so formed that it covers the first stepped surface 465a, the second stepped surface 465b, and the side surface 463, and the other is so formed that it covers the side surface 464, the fourth stepped surface 466b, and the third stepped surface 466a. The drive ground electrodes 740 have a ground potential with respect to the drive signal electrodes 730. In addition, at least one of the upper surface 461 and the lower surface 462 can form a groove.

With the drive signal electrodes 730 and the drive ground electrodes 740 formed and arranged as described above, applying a drive signal between the drive signal electrodes 730 and the drive ground electrodes 740 produces an electric field between the drive signal electrodes 730 and the drive ground electrode 740 formed on the first drive oscillation arm 46, and the produced electric field causes the first drive oscillation arm 46 to oscillate. The same thing holds true for the second, third, and fourth drive oscillation arms 47, 48, 49, which will be described below.

Figure 4:
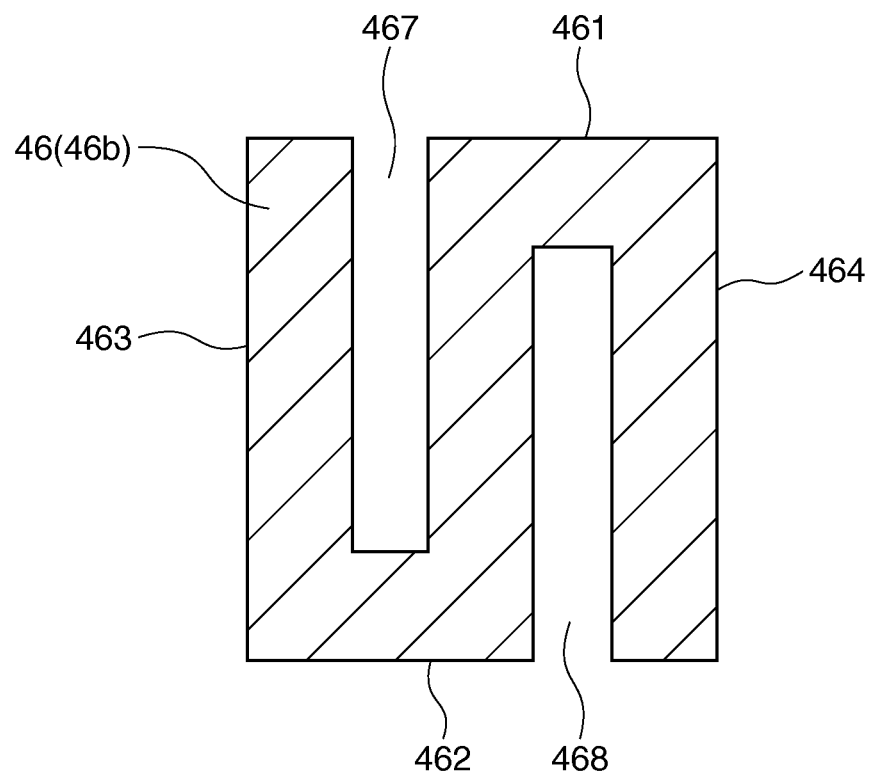
FIG. 4 is a cross-sectional view showing a variation of a drive oscillation arm shown in FIG. 3.

The shape of the first drive oscillation arm 46 that has been described above may be replaced, for example, with the shape shown in FIG. 4. That is, the base end portion 46b has an upper surface 461, a lower surface 462, a pair of side surfaces 463 and 464 that connect the upper surface 461 and the lower surface 462 to each other, a first groove 467 formed in the upper surface 461, and a second groove 468 formed in the lower surface 462. The first and second grooves 467, 468 are so formed that they are shifted from each other in the X-axis direction and overlap with each other in the X-axis direction. That is, the base end portion 46b has a substantially "S"-like transverse cross-sectional shape, which allows the first drive oscillation arm 46 to be an oscillation arm having a simple configuration and having an oblique oscillation component.

The first drive oscillation arm 46 can still alternatively have any of the shapes shown in FIGS. 5A to 5D. The shapes shown in FIGS. 5A to 5D have the same configuration as that in the present embodiment except that the shapes of the first stepped portion 465 and the second stepped portion 466 (aspect ratio between width and thickness) differ from those in the present embodiment. FIGS. 5A to 5D also show auxiliary lines representing 0%, 50%, 100% of the width of the first drive oscillation arm 46 and 0%, 50%, 100% of the thickness of the first drive oscillation arm 46 for ease of description. Further, in FIGS. 5A to 5D, the variety of electrodes are omitted for ease of description.

Figure 5A:
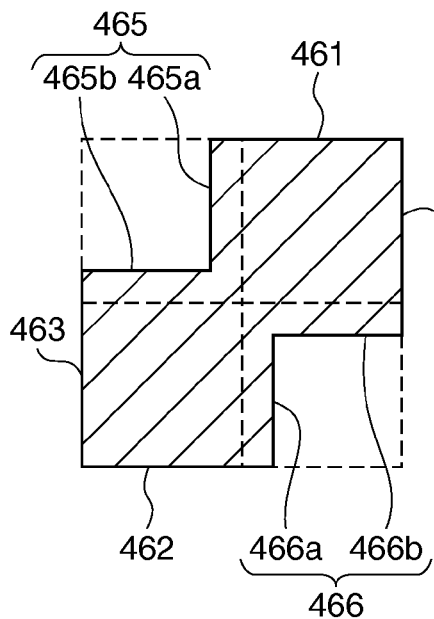
FIGS. 5A to 5D are cross-sectional views showing other variations of the drive oscillation arm shown in FIG. 3.

The first drive oscillation arm 46 shown in FIG. 5A is so configured that the second stepped surface 465b of the first stepped portion 465 is separated from the fourth stepped surface 466b of the second stepped portion 466 in the Z-axis direction toward the upper surface 461, and that the first stepped surface 465a of the first stepped portion 465 is separated from the third stepped surface 466a of the second stepped portion 466 in the X-axis direction toward the first detection oscillation arm 42.

Figure 5B:
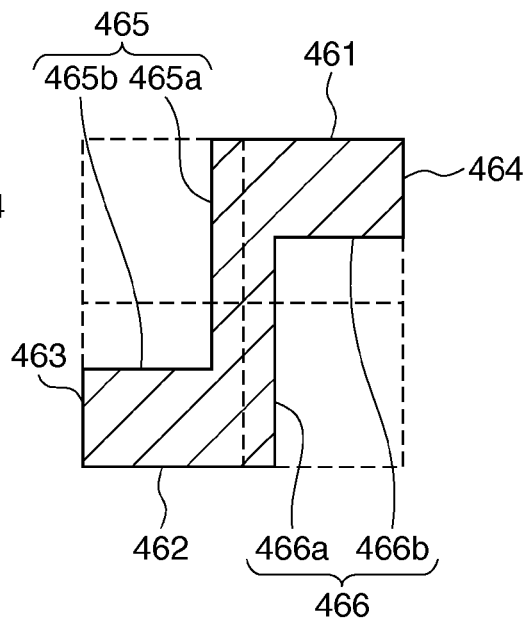

The first drive oscillation arm 46 shown in FIG. 5B is so configured that the second stepped surface 465b of the first stepped portion 465 is separated from the fourth stepped surface 466b of the second stepped portion 466 in the Z-axis direction toward the lower surface 462, and that the first stepped surface 465a of the first stepped portion 465 is separated from the third stepped surface 466a of the second stepped portion 466 in the X-axis direction toward the first detection oscillation arm 42.

Figure 5C:
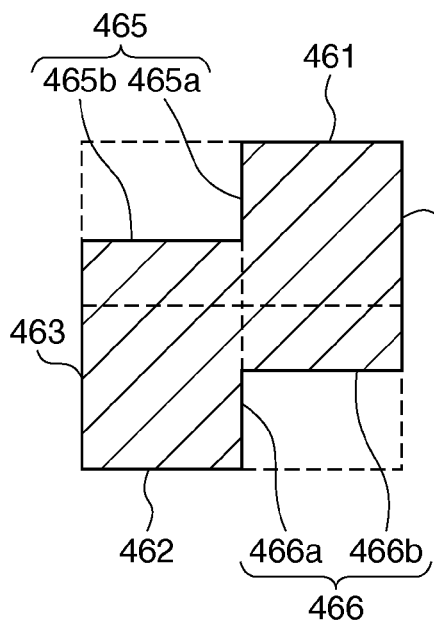

The first drive oscillation arm 46 shown in FIG. 5C is so configured that the second stepped surface 465b of the first stepped portion 465 is separated from the fourth stepped surface 466b of the second stepped portion 466 in the Z-axis direction toward the upper surface 461, and that the first stepped surface 465a of the first stepped portion 465 is flush with the third stepped surface 466a of the second stepped portion 466 in the X-axis direction.

Figure 5D:
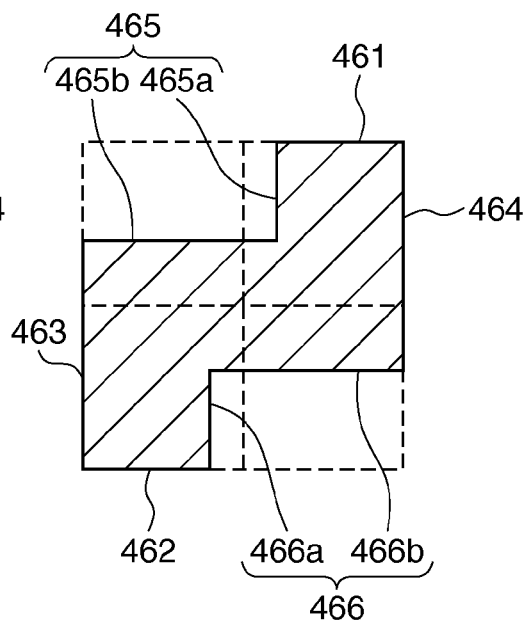

The first drive oscillation arm 46 shown in FIG. 5D is so configured that the second stepped surface 465b of the first stepped portion 465 is separated from the fourth stepped surface 466b of the second stepped portion 466 in the Z-axis direction toward the upper surface 461, and that the first stepped surface 465a of the first stepped portion 465 is separated from the third stepped surface 466a of the second stepped portion 466 in the X-axis direction away from the first detection oscillation arm 42.

The simple configurations shown in FIGS. 5A to 5D described above also allow the first drive oscillation arm 46 to make oblique oscillation. In addition, at least one of the upper surface 461 and the lower surface 462 can form a groove.

The third drive oscillation arm 48 has the same configuration as that of the first drive oscillation arm 46 except that they are symmetrical with respect to the XZ plane that intersects the center of gravity G. The configuration of the third drive oscillation arm 48 will therefore not be described.

The third drive oscillation arm 48 has a pair of drive signal electrodes 730 and a pair of drive ground electrodes 740 formed thereon, as shown in FIG. 2B. One of the pair of drive signal electrodes 730 is formed on an upper surface 481, and the other is formed on a lower surface 482. One of the pair of drive ground electrodes 740 is so formed that it covers a first stepped surface 485a, a second stepped surface 485b, and a side surface 483, and the other is so formed that it covers a side surface 484, a fourth stepped surface 486b, and a third stepped surface 486a.

The second drive oscillation arm 47 has the same configuration as that of the first drive oscillation arm 46 except that they are symmetrical with respect to the YZ plane that intersects the center of gravity G. The configuration of the second drive oscillation arm 47 will therefore not be described.

The second drive oscillation arm 47 has a pair of drive signal electrodes 730 and a pair of drive ground electrodes 740 formed thereon, as shown in FIG. 2A. One of the pair of drive signal electrodes 730 is so formed that it covers a first stepped surface 475a, a second stepped surface 475b, and a side surface 473, and the other is so formed that it covers a side surface 474, a fourth stepped surface 476b, and a third stepped surface 476a. One of the pair of drive ground electrodes 740 is formed on an upper surface 471, and the other is formed on a lower surface 472.

The fourth drive oscillation arm 49 has the same configuration as that of the third drive oscillation arm 48 except that they are symmetrical with respect to the YZ plane that intersects the center of gravity G. The configuration of the fourth drive oscillation arm 49 will therefore not be described.

The fourth drive oscillation arm 49 has a pair of drive signal electrodes 730 and a pair of drive ground electrodes 740 formed thereon, as shown in FIG. 2B. One of the pair of drive signal electrodes 730 is so formed that it covers a first stepped surface 495a, a second stepped surface 495b, and a side surface 493, and the other is so formed that it covers a side surface 494, a fourth stepped surface 496b, and a third stepped surface 496a. One of the pair of drive ground electrodes 740 is formed on an upper surface 491, and the other is formed on a lower surface 492.

The first to fourth drive oscillation arms 46 to 49 have been described above. The oscillation components of the first to fourth drive oscillation arms 46 to 49 in the Z-axis direction are oriented in the same direction. Further, the oscillation components of the first and third drive oscillation arms 46, 48 in the X-axis direction and the oscillation components of the second and fourth drive oscillation arms 47, 49 in the X-axis direction are oriented in opposite directions. When the first to fourth drive oscillation arms 46 to 49 have their oscillation components as described above, the four oscillation arms 46 to 49 are allowed to oscillate in a well balanced manner, whereby oscillation leakage can be suppressed.

Each of the electrodes described above can, for example, be formed on the surfaces of the oscillation piece 3 and formed of a substrate layer made of chromium on which gold is plated. The electrode configuration improves adherence between the electrode and the oscillation piece 3 and hence the reliability of the gyro sensor 2.

The configuration of the gyro sensor 2 has been described above. The gyro sensor 2 detects an angular velocity $\omega y$ around the Y axis and an angular velocity $\omega z$ around the Z axis as will be described below. The following description will be made with reference to FIGS. 6A and 6B, 7, and 8. In FIGS. 6A and 6B, the electrodes are omitted for ease of description.

FIG. 6A is a cross-sectional view corresponding to the cross-sectional view taken along the line A-A in FIG. 1, and FIG. 6B is a cross-sectional view corresponding to the cross-sectional view taken along the line B-B in FIG. 1.

When an AC voltage is applied between the drive signal electrodes 730 and the drive ground electrodes 740 with no angular velocity applied, each of the first to fourth drive oscillation arms 46 to 49, which have the asymmetrical portions, makes oblique oscillation, as shown in FIGS. 6A and 6B. The first and third drive oscillation arms 46, 48 and the second and fourth drive oscillation arms 47, 49 oscillate in a plane-symmetrical manner with respect to the YZ plane that intersects the center of gravity G.

In this process, since the first and third drive oscillation arms 46, 48 and the second and fourth drive oscillation arms 47, 49 oscillate in a plane-symmetrical manner with respect to the YZ plane that passes through the center of gravity G as described above, the oscillation actions of the first to fourth drive oscillation arms 46 to 49 in the X-axis direction cancel each other. The first and second detection oscillation arms 42, 43 therefore hardly oscillate in the X-axis direction. On the other hand, since the first to fourth drive oscillation arms 46 to 49 oscillate in the Z-axis direction toward the same side, the oscillation actions of the first to fourth drive oscillation arms 46 to 49 in the Z-axis direction do not cancel each other. As a result, the first and second detection oscillation arms 42, 43 make bending oscillation in the Z-axis direction but in the direction opposite to the direction in which the first to fourth drive oscillation arms 46 to 49 oscillate so that the first and second detection oscillation arms 42, 43 and the first to fourth drive oscillation arms 46 to 49 oscillate in a balanced manner, as shown in FIGS. 6A and 6B. The oscillation directions of the first to fourth drive oscillation arms 46 to 49 are not limited to those shown in FIGS. 6A and 6B and may, for example, be opposite to those shown in FIGS. 6A and 6B. The oscillation directions are selected as appropriate in accordance with a desired frequency and how to drive the drive oscillation arms.

When an angular velocity $\omega z$ around the Z axis is applied to the gyro sensor 2 in this state, Coriolis forces A act on the drive oscillation arms, and oscillation indicated by the arrows B (around-Z-axis angular velocity detection oscillation mode) is induced by the Coriolis forces A as a drive force, as shown in FIG. 7. The oscillation deforms the first and second detection oscillation arms 42, 43 in opposite directions along the X axis. Further, the frequency in the detection oscillation mode is preferably within ±10% of the drive frequency. The oscillation directions of the first and second detection oscillation arms 42, 43 can in other words be described as follows: The first and second detection oscillation arms 42, 43 oscillate in the same rotational direction around the Z axis. The reason for this is that since the first to fourth drive oscillation arms 46 to 49 oscillate as shown in FIG. 7 under the Coriolis forces A and the first and second detection oscillation arms 42, 43 extend upward and downward from the base 41 respectively (in opposite directions in the Y-axis direction), the first detection oscillation arm 42 deforms in correspondence with the first and second drive oscillation arms 46, 47, and the second detection oscillation arm 43 deforms in correspondence with the third and fourth drive oscillation arms 48, 49.

On the other hand, when an angular velocity $\omega y$ around the Y axis is applied to the gyro sensor 2 in the state described above, Coriolis forces A act on the drive oscillation arms, and oscillation indicated by the arrows B (around-Y-axis angular velocity detection oscillation mode) is induced by the Coriolis forces A as a drive force, as shown in FIG. 8. The oscillation deforms the first and second detection oscillation arms 42, 43 in the same direction along the X axis. Further, the frequency in the detection oscillation mode is preferably within ±10% of the drive frequency. The oscillation directions of the first and second detection oscillation arms 42, 43 can in other words be described as follows: The first and second detection oscillation arms 42, 43 oscillate in the same direction along the X axis. The reason for this is that since the first to fourth drive oscillation arms 46 to 49 oscillate as shown in FIG. 8 under the Coriolis forces A and the first and second detection oscillation arms 42, 43 receive Coriolis forces acting in the same direction along the X axis but in the direction opposite to the direction of the Coriolis forces acting on the first to fourth drive oscillation arms 46 to 49, the first and second detection oscillation arms 42, 43 oscillate in the same direction in the X-axis direction.

The gyro sensor 2 can detect an angular velocity $\omega z$ around the Z axis and an angular velocity $\omega y$ around the Y axis independently based on the difference described above between the directions in which the detection oscillation arms 42 and 43 oscillate when the angular velocity $\omega z$ is applied and when the angular velocity $\omega y$ is applied.

A specific description will be made with reference to FIGS. 2A and 2B. When an angular velocity $\omega z$ is applied, a signal (voltage) V1 extracted from the first detection signal electrodes 710a and the first detection ground electrodes 720a is a signal (voltage) +Vz resulting from the angular velocity $\omega z$, and a signal (voltage) V2 extracted from the second detection signal electrodes 710b and the second detection ground electrodes 720b is a signal (voltage) −Vz resulting from the angular velocity $\omega z$. That is, V1=+Vz, and V2=−Vz.

On the other hand, when an angular velocity $\omega y$ is applied, the signal V1 extracted from the first detection signal electrodes 710a and the first detection ground electrodes 720a is a signal +Vy resulting from the angular velocity $\omega y$, and the signal V2 extracted from the second detection signal electrodes 710b and the second detection ground electrodes 720b is a signal +Vy resulting from the angular velocity $\omega y$. That is, V1=+Vy, and V2=+Vy. The reason why the signals V1 and V2 have the same sign is that the distortion detection units are configured to output signals having different signs when an angular velocity around the Z axis is applied as described above.

When an angular velocity $\omega yz$ around an axis having two directional components in the Y-axis direction and the Z-axis direction (that is, an axis inclined to the Y axis and the Z axis) is applied to the thus configured gyro sensor 2, the signal V1 extracted from the first detection signal electrodes 710a and the first detection ground electrodes 720a is (+Vy)+(+Vz), and the signal V2 extracted from the second detection signal electrodes 710b and the second detection ground electrodes 720b is (+Vy)+(−Vz). That is, V1=Vy+Vz, and V2=Vy−Vz.

The thus produced signals V1 and V2 can be used to separate the angular velocity $\omega y$ around the Y axis and the angular velocity $\omega z$ around the Z axis from the angular velocity $\omega yz$ so that the angular velocity $\omega y$ and the angular velocity $\omega z$ can be detected respectively independently by performing addition or subtraction of the signals. Specifically, V1+V2=2Vy, which means that the signals Vz resulting from the angular velocity $\omega z$ can be eliminated. The angular velocity $\omega y$ around the Y axis is thus determined. Conversely, V1−V2=2Vz, which means that the signals Vy resulting from the angular velocity $\omega y$ can be eliminated. The angular velocity $\omega z$ around the Z axis is thus determined. The gyro sensor 2 can therefore readily detect an angular velocity $\omega y$ around the Y axis and an angular velocity $\omega z$ around the Z axis independently. Calculation of this type can be made by using an IC chip or any other component (not shown) connected to the gyro sensor 2.

It is noted that the signs of the signals "Vz" and "Vy" described above are reversed depending on a wiring configuration. That is, in the above description, "+Vz" becomes "−Vz", "−Vz" becomes "+Vz", "+Vy" becomes "−Vy", and "−Vy" becomes "+Vy" in some cases.

Second Embodiment

Figure 9:
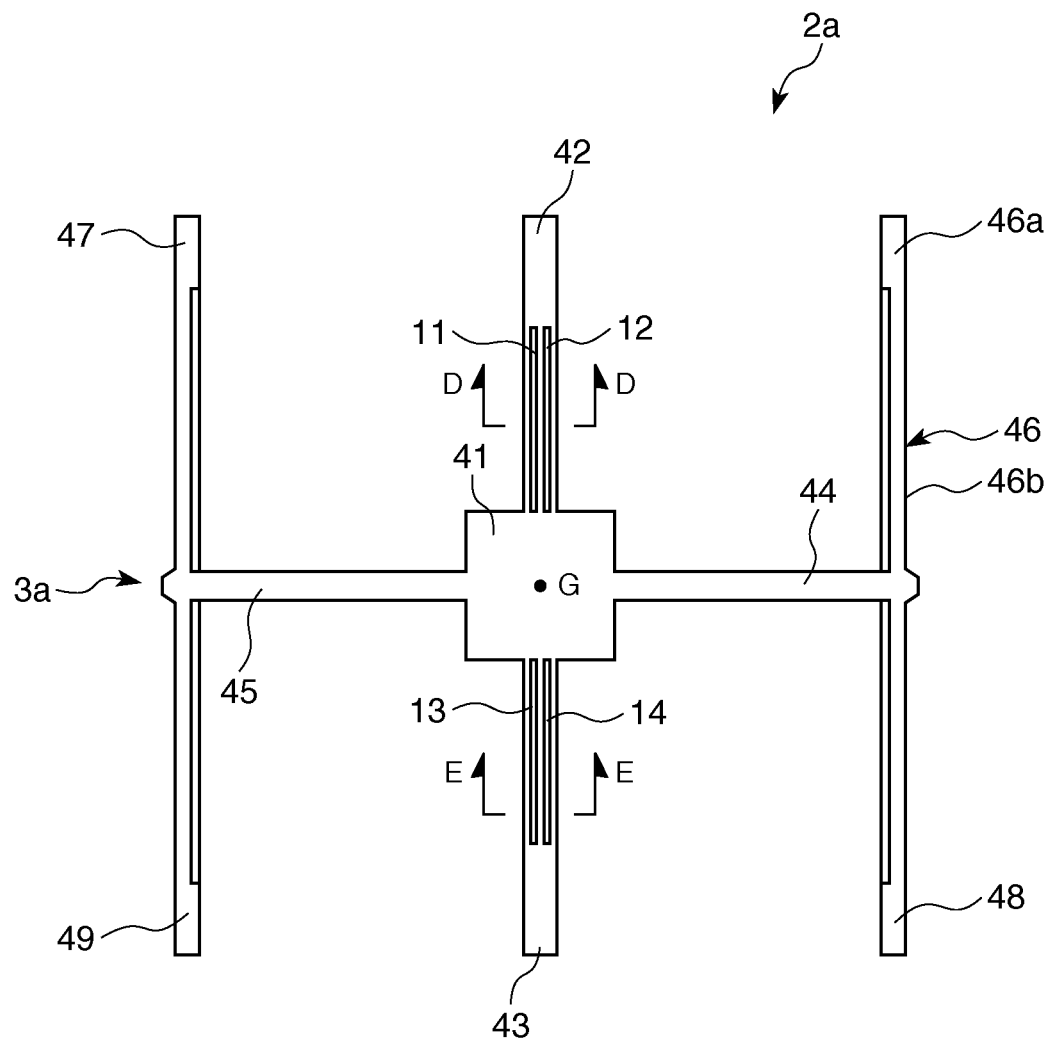
FIG. 9 is a plan view showing a gyro sensor according to a second embodiment of the invention.
Figure 10A:
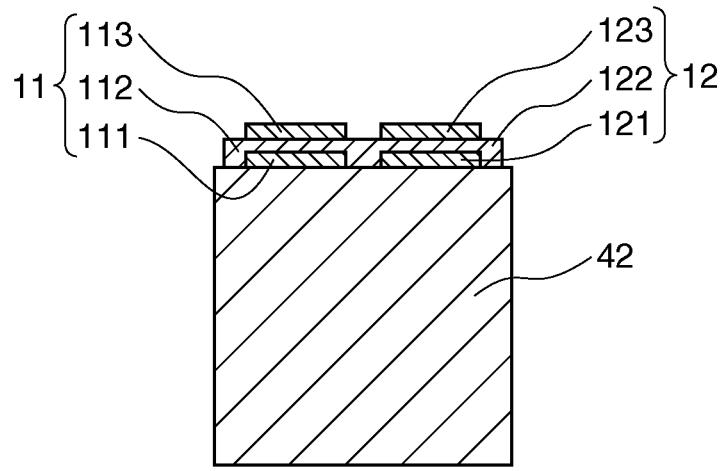
FIG. 10A is a cross-sectional view of the gyro sensor taken along the line D-D in FIG. 9.
Figure 10B:
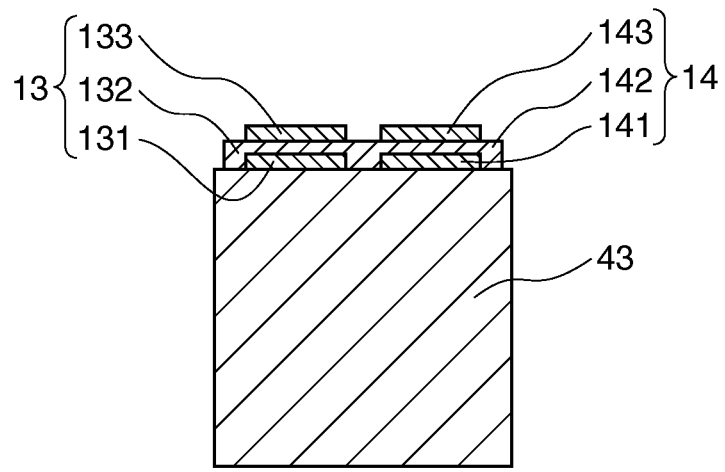
FIG. 10B is a cross-sectional view of the gyro sensor taken along the line E-E in FIG. 9.

A gyro sensor according to a second embodiment of the invention will next be described. FIG. 9 is a plan view of the gyro sensor according to the second embodiment of the invention. FIG. 10A is a cross-sectional view of the gyro sensor taken along the line D-D in FIG. 9, and FIG. 10B is a cross-sectional view of the gyro sensor taken along the line E-E in FIG. 9. The gyro sensor according to the second embodiment will be described below primarily about differences from the embodiment described above, and the same items will not be described. The gyro sensor according to the second embodiment of the invention is the same as the gyro sensor according to the first embodiment described above except how to extract output signals from the first and second detection oscillation arms. The same components as those in the first embodiment described above have the same reference characters.

In a gyro sensor 2a according to the present embodiment, piezoelectric devices 11 and 12 are formed side by side in the X-axis direction on the +Z-axis-side upper surface (principal surface) of the first detection oscillation arm 42, as shown in FIGS. 9 and 10A. The piezoelectric device 11 is formed by stacking a first electrode 111, a piezoelectric film 112, and a second electrode 113 in this order, and the piezoelectric device 12 is formed by stacking a first electrode 121, a piezoelectric film 122, and a second electrode 123 in this order. The piezoelectric films 112 and 122 are formed, but not necessarily, integrally with each other.

Similarly, piezoelectric devices 13 and 14 are formed side by side in the X-axis direction on the +Z-axis-side upper surface (principal surface) of the second detection oscillation arm 43. The piezoelectric device 13 is formed by stacking a first electrode 131, a piezoelectric film 132, and a second electrode 133 in this order, and the piezoelectric device 14 is formed by stacking a first electrode 141, a piezoelectric film 142, and a second electrode 143 in this order. The piezoelectric films 132 and 142 are formed integrally with each other, but the piezoelectric films 132 and 142 are not necessarily formed integrally with each other.

In the configuration described above, when the first detection oscillation arm 42 oscillates in a detection mode in which at least one of an angular velocity ωy and an angular velocity ωz is so applied to the gyro sensor that it oscillates, the piezoelectric devices 11 and 12 are expanded or shrunk, whereby the distortion of the first detection oscillation arm 42 can be extracted as signals (output signals) produced between the first electrode 111 and the second electrode 113 and between the first electrode 121 and the second electrode 123. Similarly, the distortion of the second detection oscillation arm 43 can be extracted as signals (output signals) produced between the first electrode 131 and the second electrode 133 and between the first electrode 141 and the second electrode 143.

The signals thus extracted from the piezoelectric devices 11 to 14 are processed as in the same manner in the first embodiment described above, whereby the angular velocity ωy and the angular velocity ωz can be detected independently. Using the piezoelectric devices 11 to 14 allows the distortion of each of the first and second detection oscillation arms 42, 43 to be extracted as a signal in a simple configuration but in a more reliable manner.

The second embodiment described above can also provide the same advantageous effect as that provided in the first embodiment described above.

Third Embodiment

Figure 11:
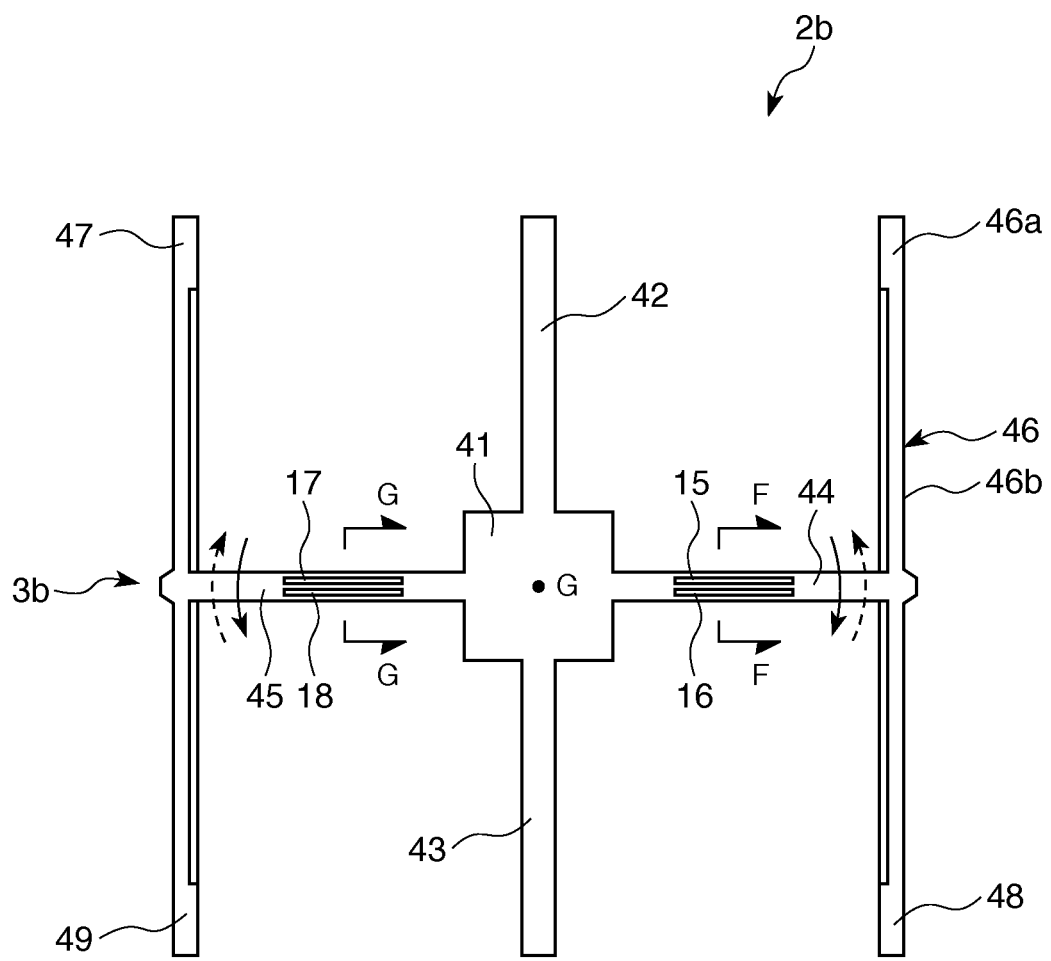
FIG. 11 is a plan view showing a gyro sensor according to a third embodiment of the invention.
Figure 12A:
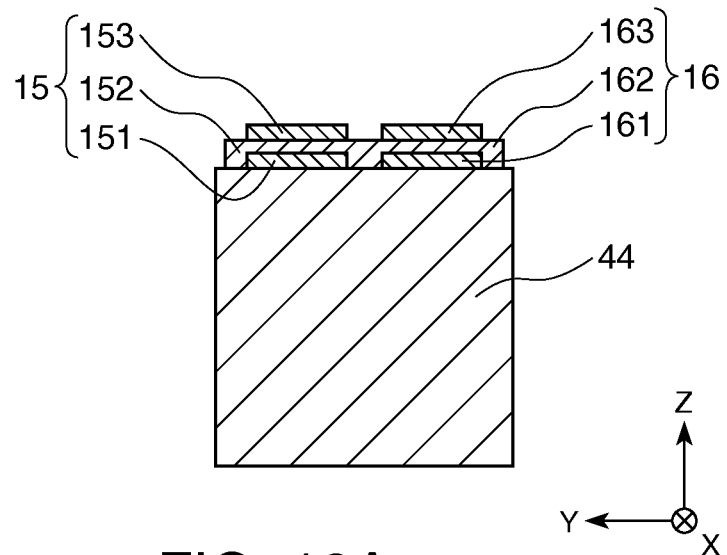
FIG. 12A is a cross-sectional view of the gyro sensor taken along the line F-F in FIG. 11.
Figure 12B:
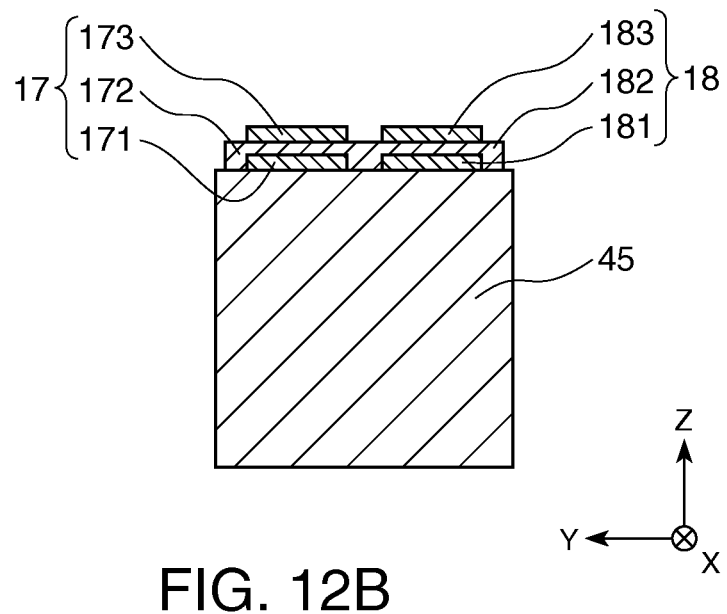
FIG. 12B is a cross-sectional view of the gyro sensor taken along the line G-G in FIG. 11.

A gyro sensor according to a third embodiment of the invention will next be described. FIG. 11 is a plan view of the gyro sensor according to the third embodiment of the invention. FIG. 12A is a cross-sectional view of the gyro sensor taken along the line F-F in FIG. 11, and FIG. 12B is a cross-sectional view of the gyro sensor taken along the line G-G in FIG. 11. The gyro sensor according to the third embodiment will be described below primarily about differences from the embodiments described above, and the same items will not be described. The gyro sensor according to the third embodiment of the invention is the same as the gyro sensor according to the first embodiment described above except that each of the first and second connection arms has a detection unit provided therein. The same components as those in the first embodiment described above have the same reference characters.

A gyro sensor 2b according to the present embodiment has a detection unit for detecting an angular velocity ωx around the X axis. Piezoelectric devices 15 and 16 are formed side by side in the Y-axis direction on the +Z-axis-side upper surface (principal surface) of the first connection arm 44, as shown in FIGS. 11 and 12A. The piezoelectric device 15 is formed by stacking a first electrode 151, a piezoelectric film 152, and a second electrode 153 in this order, and the piezoelectric device 16 is formed by stacking a first electrode 161, a piezoelectric film 162, and a second electrode 163 in this order. The piezoelectric films 152 and 162 are, but not necessarily, formed integrally with each other.

Similarly, piezoelectric devices 17 and 18 are formed side by side in the Y-axis direction on the +Z-axis-side upper surface (principal surface) of the second connection arm 45. The piezoelectric device 17 is formed by stacking a first electrode 171, a piezoelectric film 172, and a second electrode 173 in this order, and the piezoelectric device 18 is formed by stacking a first electrode 181, a piezoelectric film 182, and a second electrode 183 in this order. The piezoelectric films 172 and 182 are formed, but not necessarily, integrally with each other.

In the configuration described above, when an angular velocity ωx around the X axis is applied with the first to fourth drive oscillation arms 46 to 49 oscillating as in the first embodiment described above, Coriolis forces act on the drive oscillation arms, and oscillation of the first and second connection arms 44, 45 in the Y-axis direction (in-plane direction) indicated by the arrows in FIG. 11 is induced under the Coriolis forces as a drive force. The angular velocity ωx can be detected by extracting the distortion of the first connection arm 44 resulting from the oscillation as signals (output signals) produced between the first electrode 151 and the second electrode 153 and between the first electrode 161 and the second electrode 163 and the distortion of the second connection arm 45 resulting from the oscillation as signals (output signals) produced between the first electrode 171 and the second electrode 173 and between the first electrode 181 and the second electrode 183. The thus configured gyro sensor 2b can detect angular velocities around the X, Y, and Z axes independently.

The signals thus extracted from the piezoelectric devices 15 to 18 are processed as in the same manner in the first embodiment described above, whereby the angular velocity ωy and the angular velocity ωz can be detected independently. Using the piezoelectric devices 15 to 18 allows the distortion of each of the first and second detection oscillation arms 42, 43 to be extracted as a signal in a simple configuration but in a more reliable manner.

The third embodiment described above can also provide the same advantageous effect as that provided in the first embodiment described above.

Fourth Embodiment

Figure 13:
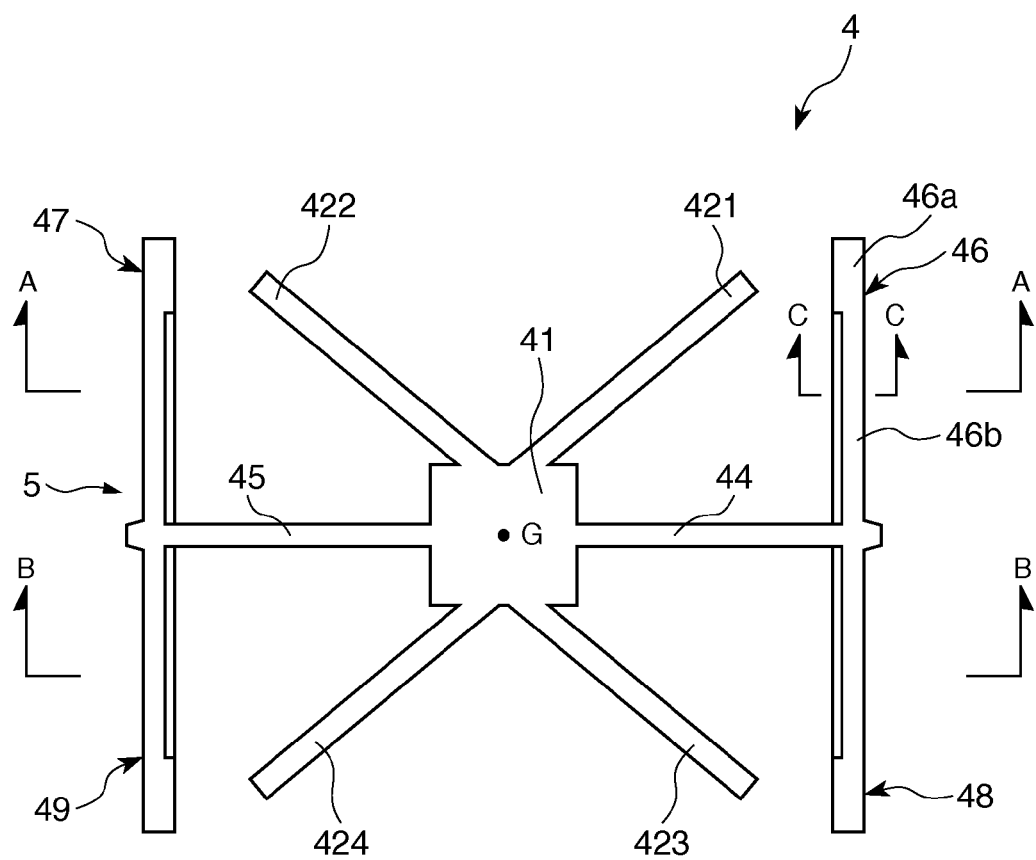
FIG. 13 is a plan view showing a gyro sensor according to a fourth embodiment of the invention.
Figure 17:
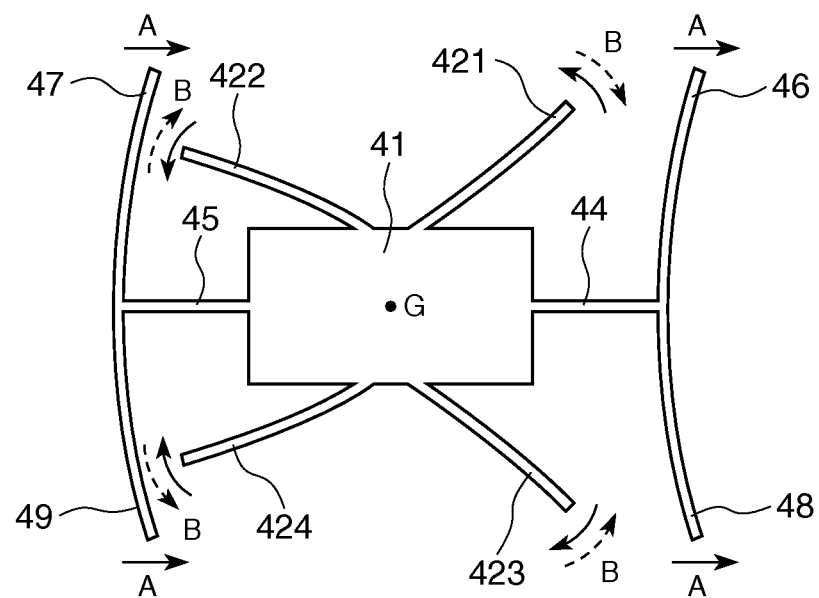
FIG. 17 is a plan view showing the gyro sensor oscillating when an angular velocity around the Y axis is applied thereto.

A gyro sensor according to a fourth embodiment of the invention will next be described. FIG. 13 is a plan view showing the gyro sensor according to the fourth embodiment of the invention. FIG. 14A is a cross-sectional view of the gyro sensor taken along the line A-A in FIG. 13, and FIG. 14B is a cross-sectional view of the gyro sensor taken along the line B-B in FIG. 13. FIGS. 15A and 15B are cross-sectional views for describing the gyro sensor shown in FIG. 13 that is driven. FIG. 16 is a plan view showing the gyro sensor oscillating when an angular velocity around a Z axis is applied thereto. FIG. 17 is a plan view showing the gyro sensor oscillating when an angular velocity around a Y axis is applied thereto. FIG. 18 is a plan view showing the gyro sensor oscillating when an angular velocity around an X axis is applied thereto.

In the following description, three axes perpendicular to each other are called an X axis (first axis), a Y axis (second axis), and a Z axis (third axis), as shown in FIG. 13. The direction parallel to the X axis is also called an "X-axis direction." The direction parallel to the Y axis is also called a "Y-axis direction." The direction parallel to the Z axis is also called a "Z-axis direction." A plane defined by the X axis and the Y axis is also called an "XY plane." A plane defined by the Y axis and the Z axis is also called a "YZ plane." A plane defined by the Z axis and the X axis is also called an "XZ plane."

A gyro sensor 4 shown in FIG. 13 is capable of detecting an angular velocity ωx around the X axis, an angular velocity ωy around the Y axis, and an angular velocity ωz around the Z axis independently. The gyro sensor 4 is formed of an oscillation piece 5 and a plurality of electrodes formed on the oscillation piece 5.

The oscillation piece 5 is made of a piezoelectric material. Examples of the piezoelectric material may include quartz, lithium tantalate, lithium niobate, lithium borate, and barium titanate. In particular, quartz is a preferable piezoelectric material of which the oscillation piece 5 is made. When the oscillation piece 5 is made of quartz, the oscillation piece 5 can have excellent oscillation characteristics (frequency-temperature characteristic, in particular). Further, the oscillation piece 5 made of quartz can be formed in an etching process with high dimensional precision.

The thus formed oscillation piece 5 extends in the XY plane including the X and Y axes, has a thickness in the Z-axis direction, and includes a base 41, first, second, third, and fourth detection oscillation arms 421, 422, 423, 424 as the detection oscillation arms, first and second connection arms 44, 45, and first, second, third, and fourth drive oscillation arms 46, 47, 48, 49.

The base 41 is located at the center of the oscillation piece 5. The first and second detection oscillation arms 421, 422 and the third and fourth detection oscillation arms 423, 424 extend from the base 41 in opposite directions in the Y-axis direction. The first connection arm 44 and the second connection arm 45 extend from the base 41 in opposite directions in the X-axis direction. The first drive oscillation arm 46 and the third drive oscillation arm 48 extend from a front end portion of the first connection arm 44 in opposite directions in the Y-axis direction. The second drive oscillation arm 47 and the fourth drive oscillation arm 49 extend from a front end portion of the second connection arm 45 in opposite directions in the Y-axis direction.

In the configuration shown in FIG. 13, the width of each of the first connection arm 44 and the second connection arm 45 is smaller than the width of the base 41. The base 41 and the first and second connection arms 44, 45 may alternatively have the same width so that they are integrated with each other. Further, the first and third drive oscillation arms 46, 48 may alternatively extend from a portion of the first connection arm 44 somewhere middle in the direction in which it extends, and the second and fourth drive oscillation arms 47, 49 may similarly extend from a portion of the second connection arm 45 somewhere middle in the direction in which it extends.

Each of the first, second, third, and fourth drive oscillation arms 46, 47, 48, 49 and the first, second, third, and fourth detection oscillation arms 421, 422, 423, 424 may have a front end portion wider or thicker than a base portion (what is called hammerhead shape). A hammerhead-shaped front end of each of the oscillation arms increases the displacement of the oscillation arm when it is driven or the displacement thereof to be detected.

Each of the first detection oscillation arm 421 and the second detection oscillation arm 422 extends from one end of the base 41 (the end on the upper side or in the (+) Y-axis direction in FIG. 13) toward one side in the Y-axis direction. Further, each of the first detection oscillation arm 421 and the second detection oscillation arm 422 extends in a direction inclined to the X axis and the Y axis, and hence the distance between the two detection oscillation arms gradually increases toward their front end sides (that is, the two detection oscillation arms extend in opposite directions in the X-axis direction). The first detection oscillation arm 421 and the second detection oscillation arm 422 are formed symmetrically with respect to the YZ plane that passes through the center of gravity G (geometrical center) of the oscillation piece 5.

Similarly, each of the third detection oscillation arm 423 and the fourth detection oscillation arm 424 extends from the other end of the base 41 toward the other side in the Y-axis direction. Further, each of third detection oscillation arm 423 and the fourth detection oscillation arm 424 extends in a direction inclined to the X axis and the Y axis, and hence the distance between the two detection oscillation arms gradually increases toward their front end sides (that is, the two detection oscillation arms extend in opposite directions in the X-axis direction). The third detection oscillation arm 423 and the fourth detection oscillation arm 424 are formed symmetrically with respect to the YZ plane that passes through the center of gravity G.

Further, the first and second detection oscillation arms 421, 422 and the third and fourth detection oscillation arms 423, 424 are formed symmetrically with respect to the XZ plane that passes through the center of gravity G. Each of the first to fourth detection oscillation arms 421 to 424 has a substantially rectangular transverse cross-sectional shape.

When the oscillation piece 5 is made of quartz, the direction in which each of the first to fourth detection oscillation arms 421 to 424 extends preferably agrees with a direction perpendicular to the polarization direction of the quartz, whereby excellent detection precision is provided.

Further, a first detection signal electrode (electrode) 710*a* is formed on each of the upper surface and the lower surface of the first detection oscillation arm 421, as shown in FIG. 14A. Similarly, a second detection signal electrode 710*b* is formed on each of the upper surface and the lower surface of the second detection oscillation arm 422, as shown in FIG. 14A. A third detection signal electrode 710*c* is formed on each of the upper surface and the lower surface of the third detection oscillation arm 423, as shown in FIG. 14B. A fourth detection signal electrode 710*d* is formed on each of the upper surface and the lower surface of the fourth detection oscillation arm 424, as shown in FIG. 14B.

Further, a first detection ground electrode (electrode) 720*a* is formed on each of the two side surfaces of the first detection oscillation arm 421. Similarly, a second detection ground electrode 720*b* is formed on each of the two side surfaces of the second detection oscillation arm 422. A third detection ground electrode 720*c* is formed on each of the two side surfaces of the third detection oscillation arm 423. A fourth detection ground electrode 720*d* is formed on each of the two side surfaces of the fourth detection oscillation arm 424. The thus formed first to fourth detection ground electrodes 720*a* to 720*d* have a ground potential with respect to the first to fourth detection signal electrodes 710*a* to 710*d*.

In the configuration shown in FIGS. 14A and 14B, in which each of the first to fourth detection oscillation arms 421 to 424 has a rectangular cross-sectional shape, a groove may be provided in at least one of the upper surface and the lower surface of each of the first to fourth detection oscillation arms 421 to 424. In this case, the first detection signal electrode 710*a* (second to fourth detection signal electrodes 710*b* to 710*d*) is desirably formed along the inner wall of the groove. The thus shaped detection oscillation arm provides a smaller distance between the first detection signal electrode 710*a* (second to fourth detection signal electrodes 710*b* to 710*d*) and the first detection ground electrodes 720*a* (second to fourth detection ground electrodes 720*b* to 720*d*) formed on the side surfaces, increasing electric field efficiency. The increased electric field efficiency allows a large amount of charge to be produced between the electrodes with a small amount of distortion, which contributes to high sensitivity.

When the first to fourth detection signal electrodes 710*a* to 710*d* and the first to fourth detection ground electrodes 720*a* to 720*d* are formed and arranged as described above, detectable oscillation produced in the first detection oscillation arm 421 appears in the form of charge between the first detection signal electrodes 710*a* and the first detection ground electrodes 720*a*, and the charge can be extracted as a signal. Similarly, detectable oscillation produced in the second detection oscillation arm 422 appears in the form of charge between the second detection signal electrodes 710*b* and the second detection ground electrodes 720*b*, and the charge can be extracted as a signal. Detectable oscillation produced in the third detection oscillation arm 423 appears in the form of charge between the third detection signal electrodes 710*c* and the third detection ground electrodes 720*c*, and the charge can be extracted as a signal. Detectable oscillation produced in the fourth detection oscillation arm 424 appears in the form of charge between the fourth detection signal electrodes 710*d* and the fourth detection ground electrodes 720*d*, and the charge can be extracted as a signal.

The first to fourth drive oscillation arms will next be described. The first to fourth drive oscillation arms have the same configurations as those in the first embodiment described above, and the following description will be made with reference to FIGS. 1, 3, 4, and 5A to 5D used in the description of the first embodiment.

The first drive oscillation arm 46 has a front end portion 46*a* located on the front end side and a base end portion (asymmetrical portion) 46*b* located closer to the base end side. The front end portion 46*a* has a substantially rectangular transverse cross-sectional shape.

The base end portion 46*b* has a transverse cross-sectional shape (cross-sectional shape in the Y-axis direction) asymmetrical with respect to the following two lines of the first drive oscillation arm 46: a central line L' in the X-axis direction and a central line L" in the Z-axis direction, as shown in FIG. 3. When the base end portion 46*b* has the asymmetrical shape described above, the first drive oscillation arm 46 is allowed to make bending oscillation in a direction having two directional components in the X-axis and Z-axis directions, in other words, in a direction inclined to two axes, the X axis and the Z axis (hereinafter also simply referred to as "oblique oscillation" for ease of description).

Specifically, the base end portion 46*b* of the first drive oscillation arm 46 has an upper surface (first surface) 461 and a lower surface (second surface) 462, which face each other in the Z-axis direction and are formed in XY planes, and a pair of side surfaces 463 and 464, which connect the upper surface 461 and the lower surface 462 to each other. The base end portion 46*b* further has a first stepped portion 465 provided between the upper surface 461 and the side surface (first side surface) 463 and a second stepped portion 466 provided between the lower surface 462 and the side surface (second side surface) 464.

The first stepped portion 465 is formed on the side shifted from the central line L' toward the first detection oscillation arm 421. The thus formed first stepped portion 465 has a first stepped surface 465*a*, which is formed in a YZ plane and connected to the upper surface 461, and a second stepped surface 465*b*, which is formed in an XY plane and connected to the first stepped surface 465*a* and the side surface 463.

On the other hand, the second stepped portion 466 is formed on the opposite side (other side) of the central line L' to the first detection oscillation arm 421. The thus formed second stepped portion 466 has a third stepped surface 466*a*, which is formed in a YZ plane and connected to the lower surface 462, and a fourth stepped surface 466*b*, which is formed in an XY plane and connected to the third stepped surface 466*a* and the side surface 464. The thus shaped first drive oscillation arm 46 can be a drive arm having an oblique oscillation component.

The shape of the base end portion 46*b* described above can in other words be described as follows: That is, the base end portion 46*b* has a transverse cross-sectional shape having a contour formed of a first side L1 extending toward the (−) side in the X-axis direction, a second side L2 extending from the front end of the first side L1 toward the (−) side in the Z-axis direction, a third side L3 extending from the front end of the second side L2 toward the (−) side in the X-axis direction, a fourth side L4 extending from the front end of the third side L3 toward the (−) side in the Z-axis direction, a fifth side L5 extending from the front end of the fourth side L4 toward the (+) side in the X-axis direction, a sixth side L6 extending from the front end of the fifth side L5 toward the (+) side in the Z-axis direction, a seventh side L7 extending from the front end of the sixth side L6 toward the (+) side in the X-axis direction, and an eighth side L8 extending from the front end of the seventh side L7 toward the (+) side in the Z-axis direction and having the front end connected to the base end of the first side L1, as shown in FIG. 3.

The thus formed first stepped portion 465 and second stepped portion 466 are so formed that they are rotationally symmetrical with respect to a central axis O of the first drive oscillation arm 46. As a result, the two portions of the first drive oscillation arm 46 on opposite sides of the central line L' thereof can be substantially equal to each other in terms of mass, whereby the first drive oscillation arm 46 has a shape balanced in terms of mass. It is noted that the first drive oscillation arm 46 in the present embodiment is so configured that the second stepped surface 465b of the first stepped portion 465 is flush with the fourth stepped surface 466b of the second stepped portion 466 in the Z-axis direction.

Further, the first stepped surface 465a of the first stepped portion 465 is separated from the third stepped surface 466a of the second stepped portion 466 in the X-axis direction toward the first detection oscillation arm 421. The configuration described above allows an area S1 sandwiched between the first stepped portion 465 and the second stepped portion 466 to have sufficient mechanical strength, whereby the first drive oscillation arm 46 is allowed to make oblique oscillation in a stable manner. Further, ensuring sufficient strength effectively prevents the first drive oscillation arm 46 from twisting and from producing unnecessary oscillation.

The thus formed first drive oscillation arm 46 has a pair of drive signal electrodes 730 and a pair of drive ground electrodes 740 formed thereon. Specifically, one of the pair of drive signal electrodes 730 is formed on the upper surface 461, and the other is formed on the lower surface 462. One of the pair of drive ground electrodes 740 is so formed that it covers the first stepped surface 465a, the second stepped surface 465b, and the side surface 463, and the other is so formed that it covers the side surface 464, the fourth stepped surface 466b, and the third stepped surface 466a. The drive ground electrodes 740 have a ground potential with respect to the drive signal electrodes 730.

With the drive signal electrodes 730 and the drive ground electrodes 740 formed and arranged as described above, applying a drive signal between the drive signal electrodes 730 and the drive ground electrodes 740 produces an electric field between the drive signal electrodes 730 and the drive ground electrodes 740 formed on the first drive oscillation arm 46, and the produced electric field causes the first drive oscillation arm 46 to oscillate. The same thing holds true for the second, third, and fourth drive oscillation arms 47, 48, 49, which will be described below.

The shape of the first drive oscillation arm 46 that has been described above may be replaced, for example, with the shape shown in FIG. 4. That is, the base end portion 46b has an upper surface 461, a lower surface 462, a pair of side surfaces 463 and 464 that connect the upper surface 461 and the lower surface 462 to each other, a first groove 467 formed in the upper surface 461, and a second groove 468 formed in the lower surface 462. The first and second grooves 467, 468 are so formed that they are shifted from each other in the X-axis direction and overlap with each other in the X-axis direction. That is, the base end portion 46b has a substantially "S"-like transverse cross-sectional shape, which allows the first drive oscillation arm 46 to be an oscillation arm having a simple configuration and having an oblique oscillation component.

The first drive oscillation arm 46 can still alternatively have any of the shapes shown in FIGS. 5A to 5D. The shapes shown in FIGS. 5A to 5D have the same configuration as that in the present embodiment except that the shapes of the first stepped portion 465 and the second stepped portion 466 (aspect ratio between width and thickness) differ from those in the present embodiment. Further, FIGS. 5A to 5D show auxiliary lines representing 0%, 50%, 100% of the width of the first drive oscillation arm 46 and 0%, 50%, 100% of the thickness of the first drive oscillation arm 46 for ease of description. In FIGS. 5A to 5D, the variety of electrodes are omitted for ease of description.

The first drive oscillation arm 46 shown in FIG. 5A is so configured that the second stepped surface 465b of the first stepped portion 465 is separated from the fourth stepped surface 466b of the second stepped portion 466 in the Z-axis direction toward the upper surface 461, and that the first stepped surface 465a of the first stepped portion 465 is separated from the third stepped surface 466a of the second stepped portion 466 in the X-axis direction toward the first detection oscillation arm 421.

The first drive oscillation arm 46 shown in FIG. 5B is so configured that the second stepped surface 465b of the first stepped portion 465 is separated from the fourth stepped surface 466b of the second stepped portion 466 in the Z-axis direction toward the lower surface 462, and that the first stepped surface 465a of the first stepped portion 465 is separated from the third stepped surface 466a of the second stepped portion 466 in the X-axis direction toward the first detection oscillation arm 421.

The first drive oscillation arm 46 shown in FIG. 5C is so configured that the second stepped surface 465b of the first stepped portion 465 is separated from the fourth stepped surface 466b of the second stepped portion 466 in the Z-axis direction toward the upper surface 461, and that the first stepped surface 465a of the first stepped portion 465 is flush with the third stepped surface 466a of the second stepped portion 466 in the X-axis direction.

The first drive oscillation arm 46 shown in FIG. 5D is so configured that the second stepped surface 465b of the first stepped portion 465 is separated from the fourth stepped surface 466b of the second stepped portion 466 in the Z-axis direction toward the upper surface 461, and that the first stepped surface 465a of the first stepped portion 465 is separated from the third stepped surface 466a of the second stepped portion 466 in the X-axis direction away from the first detection oscillation arm 421.

The simple configurations shown in FIGS. 5A to 5D described above also allow the first drive oscillation arm 46 to make oblique oscillation.

The third drive oscillation arm 48 has the same configuration as that of the first drive oscillation arm 46 except that they are symmetrical with respect to the XZ plane that intersects the center of gravity G. The configuration of the third drive oscillation arm 48 will therefore not be described.

The third drive oscillation arm 48 has a pair of drive signal electrodes 730 and a pair of drive ground electrodes 740 formed thereon, as shown in FIG. 14B (FIG. 22B in the description of a sixth embodiment, which will be described later). One of the pair of drive signal electrodes 730 is formed on an upper surface 481, and the other is formed on a lower surface 482. One of the pair of drive ground electrodes 740 is so formed that it covers a first stepped surface 485a, a second stepped surface 485b, and a side surface 483, and the other is so formed that it covers a side surface 484, a fourth stepped surface 486b, and a third stepped surface 486a.

The second drive oscillation arm 47 has the same configuration as that of the first drive oscillation arm 46 except that they are symmetrical with respect to the YZ plane that intersects the center of gravity G. The configuration of the second drive oscillation arm 47 will therefore not be described.

The second drive oscillation arm 47 has a pair of drive signal electrodes 730 and a pair of drive ground electrodes 740 formed thereon, as shown in FIG. 14A (FIG. 22A in the description of the sixth embodiment, which will be described later). One of the pair of drive signal electrodes 730 is so formed that it covers a first stepped surface 475a, a second stepped surface 475b, and a side surface 473, and the other is so formed that it covers a side surface 474, a fourth stepped surface 476b, and a third stepped surface 476a. One of the pair of drive ground electrodes 740 is formed on an upper surface 471, and the other is formed on a lower surface 472.

The fourth drive oscillation arm 49 has the same configuration as that of the third drive oscillation arm 48 except that they are symmetrical with respect to the YZ plane that intersects the center of gravity G. The configuration of the fourth drive oscillation arm 49 will therefore not be described.

The fourth drive oscillation arm 49 has a pair of drive signal electrodes 730 and a pair of drive ground electrodes 740 formed thereon, as shown in FIG. 14B (FIG. 22B in the description of the sixth embodiment described later). One of the pair of drive signal electrodes 730 is so formed that it covers a first stepped surface 495a, a second stepped surface 495b, and a side surface 493, and the other is so formed that it covers a side surface 494, a fourth stepped surface 496b, and a third stepped surface 496a. One of the pair of drive ground electrodes 740 is formed on an upper surface 491, and the other is formed on a lower surface 492.

The first to fourth drive oscillation arms 46 to 49 have been described above. The oscillation components of the first to fourth drive oscillation arms 46 to 49 in the Z-axis direction are oriented in the same direction. Further, the oscillation components of the first and third drive oscillation arms 46, 48 in the X-axis direction and the oscillation components of the second and fourth drive oscillation arms 47, 49 in the X-axis direction are oriented in opposite directions. When the first to fourth drive oscillation arms 46 to 49 have their oscillation components as described above, the four oscillation arms 46 to 49 are allowed to oscillate in a well balanced manner, whereby oscillation leakage can be suppressed.

Each of the electrodes described above can, for example, be formed on the surfaces of the oscillation piece 5 and formed of a substrate layer made of chromium on which gold is plated. The electrode configuration improves adherence between the electrode and the oscillation piece 5 and hence the reliability of the gyro sensor 4.

The configuration of the gyro sensor 4 has been described above. The gyro sensor 4 detects an angular velocity) ωy around the Y axis and an angular velocity ωz around the Z axis as will be described below. The following description will be made with reference to FIGS. 15A and 15B, 16, 17, and 18. In FIGS. 15A and 15B, the electrodes are omitted for ease of description. FIG. 15A is a cross-sectional view corresponding to the cross-sectional view taken along the line A-A in FIG. 13, and FIG. 15B is a cross-sectional view corresponding to the cross-sectional view taken along the line B-B in FIG. 13.

When an AC voltage is applied between the drive signal electrodes 730 and the drive ground electrodes 740 with no angular velocity applied, each of the first to fourth drive oscillation arms 46 to 49, which have the asymmetrical portions, makes oblique oscillation, as shown in FIGS. 15A and 15B. The first and third drive oscillation arms 46, 48 and the second and fourth drive oscillation arms 47, 49 oscillate in a plane-symmetrical manner with respect to the YZ plane that intersects the center of gravity G.

In this process, since the first and third drive oscillation arms 46, 48 and the second and fourth drive oscillation arms 47, 49 oscillate in a plane-symmetrical manner with respect to the YZ plane that passes through the center of gravity G as described above, the oscillation actions of the first to fourth drive oscillation arms 46 to 49 in the X-axis direction cancel each other. The first to fourth detection oscillation arms 421 to 424 therefore hardly oscillate in the X-axis direction. On the other hand, since the first to fourth drive oscillation arms 46 to 49 oscillate in the Z-axis direction toward the same side, the oscillation actions of the first to fourth drive oscillation arms 46 to 49 in the Z-axis direction do not cancel each other. As a result, the first to fourth detection oscillation arms 421 to 424 make bending oscillation in the Z-axis direction but in the direction opposite to the direction in which the first to fourth drive oscillation arms 46 to 49 oscillate so that the first to fourth detection oscillation arms 421 to 424 and the first to fourth drive oscillation arms 46 to 49 oscillate in a balanced manner, as shown in FIGS. 15A and 15B. The oscillation directions of the first to fourth drive oscillation arms 46 to 49 are not limited to these shown in FIGS. 15A and 15B but may, for example, be opposite to those shown in FIGS. 15A and 15B. The oscillation directions are selected as appropriate in accordance with a desired frequency and how to drive the drive oscillation arms.

When an angular velocity ωz around the Z axis is applied to the gyro sensor 4 in this state, Coriolis forces A act on the drive oscillation arms, and oscillation indicated by the arrows B (around-Z-axis angular velocity detection oscillation mode) is induced by the Coriolis forces A as a drive force, as shown in FIG. 16. The oscillation deforms the first and second detection oscillation arms 421, 422 and the third and fourth detection oscillation arms 423, 424 in opposite directions along the X axis. Further, the frequency in the detection oscillation mode is preferably within ±10% of the drive frequency. The oscillation directions of the first to fourth detection oscillation arms 421 to 424 can in other words be described as follows: The first to fourth detection oscillation arms 421 to 424 oscillate in the same rotational direction around the Z axis. The reason for this is that since the first to fourth drive oscillation arms 46 to 49 oscillate as shown in FIG. 16 under the Coriolis forces A and the first and second detection oscillation arms 421, 422 and the third and fourth detection oscillation arms 423, 424 extend upward and downward from the base 41 respectively (in opposite directions in the Y-axis direction), the first and second detection oscillation arms 421, 422 deform in correspondence with the first and second drive oscillation arms 46, 47, and the third and fourth detection oscillation arms 423, 424 deform in correspondence with the third and fourth drive oscillation arms 48, 49.

When an angular velocity ωy around the Y axis is applied to the gyro sensor 4 in the state described above, Coriolis forces A act on the drive oscillation arms, and oscillation indicated by the arrows B (around-Y-axis angular velocity detection oscillation mode) is induced by the Coriolis forces A as a drive force, as shown in FIG. 17. The oscillation deforms the first to fourth detection oscillation arms 421 to 424 in the same direction along the X axis. Further, the frequency in the detection oscillation mode is preferably within ±10% of the drive frequency. The oscillation directions of the first to fourth detection oscillation arms 421 to 424 can in other words be described as follows: The first to fourth detection oscillation arms 421 to 424 oscillate in the same direction along the X axis. The reason for this is that since the first to fourth drive oscillation arms 46 to 49 oscillate as shown in FIG. 17 under the Coriolis forces A and the first to fourth detection oscillation arms 421 to 424 receive Coriolis forces acting in the same direction along the X axis but in the direction opposite to the direction of the Coriolis forces acting on the first to fourth drive oscillation arms 46 to 49, the first to fourth detection oscillation arms 421 to 424 oscillate in the same direction in the X-axis direction.

When an angular velocity ωx around the X axis is applied to the gyro sensor 4 in the state described above, Coriolis forces A act on the drive oscillation arms, and oscillation indicated by the arrows B (around-X-axis angular velocity detection oscillation mode) is induced by the Coriolis forces A as a drive force, as shown in FIG. 18. The oscillation deforms the first to fourth detection oscillation arms 421 to 424 in the same direction along the Y axis. Further, the frequency in the detection oscillation mode is preferably within ±10% of the drive frequency. The oscillation directions of the first to fourth detection oscillation arms 421 to 424 can in other words be described as follows: The first to fourth detection oscillation arms 421 to 424 oscillate in the same direction along the Y axis. The reason for this is that since the first to fourth drive oscillation arms 46 to 49 oscillate as shown in FIG. 18 under the Coriolis forces A and the first to fourth detection oscillation arms 421 to 424 receive Coriolis forces acting in the same direction along the Y axis but in the direction opposite to the direction of the Coriolis forces acting on the first to fourth drive oscillation arms 46 to 49, the first to fourth detection oscillation arms 421 to 424 oscillate in the same direction in the Y-axis direction.

The gyro sensor 4 can detect an angular velocity ωx around the X axis, an angular velocity ωy around the Y axis, and an angular velocity ωz around the Z axis independently based on the difference described above among the directions in which the first to fourth detection oscillation arms 421 to 424 oscillate when the angular velocity ωx is applied, when the angular velocity ωy is applied, and when the angular velocity ωz is applied.

A specific description will be made with reference to FIGS. 14A and 14B. When an angular velocity ωy is applied, signals extracted from the electrodes are as follows: A signal V1 extracted from the first detection signal electrodes 710a and the first detection ground electrodes 720a is a signal +Vy resulting from the angular velocity ωy; a signal V2 extracted from the second detection signal electrodes 710b and the second detection ground electrodes 720b is a signal +Vy resulting from the angular velocity ωy; a signal V3 extracted from the third detection signal electrodes 710c and the third detection ground electrodes 720c is a signal +Vy resulting from the angular velocity ωy; and a signal V4 extracted from the fourth detection signal electrodes 710d and the fourth detection ground electrodes 720d is a signal +Vy resulting from the angular velocity ωy. That is, V1=+Vy, V2=+Vy, V3=+Vy, and V4=+Vy.

When an angular velocity ωz is applied, the signals extracted from the electrodes are as follows: The signal (voltage) V1 extracted from the first detection signal electrodes 710a and the first detection ground electrodes 720a is a signal (voltage) +Vz resulting from the angular velocity ωz; the signal (voltage) V2 extracted from the second detection signal electrodes 710b and the second detection ground electrodes 720b is a signal (voltage) +Vz resulting from the angular velocity ωz; the signal (voltage) V3 extracted from the third detection signal electrodes 710c and the third detection ground electrodes 720c is a signal (voltage) −Vz resulting from the angular velocity ωz; and the signal (voltage) V4 extracted from the fourth detection signal electrodes 710d and the fourth detection ground electrodes 720d is a signal (voltage) −Vz resulting from the angular velocity ωz. That is, V1=+Vz, V2=+Vz, V3=−Vz, and V4=−Vz. The reason why the signals V1 to V4 have different signs is that the distortion detection units are configured to produce signals having the same sign when an angular velocity around the Y axis is applied as described above.

When an angular velocity ωx is applied, the signals extracted from the electrodes are as follows: The signal V1 extracted from the first detection signal electrodes 710a and the first detection ground electrodes 720a is a signal +Vx resulting from the angular velocity ωx; the signal V2 extracted from the second detection signal electrodes 710b and the second detection ground electrodes 720b is a signal −Vx resulting from the angular velocity ωx; the signal V3 extracted from the third detection signal electrodes 710c and the third detection ground electrodes 720c is a signal −Vx resulting from the angular velocity ωx; and the signal V4 extracted from the fourth detection signal electrodes 710d and the fourth detection ground electrodes 720d is a signal +Vx resulting from the angular velocity ωx. That is, V1=+Vx, V2=−Vx, V3=−Vx, and V4=+Vx.

As a result, when an angular velocity ωxyz around an axis inclined to the X axis, the Y axis, and the Z axis is applied to the thus configured gyro sensor 4, the signals extracted from the electrodes are as follows: The signal V1 extracted from the first detection signal electrodes 710a and the first detection ground electrodes 720a is (+Vx)+(+Vy)+(+Vz); the signal V2 extracted from the second detection signal electrodes 710b and the second detection ground electrodes 720b is (−Vx)+(+Vy)+(+Vz); the signal V3 extracted from the third detection signal electrodes 710c and the third detection ground electrodes 720c is (−Vx)+(+Vy)+(−Vz); and the signal V4 extracted from the fourth detection signal electrodes 710d and the fourth detection ground electrodes 720d is (+Vx)+(+Vy)+(−Vz). That is, the signals V1 to V4 can be expressed by the following equations:

$$V1 = Vx + Vy + Vz \tag{1}$$

$$V2 = -Vx + Vy + Vz \tag{2}$$

$$V3 = -Vx + Vy - Vz \tag{3}$$

$$V4 = Vx + Vy - Vz \tag{4}$$

The thus produced signals V1 to V4 (Equations (1) to (4)) can be used to separate the angular velocity ωx around the X axis, the angular velocity ωy around the Y axis, and the angular velocity ωz around the Z axis from the angular velocity ωxyz by performing addition or subtraction of a plurality of equations selected from Equations (1) to (4), whereby the angular velocity ωx, the angular velocity ωy, and the angular velocity ωz can be detected independently.

Specifically, for example, V1−V2=2Vx, which means that the signals Vy and Vz resulting from the angular velocities ωy and ωz can be eliminated, whereby the angular velocity ωx around the X axis is separated from the others and the angular velocity ωx is determined. Similarly, V2+V4=2Vy, which means that the signals Vx and Vz resulting from the angular velocities ωx and ωz can be eliminated, whereby the angular velocity ωy around the Y axis is separated from the others and the angular velocity ωy is determined.

Similarly, V1−V4=2Vz, which means that the signals Vx and Vy resulting from the angular velocities ωx and ωy can be eliminated, whereby the angular velocity ωz around the Z axis is separated from the others and the angular velocity ωz is determined. The gyro sensor 4 can therefore readily detect an angular velocity ωx around the X axis, an angular velocity ωy around the Y axis, and an angular velocity ωz around the Z axis independently. Calculation of this type can be made by using an IC chip or any other component (not shown) connected to the gyro sensor 4.

It is noted that the signs of the signals "Vx", "Vz", and "Vy" described above are reversed depending on a wiring configuration. That is, in the above description, "+Vx", "+Vy", and "+Vz" become "−Vx", "−Vy", and "−Vz", and "−Vx", "−Vy", and "−Vz" become "+Vx", "+Vy", and "+Vz" in some cases.

Further, the above description has been made with reference to the case where an angular velocity ωxyz around an axis inclined to the X axis, the Y axis, and the Z axis is applied to the gyro sensor 4, but an angular velocity around an axis inclined to any of the axes may be applied to the gyro sensor 4. That is, an angular velocity around the X axis, an angular velocity around the Y axis, or an angular velocity around the Z axis may be applied to the gyro sensor 4. Further, an angular velocity around an axis in an XY plane, an angular velocity around an axis in a YZ plane, or an angular velocity around an axis in an XZ plane may be applied to the gyro sensor 4. In any of the cases described above, in which one or two of the values of "Vx", "Vy", and "Vz" only need to be zero (that is, only need not to be detected), the angular velocity can be detected as in the same manner described above.

Fifth Embodiment

Figure 19:
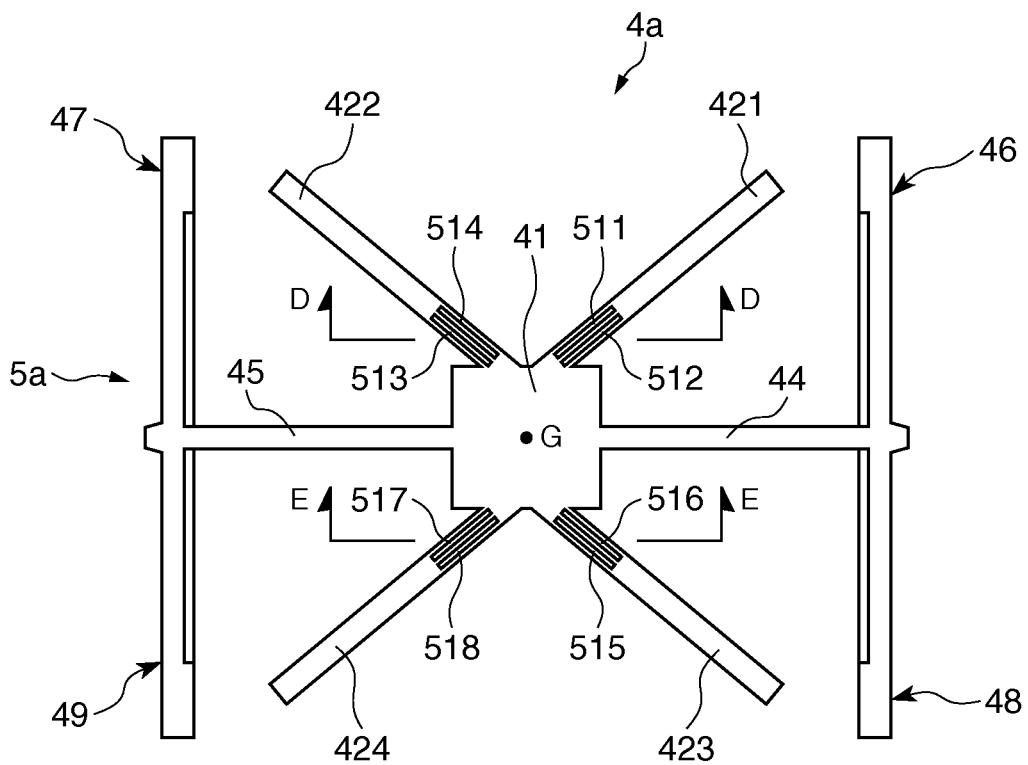
FIG. 19 is a plan view showing a gyro sensor according to a fifth embodiment of the invention.
Figure 20A:
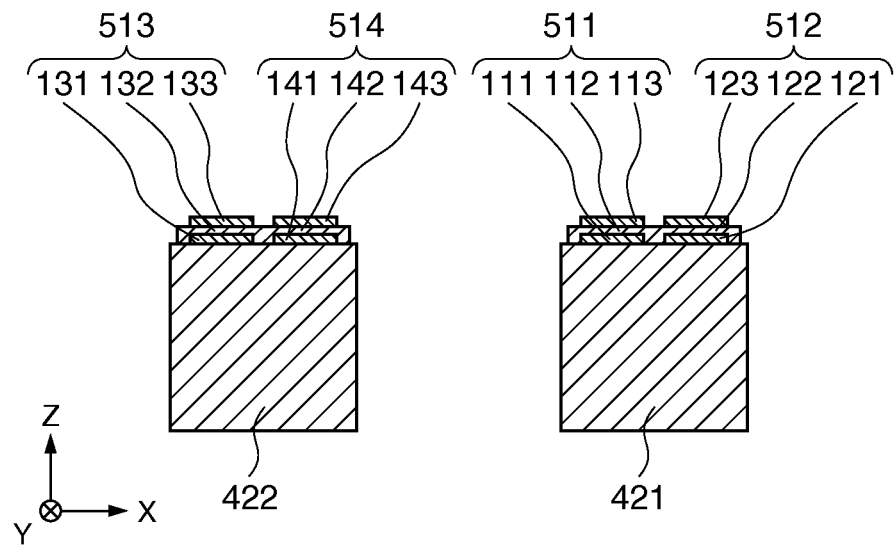
FIG. 20A is a cross-sectional view of the gyro sensor taken along the line D-D in FIG. 19.
Figure 20B:
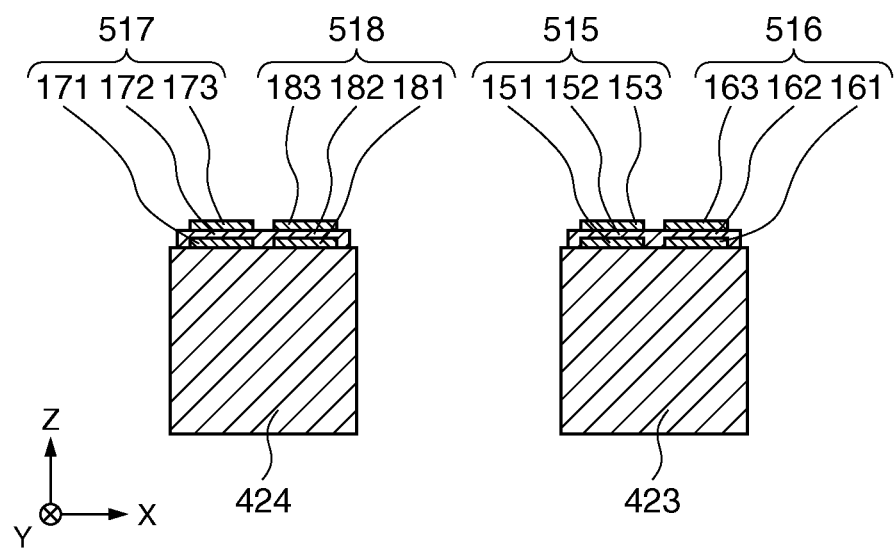
FIG. 20B is a cross-sectional view of the gyro sensor taken along the line E-E in FIG. 19.

A gyro sensor according to a fifth embodiment of the invention will next be described. FIG. 19 is a plan view of the gyro sensor according to the fifth embodiment of the invention. FIG. 20A is a cross-sectional view of the gyro sensor taken along the line D-D in FIG. 19, and FIG. 20B is a cross-sectional view of the gyro sensor taken along the line E-E in FIG. 19.

The gyro sensor according to the fifth embodiment will be described below primarily about differences from the embodiments described above, and the same items will not be described.

A gyro sensor 4a according to the fifth embodiment of the invention is the same as the gyro sensor according to the fourth embodiment described above except how to extract output signals from the first to fourth detection oscillation arms 421, 422, 423, 424 as the detection oscillation arms. The same components as those in the fourth embodiment described above have the same reference characters.

In the gyro sensor 4a according to the present embodiment, piezoelectric devices 511 and 512 are formed side by side in the X-axis direction on the +Z-axis-side upper surface (principal surface) of the first detection oscillation arm 421, as shown in FIGS. 19 and 20A. The piezoelectric device 511 is formed by stacking a first electrode 111, a piezoelectric film 112, and a second electrode 113 in this order, and the piezoelectric device 512 is formed by stacking a first electrode 121, a piezoelectric film 122, and a second electrode 123 in this order. The piezoelectric films 112 and 122 are, but not necessarily, formed integrally with each other.

Similarly, piezoelectric devices 513 and 514 are formed side by side in the X-axis direction on the +Z-axis-side upper surface (principal surface) of the second detection oscillation arm 422. The piezoelectric device 513 is formed by stacking a first electrode 131, a piezoelectric film 132, and a second electrode 133 in this order, and the piezoelectric device 514 is formed by stacking a first electrode 141, a piezoelectric film 142, and a second electrode 143 in this order. The piezoelectric films 132 and 142 are, but not necessarily, formed integrally with each other.

Similarly, piezoelectric devices 515 and 516 are formed side by side in the X-axis direction on the +Z-axis-side upper surface (principal surface) of the third detection oscillation arm 423. The piezoelectric device 515 is formed by stacking a first electrode 151, a piezoelectric film 152, and a second electrode 153 in this order, and the piezoelectric device 516 is formed by stacking a first electrode 161, a piezoelectric film 162, and a second electrode 163 in this order. The piezoelectric films 152 and 162 are, but not necessarily, formed integrally with each other.

Similarly, piezoelectric devices 517 and 518 are formed side by side in the X-axis direction on the +Z-axis-side upper surface (principal surface) of the fourth detection oscillation arm 424. The piezoelectric device 517 is formed by stacking a first electrode 171, a piezoelectric film 172, and a second electrode 173 in this order, and the piezoelectric device 518 is formed by stacking a first electrode 181, a piezoelectric film 182, and a second electrode 183 in this order. The piezoelectric films 172 and 182 are, but not necessarily, formed integrally with each other.

In the configuration described above, when the first detection oscillation arm 421 oscillates in a detection mode in which at least one of an angular velocity ωx, an angular velocity ωy, and an angular velocity ωz is so applied to the gyro sensor that it oscillates, the piezoelectric devices 511 and 512 are expanded or shrunk, whereby the distortion of the first detection oscillation arm 421 can be extracted as signals (output signals) produced between the first electrode 111 and the second electrode 113 and between the first electrode 121 and the second electrode 123. Similarly, the distortion of the second detection oscillation arm 422 can be extracted as signals (output signals) produced between the first electrode 131 and the second electrode 133 and between the first electrode 141 and the second electrode 143. The distortion of the third detection oscillation arm 423 can be extracted as signals (output signals) produced between the first electrode 151 and the second electrode 153 and between the first electrode 161 and the second electrode 163. The distortion of the fourth detection oscillation arm 424 can be extracted as signals (output signals) produced between the first electrode 171 and the second electrode 173 and between the first electrode 181 and the second electrode 183.

The signals thus extracted from the piezoelectric devices 511 to 518 are processed in the same manner as in the fourth embodiment described above, whereby the angular velocity ωx, the angular velocity ωy, and the angular velocity ωz can be detected independently. Using the piezoelectric devices 511 to 518 allows the distortion of each of the first to fourth detection oscillation arms 421 to 424 to be extracted as a signal in a simple configuration but in a more reliable manner.

The fifth embodiment described above can also provide the same advantageous effect as that provided in the fourth embodiment described above.

Sixth Embodiment

Figure 21:
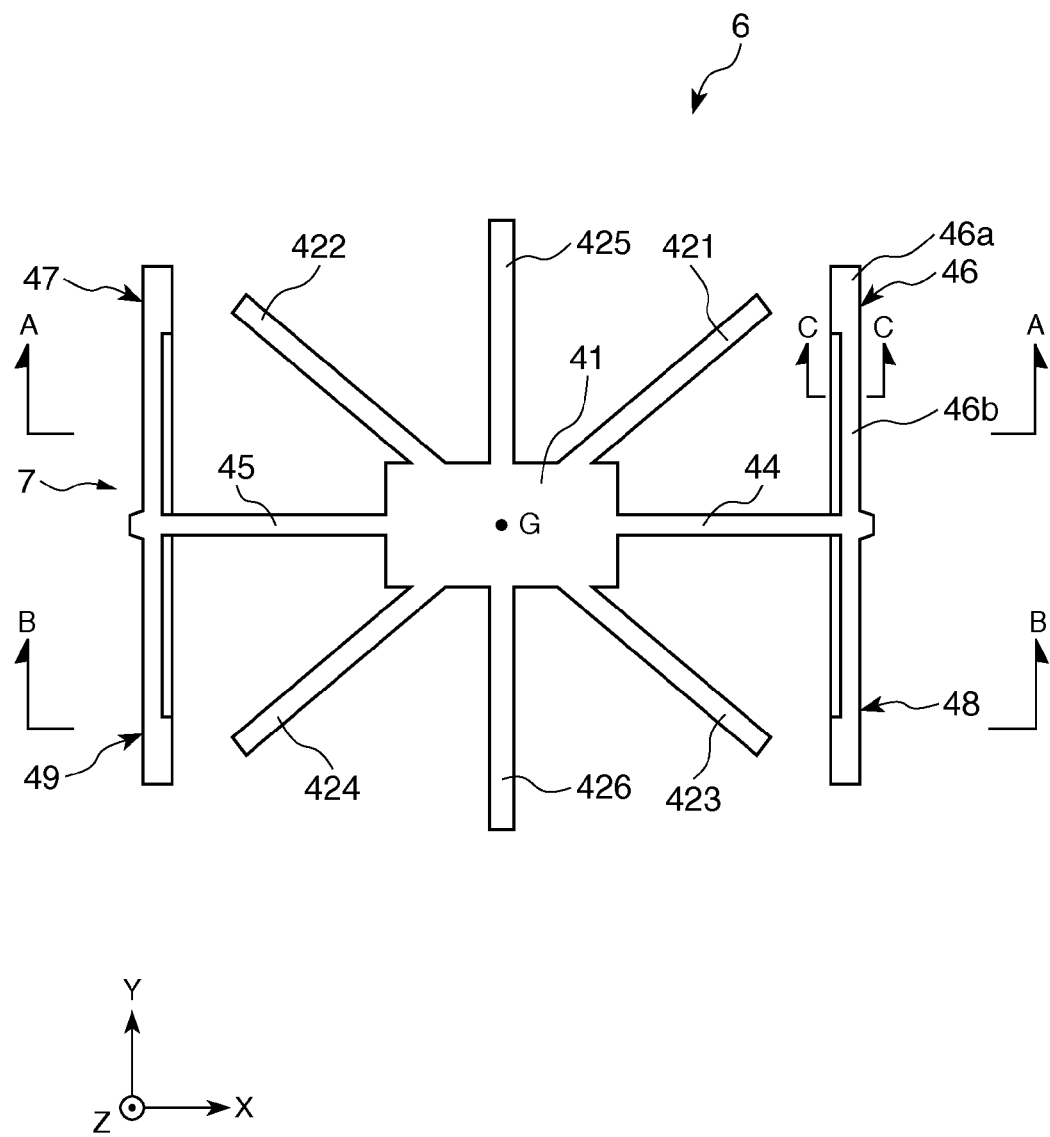
FIG. 21 is a plan view showing a gyro sensor according to a sixth embodiment of the invention.
Figure 25:
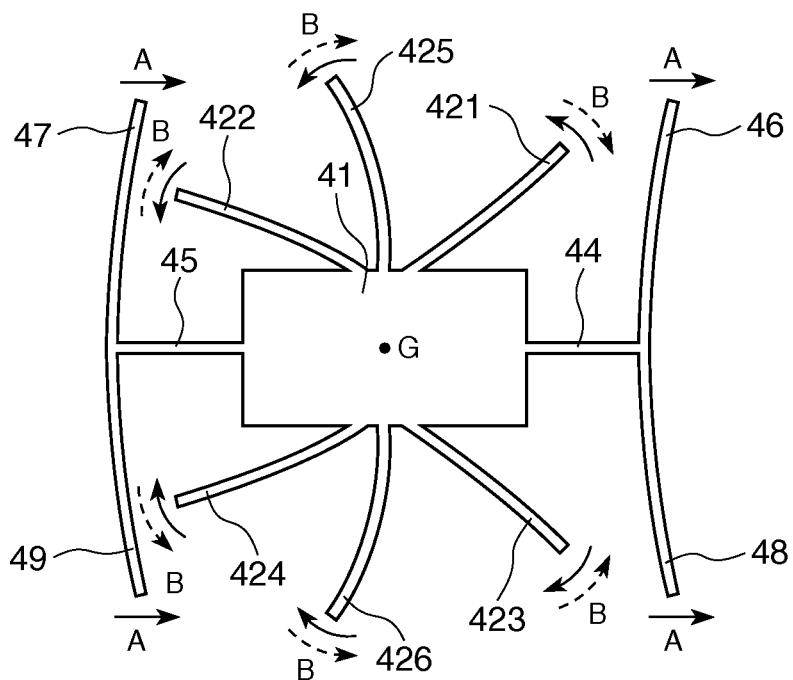
FIG. 25 is a plan view showing the gyro sensor oscillating when an angular velocity around the Y axis is applied thereto.

A gyro sensor according to a sixth embodiment of the invention will next be described. FIG. 21 is a plan view showing the gyro sensor according to the sixth embodiment of the invention. FIG. 22A is a cross-sectional view of the gyro sensor taken along the line A-A in FIG. 21, and FIG. 22B is a cross-sectional view of the gyro sensor taken along the line B-B in FIG. 21. FIGS. 23A and 23B are cross-sectional views for describing the gyro sensor shown in FIG. 21 that is driven. FIG. 24 is a plan view showing the gyro sensor oscillating when an angular velocity around a Z axis is applied thereto. FIG. 25 is a plan view showing the gyro sensor oscillating when an angular velocity around a Y axis is applied thereto. FIG. 26 is a plan view showing the gyro sensor oscillating when an angular velocity around an X axis is applied thereto.

In the following description, three axes perpendicular to each other are called an X axis (first axis), a Y axis (second axis), and a Z axis (third axis), as shown in FIG. 21. The direction parallel to the X axis is also called an "X-axis direction." The direction parallel to the Y axis is also called a "Y-axis direction." The direction parallel to the Z axis is also called a "Z-axis direction." A plane defined by the X axis and the Y axis is also called an "XY plane." A plane defined by the Y axis and the Z axis is also called a "YZ plane." A plane defined by the Z axis and the X axis is also called an "XZ plane."

A gyro sensor 6 shown in FIG. 21 is capable of detecting an angular velocity ωx around the X axis, an angular velocity ωy around the Y axis, and an angular velocity ωz around the Z axis independently. The gyro sensor 6 is formed of an oscillation piece 7 and a plurality of electrodes formed on the oscillation piece 7.

The oscillation piece 7 is made of a piezoelectric material. Examples of the piezoelectric material may include quartz, lithium tantalate, lithium niobate, lithium borate, and barium titanate. In particular, quartz is a preferable piezoelectric material of which the oscillation piece 7 is made. When the oscillation piece 7 is made of quartz, the oscillation piece 7 can have excellent oscillation characteristics (frequency-temperature characteristic, in particular). Further, the oscillation piece 7 made of quartz can be formed in an etching process with high dimensional precision. The thus formed oscillation piece 7 extends in the XY plane including the X and Y axes and has a thickness in the Z-axis direction. The oscillation piece 7 includes a base 41, first, second, third, fourth, fifth, and sixth detection oscillation arms 421, 422, 423, 424, 425, 426 as the detection oscillation arms, first and second connection arms 44, 45, and first, second, third, and fourth drive oscillation arms 46, 47, 48, 49.

The base 41 is located at the center of the oscillation piece 7. The first, second, and fifth detection oscillation arms 421, 422, 425 and the third, fourth, and sixth detection oscillation arms 423, 424, 426 extend from the base 41 in opposite directions in the Y-axis direction. The first connection arm 44 and the second connection arm 45 extend from the base 41 in opposite directions in the X-axis direction. The first drive oscillation arm 46 and the third drive oscillation arm 48 extend from a front end portion of the first connection arm 44 in opposite directions in the Y-axis direction. The second drive oscillation arm 47 and the fourth drive oscillation arm 49 extend from a front end portion of the second connection arm 45 in opposite directions in the Y-axis direction.

In the configuration shown in FIG. 21, the width of each of the first connection arm 44 and the second connection arm 45 is smaller than the width of the base 41. The base 41 and the first and second connection arms 44, 45 may alternatively have the same width so that they are integrated with each other. Further, the first and third drive oscillation arms 46, 48 may alternatively extend from a portion of the first connection arm 44 somewhere middle in the direction in which it extends, and the second and fourth drive oscillation arms 47, 49 may similarly extend from a portion of the second connection arm 45 somewhere middle in the direction in which it extends.

Each of the first, second, third, and fourth drive oscillation arms 46, 47, 48, 49 and the first, second, third, fourth, fifth, and sixth detection oscillation arms 421, 422, 423, 424, 425, 426 may have a front end portion wider or thicker than a base portion (what is called a hammerhead shape). A hammerhead-shaped front end portion of each of the oscillation arms increases the displacement of the oscillation arm when it is driven or the displacement thereof to be detected.

Each of the first detection oscillation arm 421 and the second detection oscillation arm 422 extends from one end of the base 41 (the end on the upper side in FIG. 21) toward one side in the Y-axis direction. Further, each of the first detection oscillation arm 421 and the second detection oscillation arm 422 extends in a direction inclined to the X axis and the Y axis, and hence the distance between the two detection oscillation arms gradually increases toward their front end sides (that is, the two detection oscillation arms extend in opposite directions in the X-axis direction). The first detection oscillation arm 421 and the second detection oscillation arm 422 are formed symmetrically with respect to the YZ plane that passes through the center of gravity G (geometrical center) of the oscillation piece 7.

Similarly, each of the third detection oscillation arm 423 and the fourth detection oscillation arm 424 extends from the other end of the base 41 toward the other side in the Y-axis direction. Further, each of third detection oscillation arm 423 and the fourth detection oscillation arm 424 extends in a direction inclined to the X axis and the Y axis, and hence the distance between the two detection oscillation arms gradually increases toward their front end sides (that is, the two detection oscillation arms extend in opposite directions in the X-axis direction). The third detection oscillation arm 423 and the fourth detection oscillation arm 424 are formed symmetrically with respect to the YZ plane that passes through the center of gravity G.

The fifth detection oscillation arm 425 and the sixth detection oscillation arm 426 coaxially extend from the base 41 in opposite directions in the Y-axis direction. Further, the fifth detection oscillation arm 425 is located between the first detection oscillation arm 421 and the second detection oscillation arm 422, and the sixth detection oscillation arm 426 is located between the third detection oscillation arm 423 and the fourth detection oscillation arm 424. The fifth and sixth detection oscillation arms 425, 426 are formed symmetrically with respect to the XZ plane that passes through the center of gravity G.

Further, the first, second, and fifth detection oscillation arms 421, 422, 425 and the third, fourth, and sixth detection oscillation arms 423, 424, 426 are formed symmetrically with respect to the XZ plane that passes through the center of gravity G. The first and third detection oscillation arms 421, 423 and the second and fourth detection oscillation arms 422, 424 are formed symmetrically with respect to the YZ plane that passes through the center of gravity G. The fifth and sixth detection oscillation arms 425, 426 extend along the Y axis that passes through the center of gravity G. Each of the first to sixth detection oscillation arms 421 to 426 has a substantially rectangular transverse cross-sectional shape.

When the oscillation piece 7 is made of quartz, the direction in which each of the first to fourth detection oscillation arms 421 to 424 extends preferably agrees with a direction perpendicular to the polarization direction of the quartz, whereby excellent detection precision is provided.

A first detection signal electrode (electrode) 710a is formed on each of the upper surface and the lower surface of the first detection oscillation arm 421, as shown in FIG. 22A. Similarly, a second detection signal electrode 710b is formed on each of the upper surface and the lower surface of the second detection oscillation arm 422, as shown in FIG. 22A. A third detection signal electrode 710c is formed on each of the upper surface and the lower surface of the third detection oscillation arm 423, as shown in FIG. 22B. A fourth detection signal electrode 710d is formed on each of the upper surface and the lower surface of the fourth detection oscillation arm 424, as shown in FIG. 22B. A fifth detection signal electrode 710e is formed on each of the upper surface and the lower surface of the fifth detection oscillation arm 425, as shown in FIG. 22A. A sixth detection signal electrode 710f is formed on each of the upper surface and the lower surface of the sixth detection oscillation arm 426, as shown in FIG. 22B.

Further, a first detection ground electrode (electrode) 720a is formed on each of the two side surfaces of the first detection oscillation arm 421. Similarly, a second detection ground electrode 720*b* is formed on each of the two side surfaces of the second detection oscillation arm 422. A third detection ground electrode 720*c* is formed on each of the two side surfaces of the third detection oscillation arm 423. A fourth detection ground electrode 720*d* is formed on each of the two side surfaces of the fourth detection oscillation arm 424. A fifth detection ground electrode 720*e* is formed on each of the two side surfaces of the fifth detection oscillation arm 425. A sixth detection ground electrode 720*f* is formed on each of the two side surfaces of the sixth detection oscillation arm 426. The thus formed first to sixth detection ground electrodes 720*a* to 720*f* have a ground potential with respect to the first to sixth detection signal electrodes 710*a* to 710*f*.

In the configuration shown in FIGS. 22A and 22B, in which each of the first to sixth detection oscillation arms 421 to 426 has a rectangular cross-sectional shape, a groove may be provided in at least one of the upper surface and the lower surface of each of the first to sixth detection oscillation arms 421 to 426. In this case, the first detection signal electrode 710*a* (second to sixth detection signal electrodes 710*b* to 710*f*) is desirably formed along the inner wall of the groove. The thus shaped detection oscillation arm provides a smaller distance between the first detection signal electrode 710*a* (second to sixth detection signal electrodes 710*b* to 710*f*) and the first detection ground electrodes 720*a* (second to sixth detection ground electrodes 720*b* to 720*f*) formed on the side surfaces, increasing electric field efficiency. The increased electric field efficiency allows a large amount of charge to be produced between the electrodes with a small amount of distortion, which contributes to high sensitivity.

When the first to sixth detection signal electrodes 710*a* to 710*f* and the first to sixth detection ground electrodes 720*a* to 720*f* are formed and arranged as described above, detectable oscillation produced in the first detection oscillation arm 421 appears in the form of charge between the first detection signal electrodes 710*a* and the first detection ground electrodes 720*a*, and the charge can be extracted as a signal. Similarly, detectable oscillation produced in the second detection oscillation arm 422 appears in the form of charge between the second detection signal electrodes 710*b* and the second detection ground electrodes 720*b*, and the charge can be extracted as a signal. Detectable oscillation produced in the third detection oscillation arm 423 appears in the form of charge between the third detection signal electrodes 710*c* and the third detection ground electrodes 720*c*, and the charge can be extracted as a signal. Detectable oscillation produced in the fourth detection oscillation arm 424 appears in the form of charge between the fourth detection signal electrodes 710*d* and the fourth detection ground electrodes 720*d*, and the charge can be extracted as a signal. Detectable oscillation produced in the fifth detection oscillation arm 425 appears in the form of charge between the fifth detection signal electrodes 710*e* and the fifth detection ground electrodes 720*e*, and the charge can be extracted as a signal. Detectable oscillation produced in the sixth detection oscillation arm 426 appears in the form of charge between the sixth detection signal electrodes 710*f* and the sixth detection ground electrodes 720*f*, and the charge can be extracted as a signal.

The drive oscillation arms will next be described. The first drive oscillation arm 46, the second drive oscillation arm 47, the third drive oscillation arm 48, and the fourth drive oscillation arm 49 in the sixth embodiment have the same configurations as those in the fourth embodiment described above, and no description thereof will be made.

The configuration of the gyro sensor 6 has been described above. The gyro sensor 6 detects an angular velocity ωx around the X axis, an angular velocity ωy around the Y axis, and an angular velocity ωz around the Z axis as will be described below. The following description will be made with reference to FIGS. 23A and 23B, 24, 25, and 26. In FIGS. 23A and 23B, the electrodes are omitted for ease of description. FIG. 23A is a cross-sectional view corresponding to the cross-sectional view taken along the line A-A in FIG. 21, and FIG. 23B is a cross-sectional view corresponding to the cross-sectional view taken along the line B-B in FIG. 21.

When an AC voltage is applied between the drive signal electrodes 730 and the drive ground electrodes 740 with no angular velocity applied, each of the first to fourth drive oscillation arms 46 to 49, which have asymmetrical portions, makes oblique oscillation, as shown in FIGS. 23A and 23B. The first and third drive oscillation arms 46, 48 and the second and fourth drive oscillation arms 47, 49 oscillate in a plane-symmetrical manner with respect to the YZ plane that intersects the center of gravity G.

In this process, since the first and third drive oscillation arms 46, 48 and the second and fourth drive oscillation arms 47, 49 oscillate in a plane-symmetrical manner with respect to the YZ plane that passes through the center of gravity G as described above, the oscillation actions of the first to fourth drive oscillation arms 46 to 49 in the X-axis direction cancel each other. The first to sixth detection oscillation arms 421 to 426 therefore hardly oscillate in the X-axis direction. On the other hand, since the first to fourth drive oscillation arms 46 to 49 oscillate in the Z-axis direction toward the same side, the oscillation actions of the first to fourth drive oscillation arms 46 to 49 in the Z-axis direction do not cancel each other. As a result, the first to sixth detection oscillation arms 421 to 426 make bending oscillation in the Z-axis direction but in the direction opposite to the direction in which the first to fourth drive oscillation arms 46 to 49 oscillate so that the first to sixth detection oscillation arms 421 to 426 and the first to fourth drive oscillation arms 46 to 49 oscillate in a balanced manner, as shown in FIGS. 23A and 23B. The oscillation directions of the first to fourth drive oscillation arms 46 to 49 are not limited to those shown in FIGS. 23A and 23B but may, for example, be opposite to those shown in FIGS. 23A and 23B. The oscillation directions are selected as appropriate in accordance with a desired frequency and how to drive the drive oscillation arms.

When an angular velocity ωz around the Z axis is applied to the gyro sensor 6 in this state, Coriolis forces A act on the drive oscillation arms, and oscillation indicated by the arrows B (around-Z-axis angular velocity detection oscillation mode) is induced by the Coriolis forces A as a drive force, as shown in FIG. 24. The oscillation deforms the first, second, and fifth detection oscillation arms 421, 422, 425 and the third, fourth, and sixth detection oscillation arms 423, 424, 426 in opposite directions along the X axis. Further, the frequency in the detection oscillation mode is preferably within ±10% of the drive frequency. The oscillation directions of the first to sixth detection oscillation arms 421 to 426 can in other words be described as follows: The first to sixth detection oscillation arms 421 to 426 oscillate in the same rotational direction around the Z axis. The reason for this is that since the first to fourth drive oscillation arms 46 to 49 oscillate as shown in FIG. 24 under the Coriolis forces A and the first, second, and fifth detection oscillation arms 421, 422, 425 and the third, fourth, and sixth detection oscillation arms 423, 424, 426 extend upward and downward of the base 41 (in the Y-axis direction) respectively, the first, second, and fifth detection oscillation arms 421, 422, 425 deform in correspondence with the first and second drive oscillation arms 46, 47, and the third, fourth, and sixth detection oscillation arms 423, 424, 426 deform in correspondence with the third and fourth drive oscillation arms 48, 49.

When an angular velocity ωy around the Y axis is applied to the gyro sensor 6 in the state described above, Coriolis forces A act on the drive oscillation arms, and oscillation indicated by the arrows B (around-Y-axis angular velocity detection oscillation mode) is induced by the Coriolis forces A as a drive force, as shown in FIG. 25. The oscillation deforms the first to sixth detection oscillation arms 421 to 426 in the same direction along the X axis. Further, the frequency in the detection oscillation mode is preferably within ±10% of the drive frequency. The oscillation directions of the first to sixth detection oscillation arms 421 to 426 can in other words be described as follows: The first to sixth detection oscillation arms 421 to 426 oscillate in the same direction along the X axis. The reason for this is that since the first to fourth drive oscillation arms 46 to 49 oscillate as shown in FIG. 25 under the Coriolis forces A and the first to sixth detection oscillation arms 421 to 426 receive Coriolis forces acting in the same direction along the X axis but in the direction opposite to the direction of the Coriolis forces acting on the first to fourth drive oscillation arms 46 to 49, the first to sixth detection oscillation arms 421 to 426 oscillate in the same direction in the X-axis direction.

When an angular velocity ωx around the X axis is applied to the gyro sensor 6 in the state described above, Coriolis forces A act on the drive oscillation arms, and oscillation indicated by the arrows B (around-X-axis angular velocity detection oscillation mode) is induced by the Coriolis forces A as a drive force, as shown in FIG. 26. The oscillation deforms the first to fourth detection oscillation arms 421 to 424 in the same direction along the Y axis. Further, the frequency in the detection oscillation mode is preferably within ±10% of the drive frequency. The oscillation directions of the first to fourth detection oscillation arms 421 to 424 can in other words be described as follows: The first to fourth detection oscillation arms 421 to 424 oscillate in the same direction along the Y axis. The reason for this is that since the first to fourth drive oscillation arms 46 to 49 oscillate as shown in FIG. 26 under the Coriolis forces A and the first to fourth detection oscillation arms 421 to 424 receive Coriolis forces acting in the same direction along the Y axis but in the direction opposite to the direction of the Coriolis forces acting on the first to fourth drive oscillation arms 46 to 49, the first to fourth detection oscillation arms 421 to 424 oscillate in the same direction in the Y-axis direction. It is noted that since the fifth and sixth detection oscillation arms 425, 426 extend in the Y-axis direction, the fifth and sixth detection oscillation arms 425, 426 do not oscillate in the detection oscillation mode.

The gyro sensor 6 can detect an angular velocity ωx around the X axis, an angular velocity ωy around the Y axis, and an angular velocity ωz around the Z axis independently based on the difference described above among the directions in which the first to fourth detection oscillation arms 421 to 424 oscillate when the angular velocity ωx is applied, when the angular velocity ωy is applied, and when the angular velocity ωz is applied.

A specific description will be made below. When an angular velocity ωz is applied, signals extracted from the electrodes are as follows: A signal (voltage) V1 extracted from the first detection signal electrodes 710a and the first detection ground electrodes 720a is a signal (voltage) +Vz resulting from the angular velocity ωz; a signal (voltage) V2 extracted from the second detection signal electrodes 710b and the second detection ground electrodes 720b is a signal (voltage) +Vz resulting from the angular velocity ωz; a signal (voltage) V3 extracted from the third detection signal electrodes 710c and the third detection ground electrodes 720c is a signal (voltage) −Vz resulting from the angular velocity) z; a signal (voltage) V4 extracted from the fourth detection signal electrodes 710d and the fourth detection ground electrodes 720d is a signal (voltage) −Vz resulting from the angular velocity ωz; a signal (voltage) V5 extracted from the fifth detection signal electrodes 710e and the fifth detection ground electrodes 720e is a signal (voltage) +Vz' resulting from the angular velocity ωz; and a signal (voltage) V6 extracted from the sixth detection signal electrodes 710f and the sixth detection ground electrodes 720f is a signal (voltage) −Vz' resulting from the angular velocity ωz. That is, V1=+Vz, V2=+Vz, V3=−Vz, V4=−Vz, V5=+Vz', and V6=−Vz'.

When an angular velocity ωy is applied, the signals extracted from the electrodes are as follows: The signal V1 extracted from the first detection signal electrodes 710a and the first detection ground electrodes 720a is a signal +Vy resulting from the angular velocity ωy; the signal V2 extracted from the second detection signal electrodes 710b and the second detection ground electrodes 720b is a signal +Vy resulting from the angular velocity ωy; the signal V3 extracted from the third detection signal electrodes 710c and the third detection ground electrodes 720c is a signal +Vy resulting from the angular velocity ωy; the signal V4 extracted from the fourth detection signal electrodes 710d and the fourth detection ground electrodes 720d is a signal +Vy resulting from the angular velocity ωy; the signal V5 extracted from the fifth detection signal electrodes 710e and the fifth detection ground electrodes 720e is a signal +Vy' resulting from the angular velocity ωy; and the signal V6 extracted from the sixth detection signal electrodes 710f and the sixth detection ground electrodes 720f is a signal +Vy' resulting from the angular velocity ωy. That is, V1=+Vy, V2=+Vy, V3=+Vy, V4=+Vy, V5=+Vy', and V6=+Vy'.

It is noted that when the angular velocity ωz is applied, the degrees of distortion of the first to fourth detection oscillation arms 421 to 424 are substantially equal to each other, and hence the magnitudes of the signals V1 to V4 (that is, absolute values |±Vv|) are substantially equal to each other. Similarly, when the angular velocity ωz is applied, the degrees of distortion of the fifth and sixth detection oscillation arms 425 and 426 are substantially equal to each other, and hence the magnitudes of the signals V5 and V6 (that is, absolute values |±Vv'|) are substantially equal to each other. |±Vv| and |±Vv'| may be or may not be equal to each other. The reason why the signals V1 to V6 have different signs is that the distortion detection units are configured to produce signals having the same sign when an angular velocity around the Y axis is applied as described above.

When an angular velocity ωx is applied, the signals extracted from the electrodes are as follows: The signal V1 extracted from the first detection signal electrodes 710a and the first detection ground electrodes 720a is a signal +Vx resulting from the angular velocity ωx; the signal V2 extracted from the second detection signal electrodes 710b and the second detection ground electrodes 720b is a signal −Vx resulting from the angular velocity ωx; the signal V3 extracted from the third detection signal electrodes 710c and the third detection ground electrodes 720c is a signal −Vx resulting from the angular velocity ωx; and the signal V4 extracted from the fourth detection signal electrodes 710d and the fourth detection ground electrodes 720d is a signal +Vx resulting from the angular velocity ωx. That is, V1=+Vx, V2=−Vx, V3=−Vx, and V4=+Vx. Since no oscillation is newly induced in the fifth or sixth detection oscillation arm 425, 426 even when the angular velocity ωx is applied as described above, the signal V5 extracted from the fifth detection signal electrodes 710e and the fifth detection ground electrodes 720e is zero, and the signal V6 extracted from the sixth detection signal electrodes 710f and the sixth detection ground electrodes 720f is also zero.

As a result, when an angular velocity ωxyz around an axis inclined to the X axis, the Y axis, and the Z axis is applied to the gyro sensor 6, the signal V1 extracted from the first detection signal electrodes 710a and the first detection ground electrodes 720a is the sum of the signals extracted when angular velocities around the axes described above are applied, that is, (+Vx)+(+Vy)+(+Vz). Similarly, the signal V2 extracted from the second detection signal electrodes 710b and the second detection ground electrodes 720b is (−Vx)+(+Vy)+(+Vz). The signal V3 extracted from the third detection signal electrodes 710c and the third detection ground electrodes 720c is (−Vx)+(+Vy)+(−Vz). The signal V4 extracted from the fourth detection signal electrodes 710d and the fourth detection ground electrodes 720d is (+Vx)+(+Vy)+(−Vz). The signal V5 extracted from the fifth detection signal electrodes 710e and the fifth detection ground electrodes 720e is (+Vy')+(+Vz'). The signal V6 extracted from the sixth detection signal electrodes 710f and the sixth detection ground electrodes 720f is (+Vy')+(−Vz'). That is, the signals V1 to V6 can be expressed by the following equations.

$$V1 = Vx + Vy + Vz \quad (1)$$

$$V2 = -Vx + Vy + Vz \quad (2)$$

$$V3 = -Vx + Vy - Vz \quad (3)$$

$$V4 = Vx + Vy - Vz \quad (4)$$

$$V5 = Vy' + Vz' \quad (5)$$

$$V6 = Vy' - Vz' \quad (6)$$

The thus produced signals V1 to V6 (Equations (1) to (6)) can be used to separate the angular velocity ωx around the X axis, the angular velocity ωy around the Y axis, and the angular velocity ωz around the Z axis from the angular velocity ωxyz by performing addition or subtraction of a plurality of equations selected from Equations (1) to (6), whereby the angular velocity ωx, the angular velocity ωy, and the angular velocity ωz can be detected independently.

Specifically, for example, V1−V2=2Vx, which means that the signals Vy and Vz resulting from the angular velocity ωy and the angular velocity ωz can be eliminated, whereby the angular velocity ωx around the X axis is separated from the others and the angular velocity ωx is determined.

Similarly, V2+V4=2Vy, which means that the signals Vx and Vz resulting from the angular velocity ωx and the angular velocity ωz can be eliminated, whereby the angular velocity ωy around the Y axis is separated from the others and the angular velocity ωy is determined. Further, V5+V6=2Vy', also from which the angular velocity ωy can be determined. To detect the angular velocity ωy, calculation of either 2Vy (V2+V4) or 2Vy' (V5+V6) suffices, whereas 2Vy and 2Vy' can be calculated and the angular velocity ωz can be detected based on the two values with higher precision. Further, for example, when a predetermined relationship between 2Vy and 2Vy' is lost, it is conceivable that the gyro sensor 6 is damaged or otherwise defective, whereby the reliability of the gyro sensor 6 can be improved.

Similarly, V1−V4=2Vz, which means that the signals Vx and Vy resulting from the angular velocity ωx and the angular velocity ωy can be eliminated, whereby the angular velocity) ωz around the Z axis is separated from the others and the angular velocity ωz is determined. Further, V5−V6=2Vz', also from which the angular velocity ωz can be determined. To detect the angular velocity ωz, calculation of either 2Vz or 2Vz' suffices, whereas 2Vz and 2Vz' can be calculated and the angular velocity ωz can be detected based on the two values with higher precision. Further, for example, when a predetermined relationship between 2Vz and 2Vz' is lost, it is conceivable that the gyro sensor 6 is damaged or otherwise defective, whereby the reliability of the gyro sensor 6 can be improved. The gyro sensor 6 can therefore readily detect an angular velocity ωx around the X axis, an angular velocity ωy around the Y axis, and an angular velocity ωz around the Z axis independently. Calculation of this type can be made by using an IC chip or any other component (not shown) connected to the gyro sensor 6.

It is noted that the signs of the signals "Vx", "Vy (Vy')", and "Vz (Vz')" described above are reversed depending on a wiring configuration. That is, "+Vx", "+Vy (Vy')", and "+Vz (Vz')" become "−Vx", "−Vy (Vy')", and "−Vz (Vz')", and "−Vx", "−Vy (Vy')", and "−Vz (Vz')" become "+Vx", "+Vy (Vy')", and "+Vz (Vz')" in some cases.

Further, the above description has been made with reference to the case where an angular velocity ωxyz around an axis inclined to the X axis, the Y axis, and the Z axis is applied to the gyro sensor 6, but an angular velocity around an axis inclined to any of the axes may be applied to the gyro sensor 6. That is, an angular velocity around the X axis, an angular velocity around the Y axis, or an angular velocity around the Z axis may be applied to the gyro sensor 6. Further, an angular velocity around an axis in an XY plane, an angular velocity around an axis in a YZ plane, or an angular velocity around an axis in an XZ plane may be applied to the gyro sensor 6. In any of the cases described above, in which one or two of the values of "Vx", "Vy", and "Vz" only need to be zero (that is, only need not to be detected), and the angular velocity can be detected as in the same manner described above.

Seventh Embodiment

Figure 27:
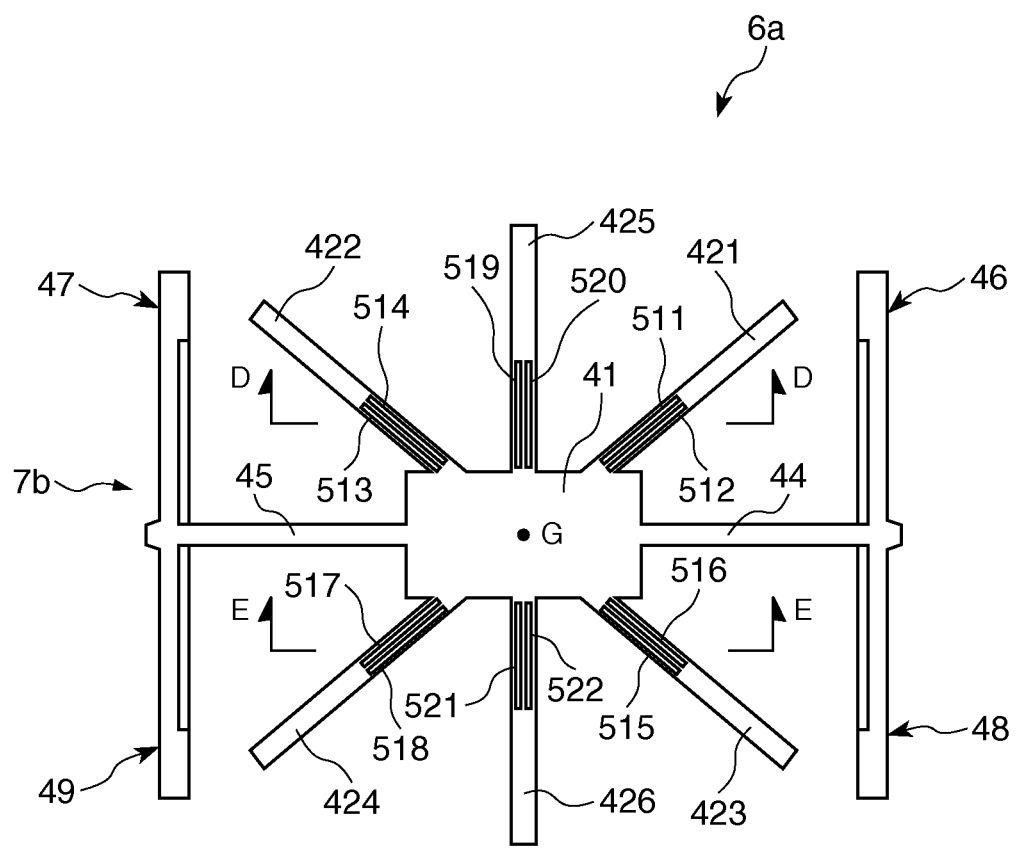
FIG. 27 is a plan view showing a gyro sensor according to a seventh embodiment of the invention.

A gyro sensor according to a seventh embodiment of the invention will next be described. FIG. 27 is a plan view of the gyro sensor according to the seventh embodiment of the invention. FIG. 28A is a cross-sectional view of the gyro sensor taken along the line D-D in FIG. 27, and FIG. 28B is a cross-sectional view of the gyro sensor taken along the line E-E in FIG. 27. The gyro sensor according to the seventh embodiment will be described below primarily about differences from the embodiments described above, and the same items will not be described. The gyro sensor according to the seventh embodiment of the invention is the same as the gyro sensor according to the sixth embodiment described above except how to extract output signals from the first to sixth detection oscillation arms as the detection oscillation arms. The same components as those in the sixth embodiment described above have the same reference characters.

In a gyro sensor 6a according to the present embodiment, piezoelectric devices 511 and 512 are formed side by side in the X-axis direction on the +Z-axis-side upper surface (principal surface) of the first detection oscillation arm 421, as shown in FIGS. 27 and 28A. The piezoelectric device 511 is formed by stacking a first electrode 111, a piezoelectric film 112, and a second electrode 113 in this order, and the piezoelectric device 512 is formed by stacking a first electrode 121, a piezoelectric film 122, and a second electrode 123 in this order. The piezoelectric films 112 and 122 are, but not necessarily, formed integrally with each other.

Similarly, piezoelectric devices 513 and 514 are formed side by side in the X-axis direction on the +Z-axis-side upper surface (principal surface) of the second detection oscillation arm 422. The piezoelectric device 513 is formed by stacking a first electrode 131, a piezoelectric film 132, and a second electrode 133 in this order, and the piezoelectric device 514 is formed by stacking a first electrode 141, a piezoelectric film 142, and a second electrode 143 in this order. The piezoelectric films 132 and 142 are, but not necessarily, formed integrally with each other.

Similarly, piezoelectric devices 515 and 516 are formed side by side in the X-axis direction on the +Z-axis-side upper surface (principal surface) of the third detection oscillation arm 423. The piezoelectric device 515 is formed by stacking a first electrode 151, a piezoelectric film 152, and a second electrode 153 in this order, and the piezoelectric device 516 is formed by stacking a first electrode 161, a piezoelectric film 162, and a second electrode 163 in this order. The piezoelectric films 152 and 162 are, but not necessarily, formed integrally with each other.

Similarly, piezoelectric devices 517 and 518 are formed side by side in the X-axis direction on the +Z-axis-side upper surface (principal surface) of the fourth detection oscillation arm 424. The piezoelectric device 517 is formed by stacking a first electrode 171, a piezoelectric film 172, and a second electrode 173 in this order, and the piezoelectric device 518 is formed by stacking a first electrode 181, a piezoelectric film 182, and a second electrode 183 in this order. The piezoelectric films 172 and 182 are, but not necessarily, formed integrally with each other.

Similarly, piezoelectric devices 519 and 520 are formed side by side in the X-axis direction on the +Z-axis-side upper surface (principal surface) of the fifth detection oscillation arm 425. The piezoelectric device 519 is formed by stacking a first electrode 191, a piezoelectric film 192, and a second electrode 193 in this order, and the piezoelectric device 520 is formed by stacking a first electrode 201, a piezoelectric film 202, and a second electrode 203 in this order. The piezoelectric films 192 and 202 are, but not necessarily, formed integrally with each other.

Similarly, piezoelectric devices 521 and 522 are formed side by side in the X-axis direction on the +Z-axis-side upper surface (principal surface) of the sixth detection oscillation arm 426. The piezoelectric device 521 is formed by stacking a first electrode 211, a piezoelectric film 212, and a second electrode 213 in this order, and the piezoelectric device 522 is formed by stacking a first electrode 221, a piezoelectric film 222, and a second electrode 223 in this order. The piezoelectric films 212 and 222 are, but not necessarily, formed integrally with each other.

In the configuration described above, when the first detection oscillation arm 421 oscillates in a detection mode in which at least one of an angular velocity $\omega x$, an angular velocity $\omega y$, and an angular velocity $\omega z$ is so applied to the gyro sensor that it oscillates, the piezoelectric devices 511 and 512 are expanded or shrunk, whereby the distortion of the first detection oscillation arm 421 can be extracted as signals (output signals) produced between the first electrode 111 and the second electrode 113 and between the first electrode 121 and the second electrode 123. Similarly, the distortion of the second detection oscillation arm 422 can be extracted as signals (output signals) produced between the first electrode 131 and the second electrode 133 and between the first electrode 141 and the second electrode 143. The distortion of the third detection oscillation arm 423 can be extracted as signals (output signals) produced between the first electrode 151 and the second electrode 153 and between the first electrode 161 and the second electrode 163. The distortion of the fourth detection oscillation arm 424 can be extracted as signals (output signals) produced between the first electrode 171 and the second electrode 173 and between the first electrode 181 and the second electrode 183. The distortion of the fifth detection oscillation arm 425 can be extracted as signals (output signals) produced between the first electrode 191 and the second electrode 193 and between the first electrode 201 and the second electrode 203. The distortion of the sixth detection oscillation arm 426 can be extracted as signals (output signals) produced between the first electrode 211 and the second electrode 213 and between the first electrode 221 and the second electrode 223.

The signals thus extracted from the piezoelectric devices 511 to 522 are processed in the same manner as in the sixth embodiment described above, whereby the angular velocity $\omega x$, the angular velocity $\omega y$, and the angular velocity $\omega z$ can be detected independently. Using the piezoelectric devices 511 to 522 allows the distortion of each of the first to sixth detection oscillation arms 421 to 426 to be extracted as a signal in a simple configuration but in a more reliable manner.

The seventh embodiment described above can also provide the same advantageous effect as that provided in the sixth embodiment described above.

Eighth Embodiment

Figure 30A:
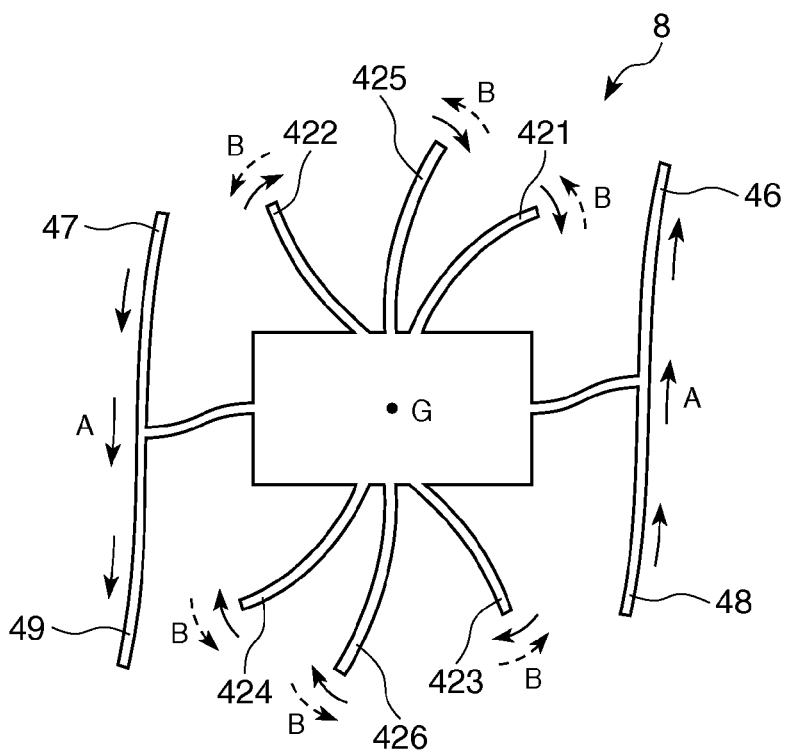
FIGS. 30A and 30B are plan views showing the gyro sensor oscillating when an angular velocity around the Z axis is applied thereto.
Figure 30B:
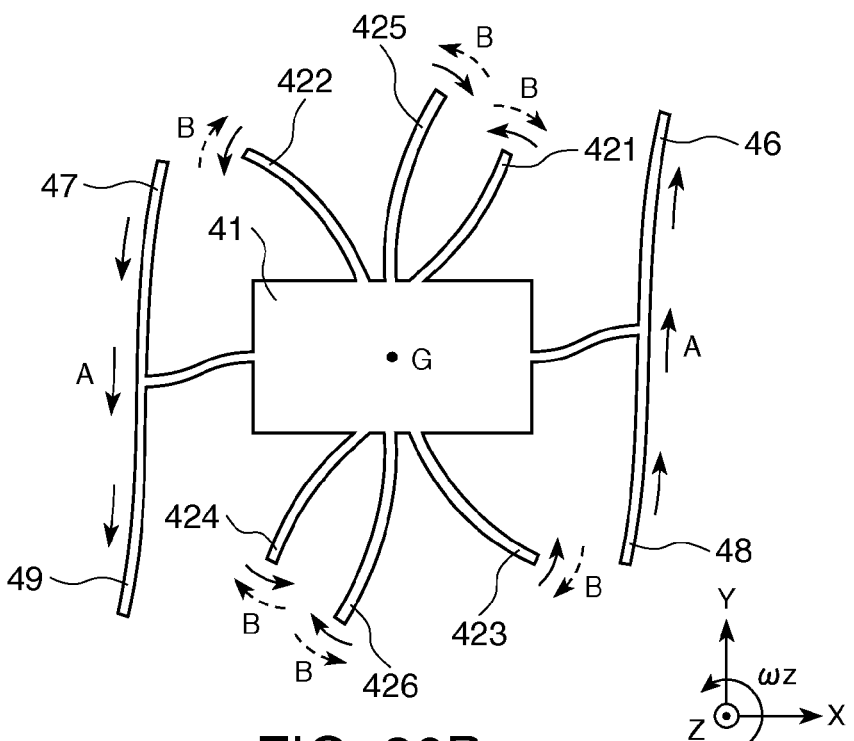
Figure 31A:
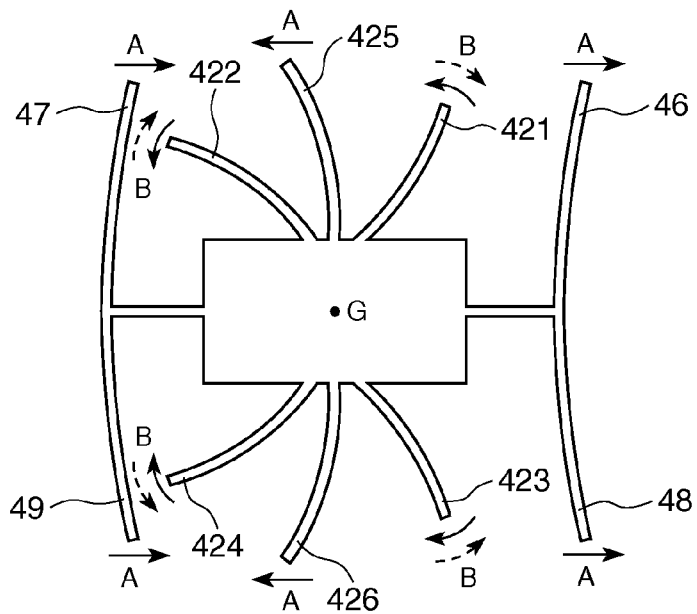
FIGS. 31A and 31B are plan views showing the gyro sensor oscillating when an angular velocity around the Y axis is applied thereto.
Figure 31B:
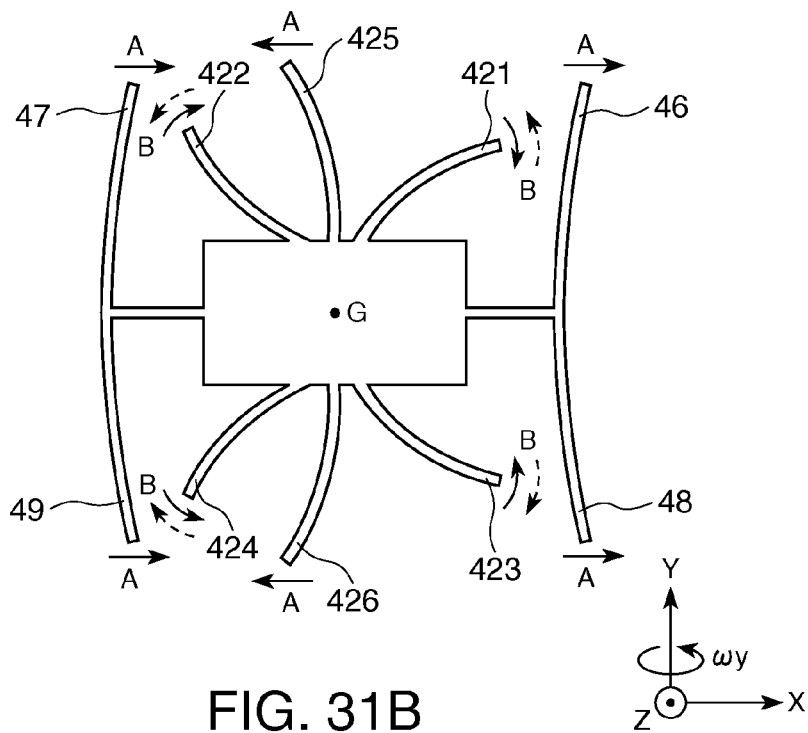
Figure 32A:
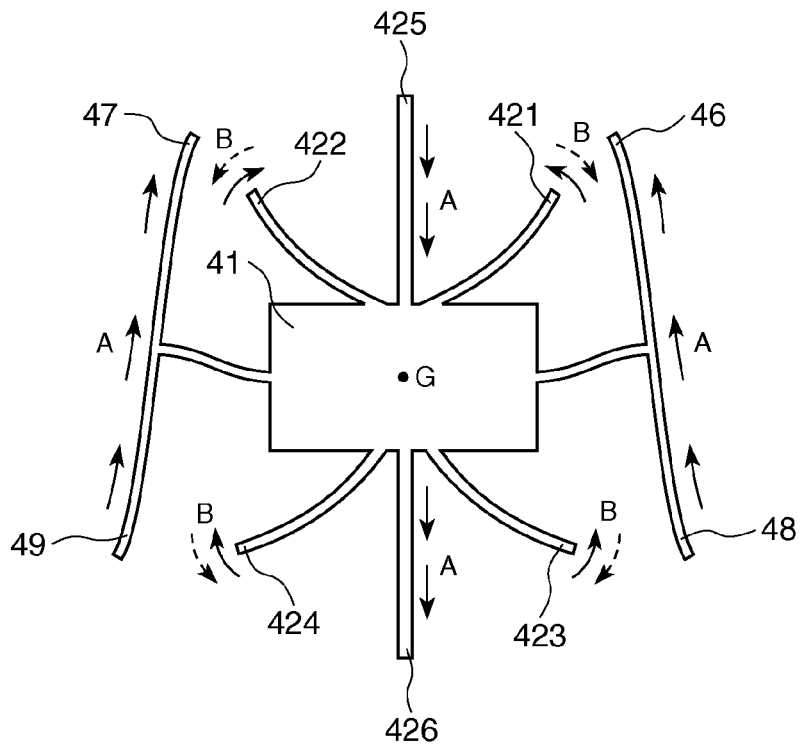
FIGS. 32A and 32B are plan views showing the gyro sensor oscillating when an angular velocity around the X axis is applied thereto.
Figure 32B:
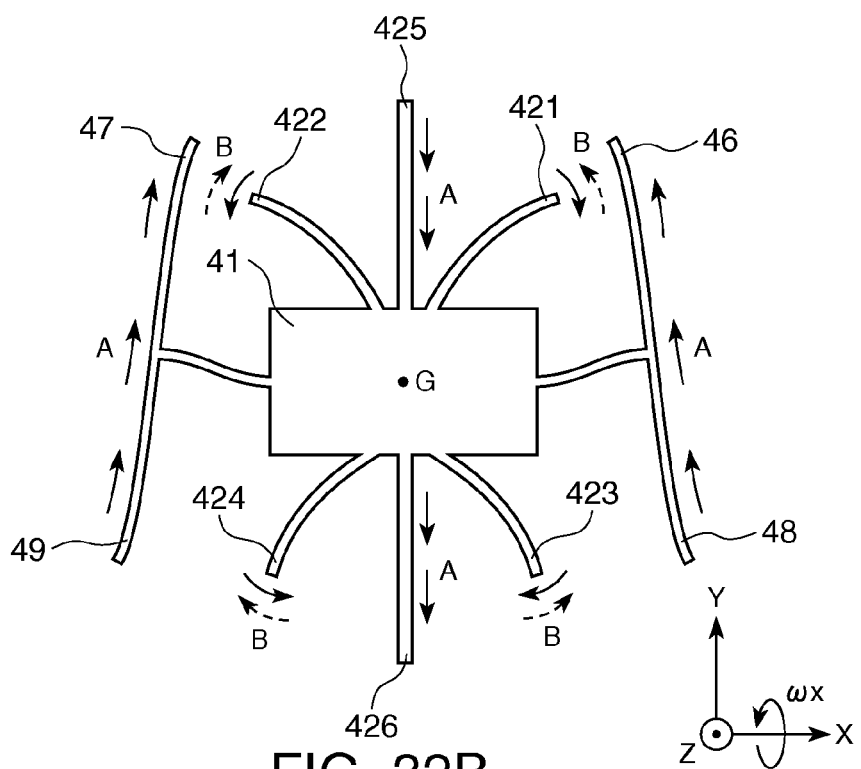

A gyro sensor according to an eighth embodiment of the invention will next be described. FIG. 29 is a plan view showing the gyro sensor according to the eighth embodiment of the invention that is driven with no angular velocity applied thereto. FIGS. 30A and 30B are plan views showing the gyro sensor oscillating when an angular velocity around the Z axis is applied thereto. FIGS. 31A and 31B are plan views showing the gyro sensor oscillating when an angular velocity around the Y axis is applied thereto. FIGS. 32A and 32B are plan views showing the gyro sensor oscillating when an angular velocity around the X axis is applied thereto.

The gyro sensor according to the eighth embodiment will be described below primarily about differences from the embodiments described above, and the same items will not be described. The gyro sensor according to the eighth embodiment of the invention is the same as the gyro sensor according to the sixth embodiment described above except that the fifth and sixth detection oscillation arms as the detection oscillation arms are allowed to oscillate. The same components as those in the sixth embodiment described above have the same reference characters.

In a gyro sensor 8 according to the present embodiment, the fifth and sixth detection oscillation arms 425, 426 are so configured that they oscillate in the Z-axis direction but in the direction opposite to the direction in which the first to fourth drive oscillation arms 46 to 49 oscillate, as shown in FIG. 29. A method for causing the fifth and sixth detection oscillation arms 425, 426 to oscillate in the Z-axis direction is not limited to a specific one but may, for example, be a method using a piezoelectric device provided on the +Z-axis-side principal surface (upper surface) of each of the fifth and sixth detection oscillation arms 425, 426. In this method, the piezoelectric devices are allowed to expand or shrink to cause the fifth and sixth detection oscillation arms 425, 426 to oscillate in the Z-axis direction. The symbol illustrated at the tip of each of the fifth and sixth detection oscillation arms 425, 426 in FIG. 29 indicates that the detection oscillation arm oscillates in the Z-axis direction toward the reader with respect to the plane of view, and the symbol illustrated at the tip of each of the first to fourth drive oscillation arms 46 to 49 in FIG. 29 indicates that the drive oscillation arm oscillates in an oblique direction away from the reader with respect to the plane of view.

When an angular velocity ωz around the Z axis is applied to the gyro sensor 8 with the first to fourth drive oscillation arms 46 to 49 and the fifth and sixth detection oscillation arms 425, 426 oscillating as described above, Coriolis forces A act on the drive oscillation arms, and oscillation (around-Z-axis angular velocity detection oscillation mode) B is induced by the Coriolis forces A as a drive force, as shown in FIG. 30A or 30B.

When an angular velocity ωy around the Y axis is applied to the gyro sensor 8 in the state described above, Coriolis forces A act on the drive oscillation arms, and oscillation (around-Y-axis angular velocity detection oscillation mode) B is induced by the Coriolis forces A as a drive force, as shown in FIG. 31A or 31B.

When an angular velocity ωx around the X axis is applied to the gyro sensor 8 in the state described above, Coriolis forces A act on the drive oscillation arms, and oscillation (around-X-axis angular velocity detection oscillation mode) B is induced by the Coriolis forces A as a drive force, as shown in FIG. 32A or 32B. The angular velocities ωx, ωy, and ωz can be detected independently based on the signals V1 to V6 according to the magnitudes of the distortion of the first to sixth detection oscillation arms 421 to 426, as in the sixth embodiment described above.

The eighth embodiment described above can also provide the same advantageous effect as that provided in the sixth embodiment described above.

Ninth Embodiment

Figure 33:
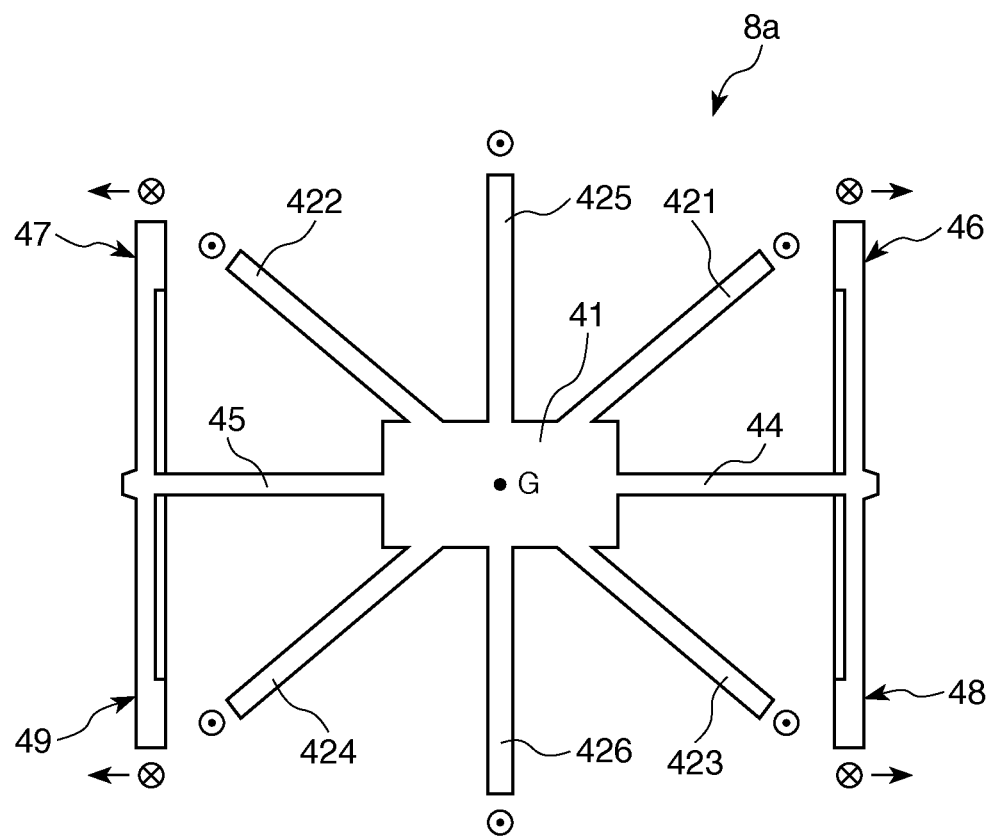
FIG. 33 is a plan view showing a gyro sensor according to a ninth embodiment of the invention that is driven with no angular velocity applied thereto.
Figure 34:
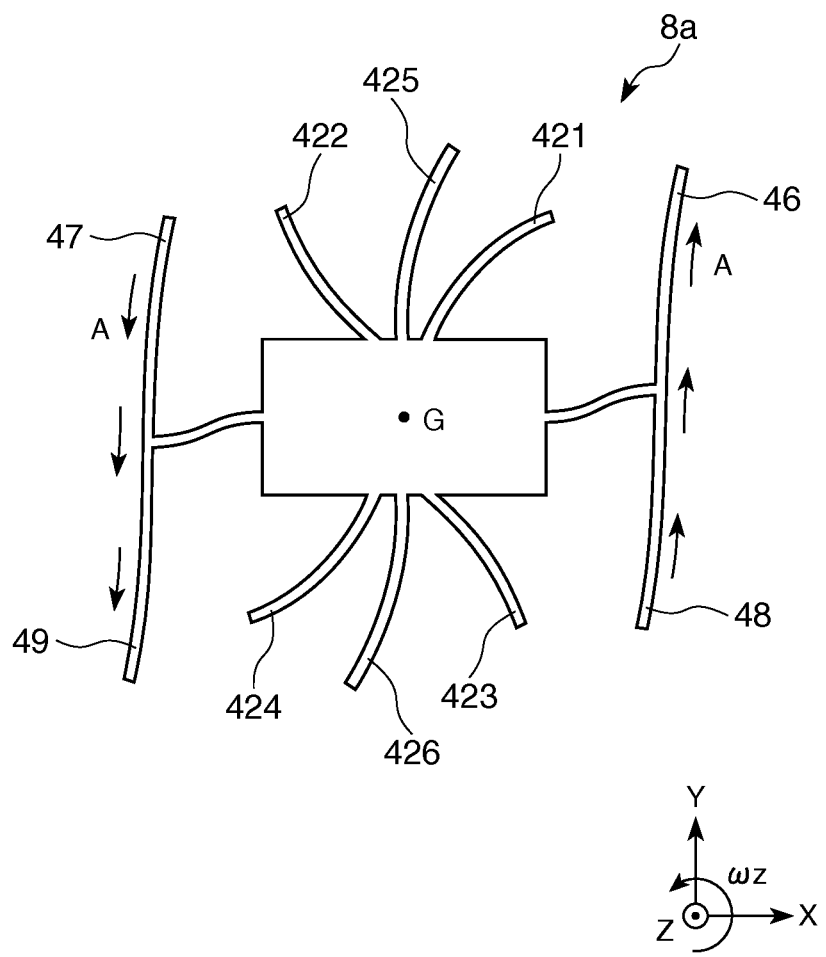
FIG. 34 is a plan view showing the gyro sensor oscillating when an angular velocity around the Z axis is applied thereto.
Figure 35:
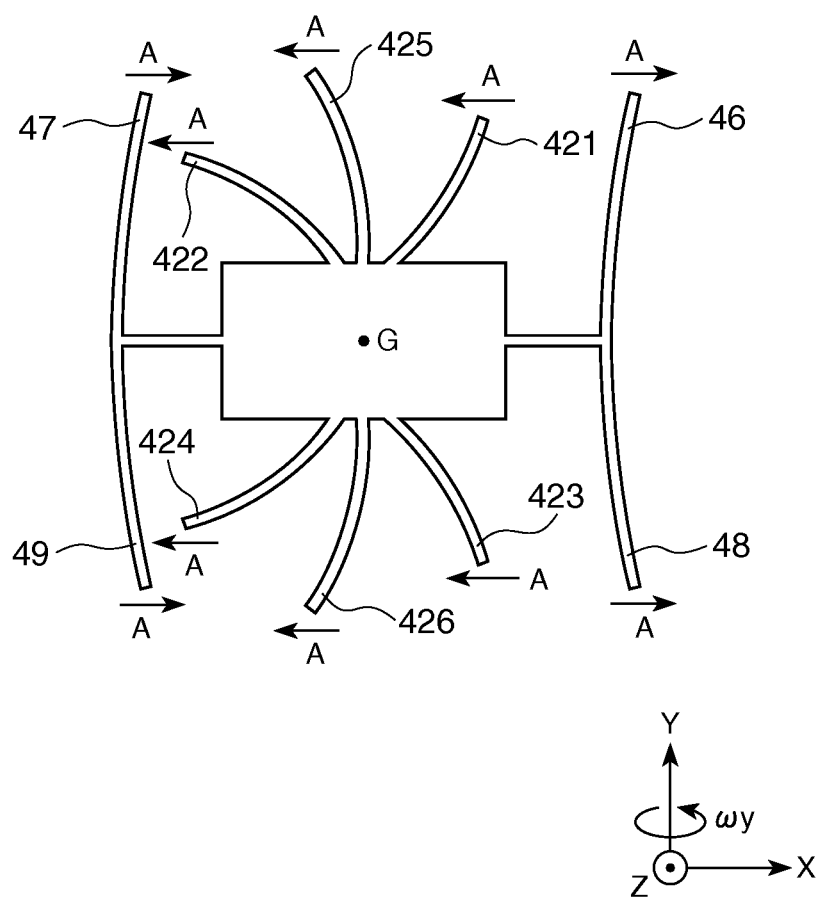
FIG. 35 is a plan view showing the gyro sensor oscillating when an angular velocity around the Y axis is applied thereto.
Figure 36:
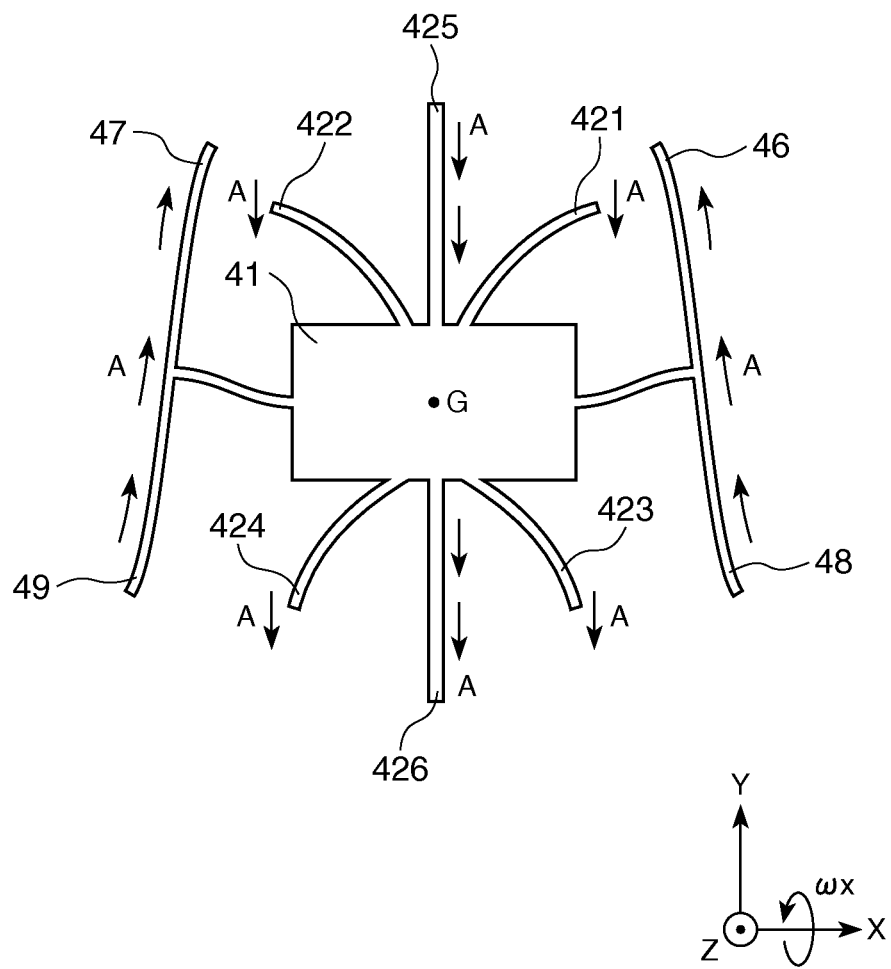
FIG. 36 is a plan view showing the gyro sensor oscillating when an angular velocity around the X axis is applied thereto.

A gyro sensor according to a ninth embodiment of the invention will next be described. FIG. 33 is a plan view showing the gyro sensor according to the ninth embodiment of the invention that is driven with no angular velocity applied thereto. FIG. 34 is a plan view showing the gyro sensor oscillating when an angular velocity around the Z axis is applied thereto. FIG. 35 is a plan view showing the gyro sensor oscillating when an angular velocity around the Y axis is applied thereto. FIG. 36 is a plan view showing the gyro sensor oscillating when an angular velocity around the X axis is applied thereto.

The gyro sensor according to the ninth embodiment will be described below primarily about differences from the embodiments described above, and the same items will not be described. The gyro sensor according to the ninth embodiment of the invention is the same as the gyro sensor according to the sixth embodiment described above except that the first to sixth detection oscillation arms as the detection oscillation arms are allowed to oscillate. The same components as those in the sixth embodiment described above have the same reference characters.

In a gyro sensor 8a according to the present embodiment, the first to sixth detection oscillation arms 421 to 426 are so configured that they oscillate in the Z-axis direction but in the direction opposite to the direction in which the first to fourth drive oscillation arms 46 to 49 oscillate, as shown in FIG. 33. A method for causing the first to sixth detection oscillation arms 421 to 426 to oscillate in the Z-axis direction is not limited to a specific one but may, for example, be a method using a piezoelectric device provided on the +Z-axis-side upper surface (principal surface) of each of the first to sixth detection oscillation arms 421 to 426. In the method, the piezoelectric devices are allowed to expand or shrink to cause the first to sixth detection oscillation arms 421 to 426 to oscillate in the Z-axis direction.

When an angular velocity ωz around the Z axis is applied to the gyro sensor 8a with the first to fourth drive oscillation arms 46 to 49 and the first to sixth detection oscillation arms 421 to 426 oscillating as described above, Coriolis forces A act on the drive oscillation arms, and oscillation (around-Z-axis angular velocity detection oscillation mode) is induced by the Coriolis forces A as a drive force, as shown in FIG. 34.

When an angular velocity ωy around the Y axis is applied to the gyro sensor 8a in the state described above, Coriolis forces A act on the drive oscillation arms, and oscillation (around-Y-axis angular velocity detection oscillation mode) is induced by the Coriolis forces A as a drive force, as shown in FIG. 35.

When an angular velocity ωx around the X axis is applied to the gyro sensor 8a in the state described above, Coriolis forces A act on the drive oscillation arms, and oscillation (around-X-axis angular velocity detection oscillation mode) is induced by the Coriolis forces A as a drive force, as shown in FIG. 36. The angular velocities ωx, ωy, and ωz can be detected independently based on the signals V1 to V6 according to the magnitudes of the distortion of the first to sixth detection oscillation arms 421 to 426, as in the sixth embodiment described above.

The ninth embodiment described above can also provide the same advantageous effect as that provided in the sixth embodiment described above. According to the ninth embodiment described above, in which Coriolis forces act directly on the first to fourth detection oscillation arms 421 to 424 when an angular velocity ωx around the X axis is applied, the angular velocity ωx is detected with improved detection sensitivity.

Tenth Embodiment

Figure 38:
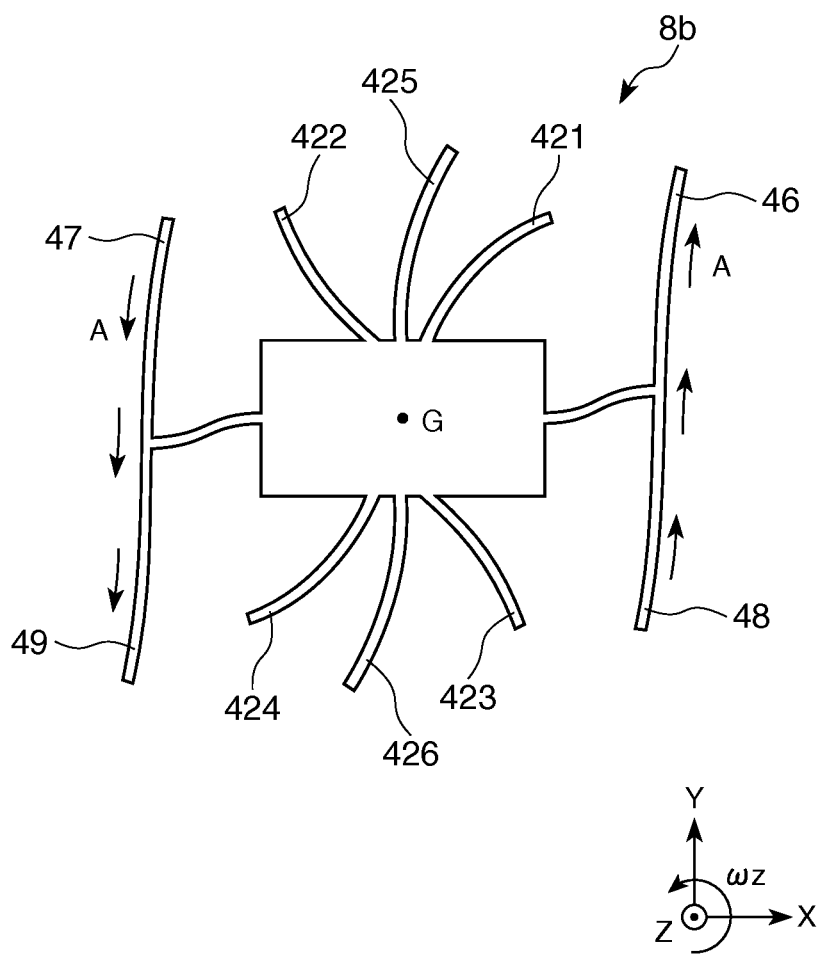
FIG. 38 is a plan view showing the gyro sensor oscillating when an angular velocity around the Z axis is applied thereto.
Figure 39:
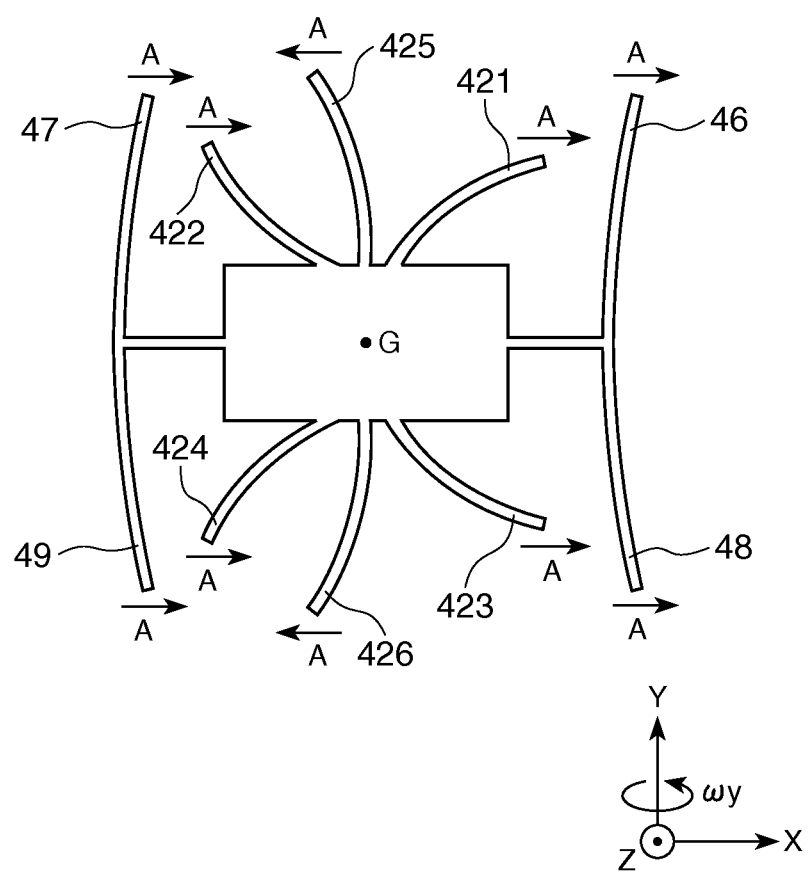
FIG. 39 is a plan views showing the gyro sensor oscillating when an angular velocity around the Y axis is applied thereto.
Figure 40:
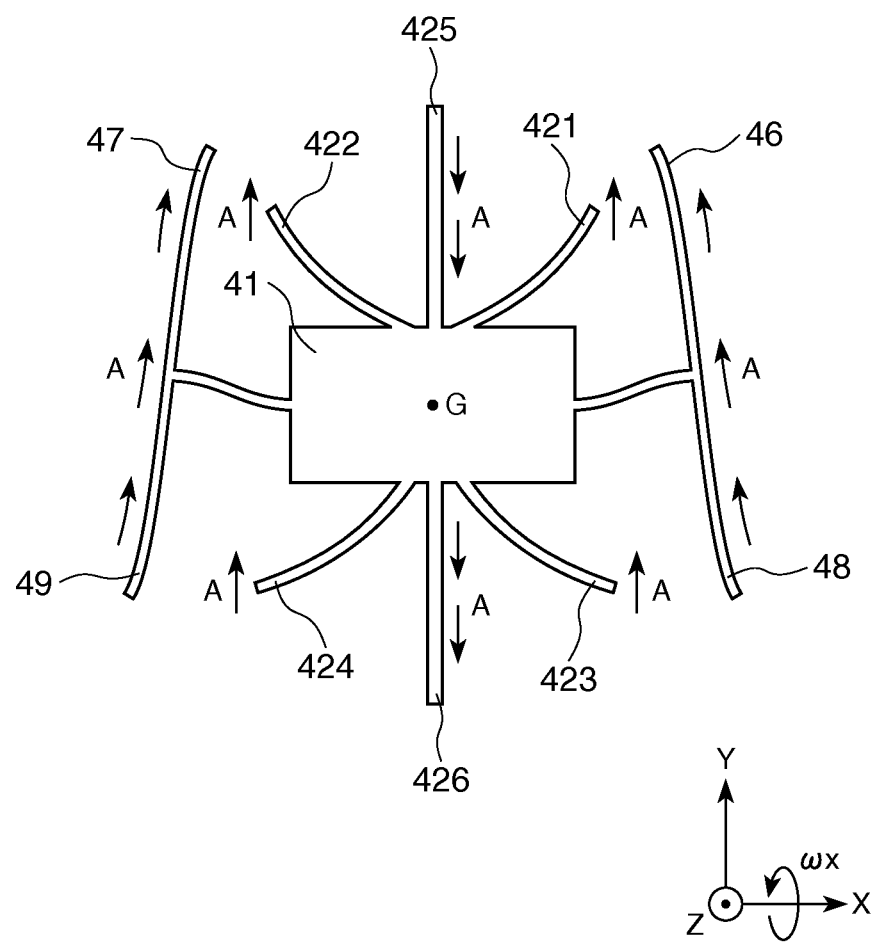
FIG. 40 is a plan view showing the gyro sensor oscillating when an angular velocity around the X axis is applied thereto.

A gyro sensor according to a tenth embodiment of the invention will next be described. FIG. 37 is a plan view showing the gyro sensor according to the tenth embodiment of the invention that is driven with no angular velocity applied thereto. FIG. 38 is a plan view showing the gyro sensor oscillating when an angular velocity around the Z axis is applied thereto. FIG. 39 is a plan view showing the gyro sensor oscillating when an angular velocity around the Y axis is applied thereto. FIG. 40 is a plan view showing the gyro sensor oscillating when an angular velocity around the X axis is applied thereto.

The gyro sensor according to the tenth embodiment will be described below primarily about differences from the embodiments described above, and the same items will not be described. The gyro sensor according to the tenth embodiment of the invention is the same as the gyro sensor according to the sixth embodiment described above except that the first to sixth detection oscillation arms as the detection oscillation arms are allowed to oscillate. The same components as those in the sixth embodiment described above have the same reference characters.

In a gyro sensor 8b according to the present embodiment, the first to fourth detection oscillation arms 421 to 424 are so configured that they oscillate in the Z-axis direction and in the same direction as the direction in which the first to fourth drive oscillation arms 46 to 49 oscillate, and the fifth and sixth detection oscillation arms 425, 426 are so configured that they oscillate in the Z-axis direction but in the direction opposite to the direction in which the first to fourth drive oscillation arms 46 to 49 oscillate, as shown in FIG. 37. A method for causing the first to sixth detection oscillation arms 421 to 426 to oscillate in the Z-axis direction is not limited to a specific one and may, for example, be a method using a piezoelectric device provided on the +Z-axis-side upper surface (principal surface) of each of the first to sixth detection oscillation arms 421 to 426. In the method, the piezoelectric devices are allowed to expand or shrink to cause the first to sixth detection oscillation arms 421 to 426 to oscillate in the Z-axis direction.

When an angular velocity ωz around the Z axis is applied to the gyro sensor 8b with the first to fourth drive oscillation arms 46 to 49 and the first to sixth detection oscillation arms 421 to 426 oscillating as described above, Coriolis forces A act on the drive oscillation arms, and oscillation (around-Z-axis angular velocity detection oscillation mode) is induced by the Coriolis forces A as a drive force, as shown in FIG. 38. When an angular velocity ωy around the Y axis is applied to the gyro sensor 8b in the state described above, Coriolis forces A act on the drive oscillation arms, and oscillation (around-Y-axis angular velocity detection oscillation mode) is induced by the Coriolis forces A as a drive force, as shown in FIG. 39.

When an angular velocity ωx around the X axis is applied to the gyro sensor 8b in the state described above, Coriolis forces A act on the drive oscillation arms, and oscillation (around-X-axis angular velocity detection oscillation mode) is induced by the Coriolis forces A as a drive force, as shown in FIG. 40. The angular velocities ωx, ωy, and ωz can be detected independently based on the signals V1 to V6 according to the magnitudes of the distortion of the first to sixth detection oscillation arms 421 to 426, as in the sixth embodiment described above.

The tenth embodiment described above can also provide the same advantageous effect as that provided in the sixth embodiment described above. According to the tenth embodiment described above, in which Coriolis forces act directly on the first to fourth detection oscillation arms 421 to 424 when an angular velocity ωx around the X axis is applied, the angular velocity ωx is detected with improved detection sensitivity.

In the gyro sensor 8b according to the present embodiment, the first to fourth detection oscillation arms 421 to 424 are so configured that they oscillate in the Z-axis direction and in the same direction as the direction in which the first to fourth drive oscillation arms 46 to 49 oscillate, and the fifth and sixth detection oscillation arms 425, 426 are so configured that they oscillate in the Z-axis direction but in the direction opposite to the direction in which the first to fourth drive oscillation arms 46 to 49 oscillate. Conversely, the first to fourth detection oscillation arms 421 to 424 may be so configured that they oscillate in the Z-axis direction but in the direction opposite to the direction in which the first to fourth drive oscillation arms 46 to 49 oscillate, and the fifth and sixth detection oscillation arms 425, 426 may be so configured that they oscillate in the Z-axis direction and in the same direction as the direction in which the first to fourth drive oscillation arms 46 to 49 oscillate.

An electronic apparatus including a gyro sensor according to an embodiment of the invention will next be described in detail with reference to FIGS. 41 to 43. The gyro sensor may be any of the gyro sensors described in the first to tenth embodiments. In the following description, a configuration using the gyro sensor 2 according to the first embodiment will be described as a representative example.

Figure 41:
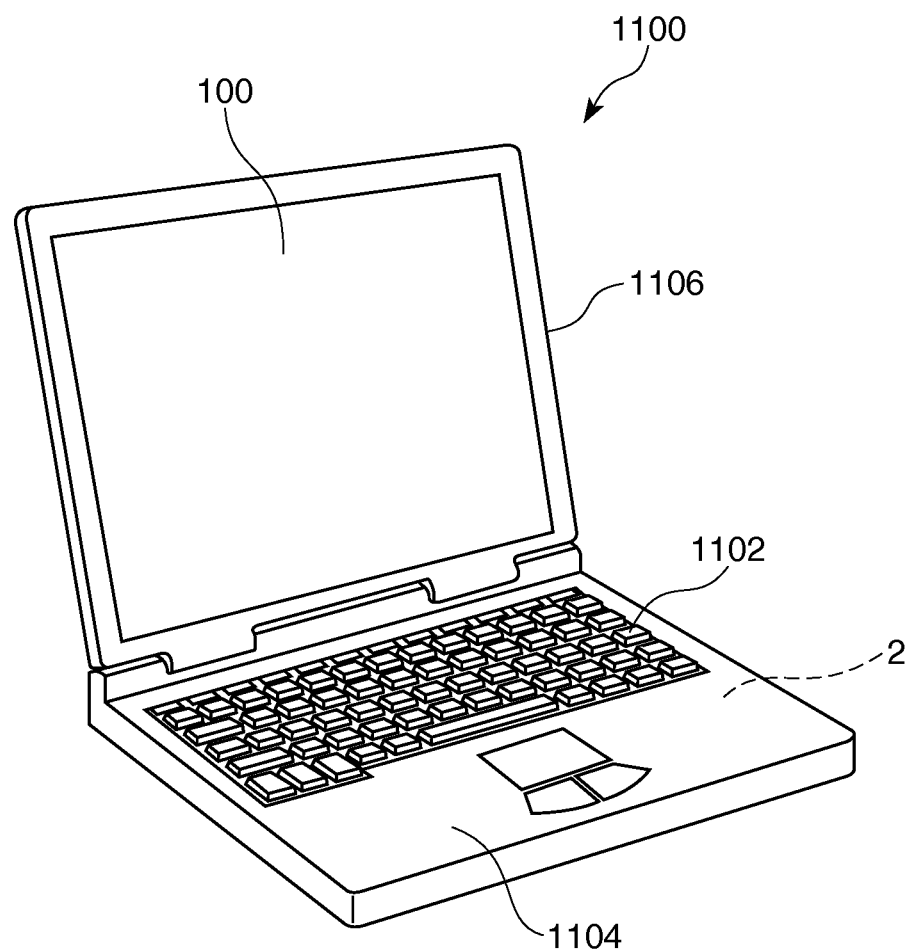
FIG. 41 shows an electronic apparatus (notebook personal computer) including a gyro sensor according to an embodiment of the invention.

FIG. 41 is a perspective view showing the configuration of a mobile (or notebook) personal computer as an electronic apparatus including a gyro sensor according to an embodiment of the invention. In FIG. 41, a personal computer 1100 is formed of the following components: a body 1104 including a keyboard 1102; and a display unit 1106 including a display section 100, and the display unit 1106 is pivotally supported by the body 1104 via a hinge structure. The thus configured personal computer 1100 accommodates the gyro sensor 2.

Figure 42:
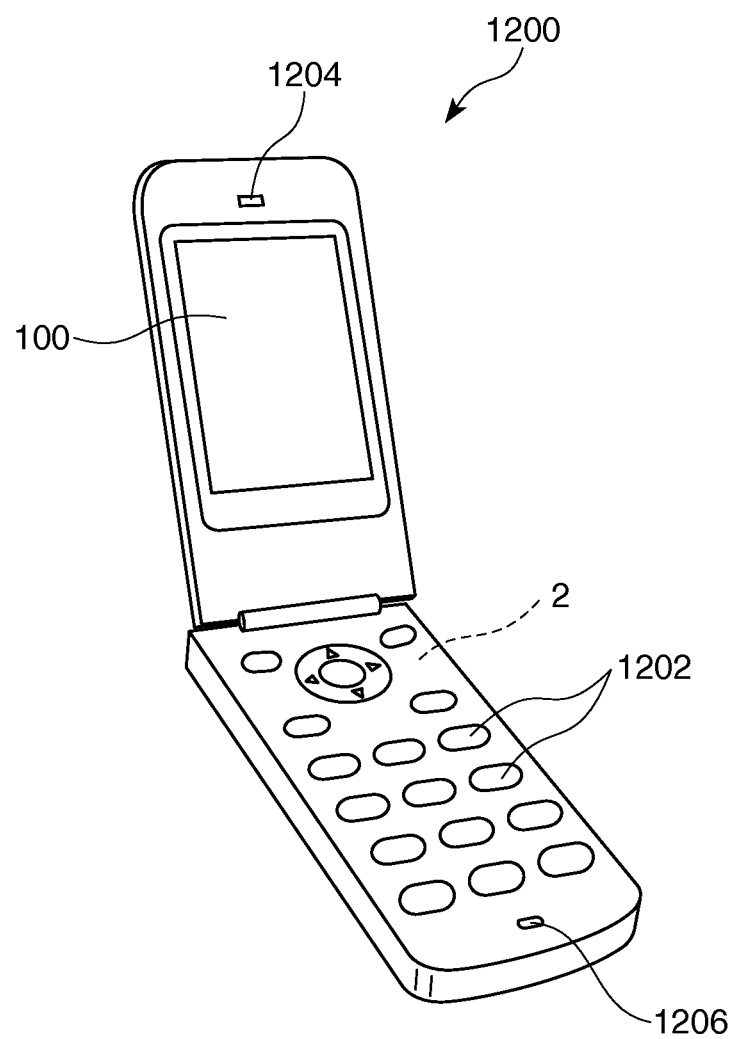
FIG. 42 shows an electronic apparatus (mobile phone) including a gyro sensor according to an embodiment of the invention.

FIG. 42 is a perspective view showing the configuration of a mobile phone (including PHS) as an electronic apparatus including a gyro sensor according to an embodiment of the invention. In FIG. 42, a mobile phone 1200 includes a plurality of operation buttons 1202, a receiver 1204, and a transmitter 1206, and a display section 100 is disposed between the operation buttons 1202 and the receiver 1204. The thus configured mobile phone 1200 accommodates the gyro sensor 2.

Figure 43:
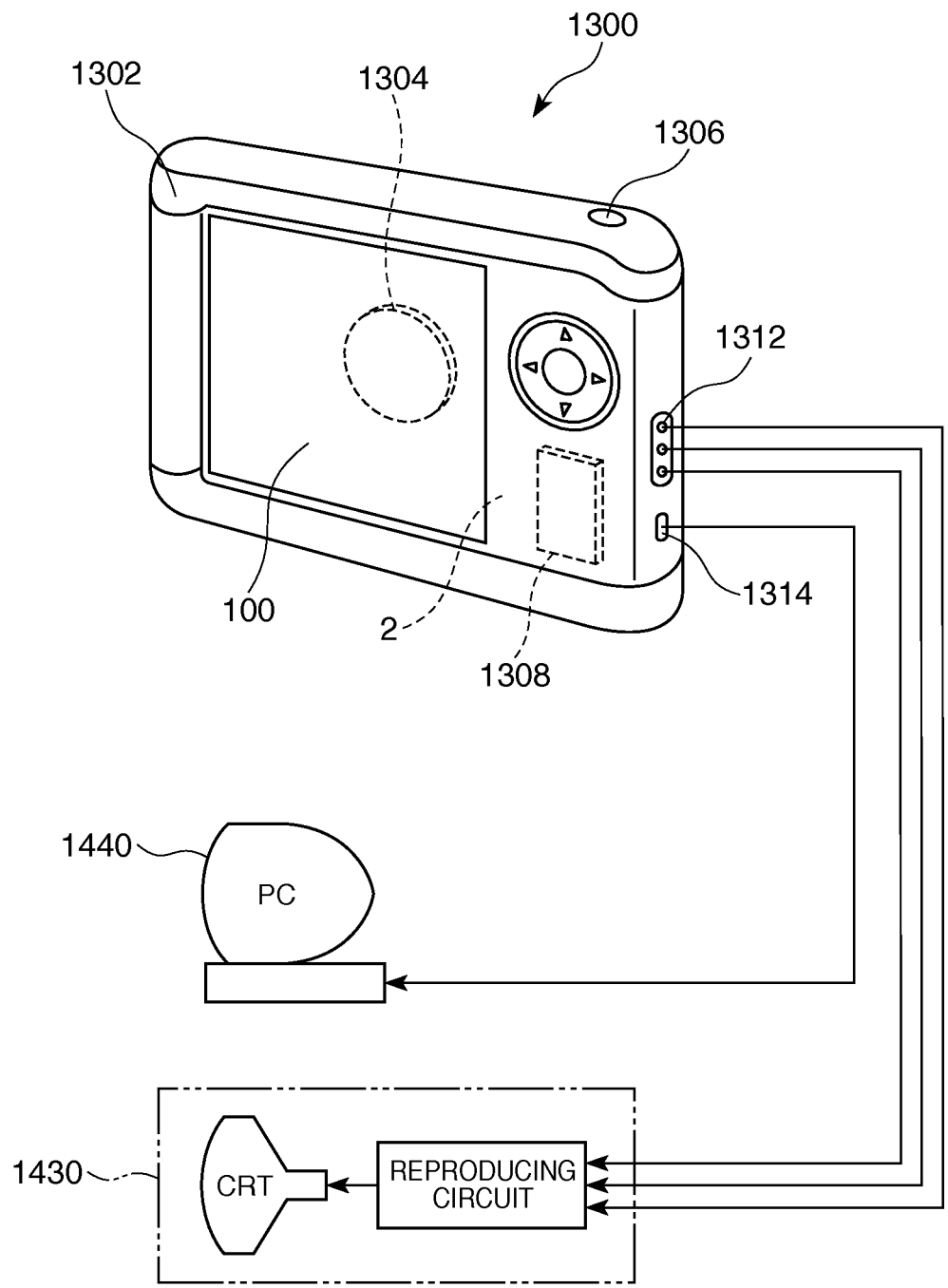
FIG. 43 shows an electronic apparatus (digital still camera) including a gyro sensor according to an embodiment of the invention.

FIG. 43 is a perspective view showing the configuration of a digital still camera as an electronic apparatus including a gyro sensor according to an embodiment of the invention. FIG. 43 also schematically shows connection to an external apparatus. In a typical camera, a silver photographic film is exposed to light, specifically to an optical image of a subject, whereas a digital still camera 1300 converts an optical image of a subject into a captured image signal (image signal) in a photoelectric conversion process by using a CCD (charge coupled device) or any other imaging device.

A display section is provided on the rear side of a case (body) 1302 of the digital still camera 1300 and displays an image based on the captured image signal from the CCD. The display section thus functions as a finder that displays a subject in the form of an electronic image. Further, a light receiving unit 1304 including an optical lens (imaging system), the CCD, and other components is provided on the front side (rear side in FIG. 43) of the case 1302. When a user of the camera checks a subject image displayed on the display section and presses a shutter button 1306, a captured image signal from the CCD at that point of time is transferred to and stored in a memory 1308.

Further, in the digital still camera 1300, a video signal output terminal 1312 and a data communication input/output terminal 1314 are provided on a side surface of the case 1302. The video signal output terminal 1312 is connected to a television monitor 1430 as necessary, and the data communication input/output terminal 1314 is connected to a personal computer (PC) 1440 as necessary, as shown in FIG. 43. Further, in response to predetermined operation, a captured image signal stored in the memory 1308 is outputted to the television monitor 1430 or the personal computer 1440. The thus configured digital still camera 1300 accommodates the gyro sensor 2.

An electronic apparatus including a gyro sensor according to an embodiment of the invention is used not only in the personal computer (mobile personal computer) shown in FIG. 41, the mobile phone shown in FIG. 42, and the digital still camera shown in FIG. 43 but also, for example, in an inkjet-type liquid ejection apparatus (inkjet printer, for example), a laptop personal computer, a television receiver, a video camcorder, a video tape recorder, a car navigation system, a pager, an electronic notebook (including electronic notepad having communication capability), an electronic dictionary, a desktop calculator, an electronic game console, a word processor, a workstation, a TV phone, a security television monitor, electronic binoculars, a POS terminal, a medical apparatus (such as electronic thermometer, blood pressure gauge, blood sugar meter, electrocardiograph, ultrasonic diagnostic apparatus, and electronic endoscope), a fish finder, a variety of measuring apparatus, a variety of instruments (such as instruments in vehicles, air planes, and ships), and a flight simulator.

Gyro sensors and electronic apparatus according to embodiments of the invention have been described with reference to the drawings, but the invention is not limited to the embodiments and the configuration of each portion can be replaced with an arbitrarily configured portion having the same function.

Further, the above embodiments have been described with reference to the case where the oscillation piece is made of a piezoelectric material, but the oscillation piece is not necessarily made thereof. The oscillation piece may, for example, be formed of a silicon substrate. In this case, each of the drive oscillation arms is allowed to oscillate, for example, by using a piezoelectric film.

Further, the above embodiments have been described with reference to the case where the first to fourth drive oscillation arms are provided, but the number of drive oscillation arms is not limited to a specific number. For example, the third and fourth drive oscillation arms may be omitted or the second and fourth drive oscillation arms may be omitted (in this case, the remaining third drive oscillation arm functions as the "second drive oscillation arm").

Further, the above embodiments have been described with reference to the case where the X axis, the Y axis, and the Z axis are perpendicular to each other. The X axis, the Y axis, and the Z axis may only need to intersect each other and do not need to be perpendicular to each other.

Further, each of the first, second, third, and fourth drive oscillation arms 46, 47, 48, 49 does not necessarily have the shape described above but may have any shape whose transverse cross-sectional shape is asymmetric with respect to the two central lines L' and L". For example, the shapes described below may be employed. The following description will be made with reference to the first drive oscillation arm 46 as a representative example.

Figure 44A:
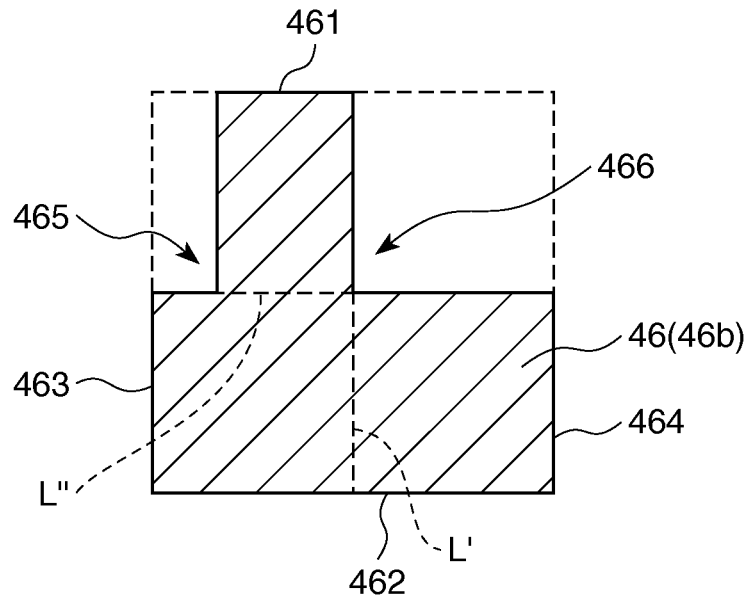
FIGS. 44A and 44B are cross-sectional views showing variations of the drive oscillation arm shown in FIG. 3.

The base end portion 46*b* of the first drive oscillation arm 46 shown in FIG. 44A has a first stepped portion 465 provided between an upper surface 461 and a side surface 463 and a second stepped portion 466 provided between the upper surface 461 and a side surface 464.

Figure 44B:
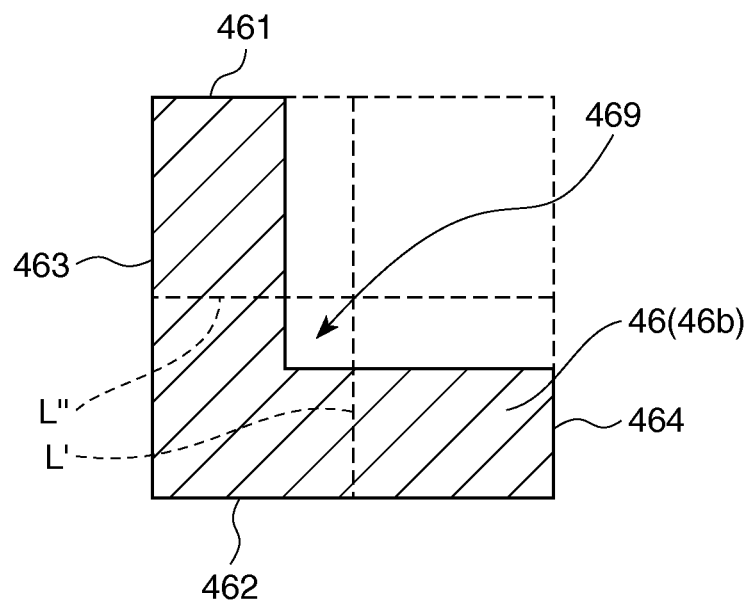

The base end portion 46*b* of the first drive oscillation arm 46 shown in FIG. 44B has a stepped portion 469 located between an upper surface 461 and a side surface 464.

The entire disclosure of Japanese Patent Application No. 2012-056458, filed Mar. 13, 2012; No. 2012-056461, filed Mar. 13, 2012; and No. 2012-056462, filed Mar. 13, 2012 are expressly incorporated by reference herein.

What is claimed is:

1. A gyro sensor comprising, on the condition that three axes intersecting are designated as a first axis, a second axis and a third axis, respectively:
 a base;
 a first connection arm and a second connection arm that extend from the base in opposite directions along the first axis;
 a first drive oscillation arm that extends from the first connection arm along the second axis;
 a second drive oscillation arm that extends from the second connection arm along the second axis; and
 a first detection oscillation arm and a second detection oscillation arm that extend from the base in opposite directions along the second axis,
 wherein each of the first drive oscillation arm and the second drive oscillation arm has an oscillation component along the first axis and an oscillation component along the third axis,
 each of the first drive oscillation arm and the second drive oscillation arm has a portion whose cross-sectional shape perpendicular to the second axis is asymmetrical with respect to a central line cross-sectional shape along the first axis and a central line cross-sectional shape along the third axis,
 the first drive oscillation arm has a first drive top surface, a first drive bottom surface, a first drive side surface extending from the first drive top surface to the first drive bottom surface and a second drive side surface extend n from the first drive top surface to the first drive bottom surface,
 the second drive oscillation arm has a second drive top surface, a second drive bottom surface, a third drive side surface extending from the second drive top surface to the second drive bottom surface and a fourth drive side surface extending from the second drive top surface to the second drive bottom surface,
 the first, second, third and fourth drive side surfaces have first, second, third and fourth steps, respectively,
 a first drive electrode is provided on each of the first drive top surface the first drive bottom surface an entirety of the third drive side surface including the third step, and an entirety of the fourth drive side surface including the fourth step, and the first drive electrodes are electrically connected to each other, and
 a second drive electrode is provided on each of the second drive top surface, the second drive bottom surface, an entirety of the first drive side surface including the first step, and an entirety of the second drive side surface including the second step, and the second drive electrodes are electrically connected to each other.

2. A gyro sensor comprising, on the condition that three axes intersecting each other are designated as a first axis, a second axis and a third axis, respectively:
 a base;
 a first connection arm and a second connection arm that extend from the base in opposite directions along the first axis;
 a first drive oscillation arm that extends from the first connection arm along the second axis;
 a second drive oscillation arm that extends from the second connection arm along the second axis;
 a first detection oscillation arm and a second detection oscillation arm that extend from one end of the base not only in directions that intersect the first axis and the second axis but also in opposite directions along the first axis; and
 a third detection oscillation arm and a fourth detection oscillation arm that extend from the other end of the base not only in directions that intersect the first axis and the second axis but also in opposite directions along the first axis,
 wherein the first and second detection oscillation arms and the third and fourth detection oscillation arms extend in opposite directions along the second axis,
 each of the first drive oscillation arm and the second drive oscillation arm has an oscillation component along the first axis and an oscillation component along the third axis,
 each of the first drive oscillation arm and the second drive oscillation arm has a portion whose cross-sectional shape perpendicular to the second axis is asymmetrical with respect to a central line cross-sectional shape along the first axis and a central line cross-sectional shape along the third axis,
 the first drive oscillation arm has a first drive top surface, a first drive bottom surface, a first drive side surface extending from the first drive top surface to the first drive bottom surface, and a second drive side surface extending from the first drive top surface to the first drive bottom surface, the second drive oscillation arm has a second drive to surface a second drive bottom surface, a third drive side surface extending from the second drive to surface to the second drive bottom surface, and a fourth drive side surface extending from the second drive top surface to the second drive bottom surface, the first, second, third and fourth drive side surfaces have first, second, third and fourth steps, respectively, a first drive electrode is provided on each of the first drive top surface, the first drive bottom surface, an entirety of the third drive side surface including the third step, and an entirety of the fourth drive side surface including the fourth step, and the first drive electrodes are electrically connected to each other, and a second drive electrode is provided on each of the second drive top surface, the second drive bottom surface, an entirety of the first drive side surface including the first step and an entirety the second drive side surface including the second step, and the second drive electrodes are electrically connected to each other.

3. The gyro sensor according to claim 2, further comprising:

a fifth detection oscillation arm that is located between the first detection oscillation arm and the second detection oscillation arm and extends from the one end of the base along the second axis; and a sixth detection oscillation arm that is located between the third detection oscillation arm and the fourth detection oscillation arm and extends from the other end of the base along the second axis.

4. The gyro sensor according to claim 2, wherein the first and second detection oscillation arms and the third and fourth detection oscillation arms are disposed in a symmetrical manner with respect to a plane defined by the first axis and the third axis, and the first and third detection oscillation arms and the second and fourth detection oscillation arms are disposed in a symmetrical manner with respect to a plane defined by the second axis and the third axis.

5. The gyro sensor according to claim 1, wherein when the first drive oscillation arm and the second drive oscillation arm are so driven that the first and second drive oscillation arms oscillate, the oscillation components thereof along the third axis are oriented in the same direction.

6. The gyro sensor according to claim 1, wherein when the first drive oscillation arm and the second drive oscillation arm are so driven that the first and second drive oscillation arms oscillate, the oscillation components thereof along the first axis are oriented in opposite directions.

7. The gyro sensor according to claim 1, further comprising:

a third drive oscillation arm that extends in a direction opposite to the direction in which the first drive oscillation arm extends; and a fourth drive oscillation arm that extends in a direction opposite to the direction in which the second drive oscillation arm extends.

8. The gyro sensor according to claim 1, wherein the gyro sensor detects at least one of an angular velocity around the second axis and an angular velocity around the third axis based on an output signal from each of the first and second detection oscillation arms.

9. The gyro sensor according to claim 8, wherein the gyro sensor detects at least one of the angular velocity around the second axis and the angular velocity around the third axis based on addition or subtraction of the output signals from the first and second detection oscillation arms.

10. The gyro sensor according to claim 1, wherein at least one of the first connection arm and the second connection arm has a distortion detection unit provided therein.

11. The gyro sensor according to claim 2, wherein the gyro sensor detects at least one of an angular velocity around the first axis, an angular velocity around the second axis, and an angular velocity around the third axis based on an output signal from each of the first through fourth detection oscillation arms.

12. The gyro sensor according to claim 2, wherein the gyro sensor detects at least one of an angular velocity around the first axis, an angular velocity around the second axis, and an angular velocity around the third axis based on addition or subtraction of output signals from the first through fourth detection oscillation arms.

13. The gyro sensor according to claim 1, wherein each of the first and second detection oscillation arms is made of a piezoelectric material, each of the first and second detection oscillation arms has a substantially rectangular cross-sectional shape, and a detection electrode is provided on each surface of each of the first and second detection oscillation arms.

14. The gyro sensor according to claim 1, wherein each of the first and second detection oscillation arms is made of a piezoelectric material, each of the first and second detection oscillation arms has a pair of principal surfaces that face away from each other as a front surface and a rear surface and a pair of side surfaces that connect the principal surfaces to each other, a groove is provided in at least one of the pair of principal surfaces, and inner electrodes are provided on an inner wall of the groove and the side surfaces that face away from the inner wall.

15. The gyro sensor according to claim 1, wherein each of the first and second detection oscillation arms has a pair of principal surfaces that face away from each other as a front surface and a rear surface and a pair of side surfaces that connect the surfaces o each other each of the first and second detection oscillation arms has a piezoelectric device provided on each of at least the pair of the principal surfaces, and the piezoelectric device is formed of a first electrode, a second electrode, and a piezoelectric film disposed therebetween.

16. An electronic apparatus comprising the gyro sensor according to claim 1.

17. A gyro sensor comprising, on the condition that three axes intersecting are designated as a first axis, a second axis and a third axis, respectively:

a base;

a first connection arm and a second connection arm that extend from the base in opposite directions along the first axis;

a first drive oscillation arm that extends from the first connection arm along the second axis;

a second drive oscillation arm that extends from the second connection arm along the second axis; and a first detection oscillation arm and a second detection oscillation arm that extend from the base in opposite directions along the second axis, wherein each of the first drive oscillation arm and the second drive oscillation arm has an oscillation component along the first axis and an oscillation component along the third axis, each of the first drive oscillation arm and the second drive oscillation arm has a portion whose cross-sectional shape perpendicular to the second axis is asymmetrical with respect to a central line cross-sectional shape along the first axis and a central line cross-sectional shape along the third axis, the first drive oscillation arm has a first drive top surface, a first drive bottom surface, a first drive side surface extending from the first drive top surface to the first drive bottom surface, and a second drive side surface extending from the first drive top surface to the first drive bottom surface, the second drive oscillation arm has a second drive top surface, a second drive bottom surface, a third drive side surface extending from the second drive top surface to the second drive bottom surface, and a fourth drive side surface extending from the second drive top surface to the second drive bottom surface, a first groove is provided in the first drive top surface, a second groove is provided in the first drive bottom surface, a third groove is provided in the second drive top surface, a forth groove is provided in the second drive bottom surface, a first drive electrode is provided on each of the first drive top surface, the first drive bottom surface, the third drive side surface, and the fourth drive side surface, and the first drive electrodes are electrically connected to each other, and a second drive electrode is provided on each of the second drive top surface, the second drive bottom surface, the first drive side surface, and the second drive side surface, and the second drive electrodes are electrically connected to each other.

* * * * *